United States Patent
Cheng et al.

(10) Patent No.: US 12,540,117 B2
(45) Date of Patent: Feb. 3, 2026

(54) ANILINE COMPOUND USED AS RORγ REGULATOR

(71) Applicant: SHANGHAI LITEDD CO., LTD., Shanghai (CN)

(72) Inventors: Yaobang Cheng, Shanghai (CN); Yafei Huang, Shanghai (CN); Juan Zhou, Shanghai (CN); Zhiqiang Dong, Shanghai (CN)

(73) Assignee: SHANGHAI LITEDD CO., LTD., Shanghai (CN)

( * ) Notice: Subject to any disclaimer, the term of this patent is extended or adjusted under 35 U.S.C. 154(b) by 573 days.

(21) Appl. No.: 17/925,358

(22) PCT Filed: May 14, 2021

(86) PCT No.: PCT/CN2021/093789
§ 371 (c)(1),
(2) Date: Nov. 15, 2022

(87) PCT Pub. No.: WO2021/228217
PCT Pub. Date: Nov. 18, 2021

(65) Prior Publication Data
US 2023/0192620 A1    Jun. 22, 2023

(30) Foreign Application Priority Data

May 15, 2020 (CN) .......................... 202010411990.3
Apr. 15, 2021 (CN) .......................... 202110404796.7

(51) Int. Cl.
*C07D 217/26* (2006.01)
*C07D 405/12* (2006.01)
*C07D 495/04* (2006.01)

(52) U.S. Cl.
CPC ......... *C07D 217/26* (2013.01); *C07D 405/12* (2013.01); *C07D 495/04* (2013.01)

(58) Field of Classification Search
CPC .................................................. C07D 217/26
See application file for complete search history.

(56) References Cited

FOREIGN PATENT DOCUMENTS

| CN | 106795118 A | 5/2017 |
|----|-------------|--------|
| CN | 107540659 A | 1/2018 |
| CN | 109071516 A | 12/2018 |
| CN | 110730780 A | 1/2020 |
| WO | 2015002231 A1 | 1/2015 |
| WO | 2020047487 A1 | 3/2020 |

OTHER PUBLICATIONS

International Search Report of Application No. PCT/CN2021/093789 mailed Jul. 28, 2021.
Written Opinion of Application No. PCT/CN2021/093789 mailed Jul. 28, 2021.

*Primary Examiner* — Paul V Ward
(74) *Attorney, Agent, or Firm* — Ladas & Parry LLP

(57) ABSTRACT

The present invention relates to the compound of formula (I), and a stereoisomer, a tautomer, a stable isotopic variation, a pharmaceutically acceptable salt or a solvate thereof, a pharmaceutical composition containing the compound, a method for using the compound for treating or preventing an RORγ-related disease, and use of the compound in the preparation of a drug for treating or preventing the RORγ-related disease.

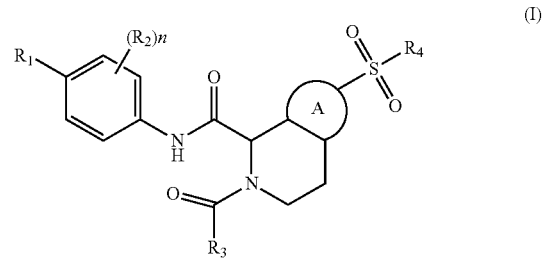

20 Claims, No Drawings

ANILINE COMPOUND USED AS RORγ REGULATOR

CROSS-REFERENCE TO RELATED APPLICATIONS

This application is a U.S. National Stage Application under 35 U.S.C. § 371 of International Application No. PCT/CN2021/093789, which was filed on May 14, 2021, which claims priority to and the benefit of Chinese Patent Application No. 202010411990.3 filed on May 15, 2020, and Chinese Patent Application No. 202110404796.7 filed on Apr. 15, 2021, the contents of each of which are hereby incorporated by reference in their entireties.

FIELD OF THE INVENTION

The disclosure belongs to the technical field of chemical medicines, in particular to aniline compound with RORγt inhibitory activities, a pharmaceutical composition containing the compound, a preparation method thereof, and use of the aniline compound in the preparation of a medicament for treating diseases related to RORγt.

BACKGROUND OF THE INVENTION

Retinoid acid receptor-related orphan receptors (RORs), also known as NF1R, is a member of the ligand-dependent transcription factor nuclear receptor (NR) superfamily. The RORs subfamily mainly includes three subtypes: RORα, RORβ and RORγ. RORγ includes two members, RORγ1 (also known as RORγ) and RORγ2 (also known as RORγt), wherein RORγ is distributed in skeletal muscle, thymus, testis, pancreas, prostate, heart and liver, etc., while RORγt is only expressed in some immune cells.

Littman et al. first reported that RORγt is required for the differentiation of naive CD4+T cells into Th17 cells (Cell, 2006 126, 1121-1133). During the differentiation of antigen-stimulated Thp cells into Th17 cells, the expression of RORγt is induced under the action of cytokines such as IL-6, IL-21 and TGF-β. Thp cells isolated from RORγt-deficient mice have significantly reduced ability to differentiate into Th17 cell lines. These all indicate that RORγt is a key regulator in promoting of Th17 cell differentiation.

Th17 cells are a type of helper T cells that produce IL-17 and other pro-inflammatory cytokines. Th17 cells play a key role in many autoimmune disease mouse models, such as animal models of experimental allergic encephalomyelitis (EAE) and collagen-induced arthritis (CIA). In addition, elevated IL-17 levels can be detected in some human autoimmune diseases including rheumatoid arthritis (RA), multiple sclerosis (MS), psoriasis and inflammatory bowel disease (IBD). In creased numbers of Th17 cells were found in both tissues and peripheral blood samples from patients with autoimmune diseases. Therefore, Th17 cells or IL-17 cytokine produced by Th17 cells are closely related to the pathogenesis of inflammation and autoimmune diseases.

In January 2015, Cosentyx (Secukinumab/AIN457), a monoclonal antibody developed by Novartis for the treatment of psoriasis by specifically blocking IL-17, has been approved for marketing by FDA, which is the first drug that acts on IL-17 in the market for the treatment of psoriasis. Subsequently, the monoclonal antibody ixekizumab targeting pro-inflammatory cytokine IL-17A was approved for the indications of psoriasis and psoriatic arthritis. The clinical success of these monoclonal antibodies demonstrates the importance of the IL-17 signaling pathway in inflammatory and autoimmune diseases, and demonstrates the potential for the treatment of inflammatory and autoimmune diseases by affecting the IL-17 signaling pathway with RORγt inhibitors.

Therefore, RORγt can be a new drug target for the treatment of autoimmune diseases, and it will be of great significance to search for small-molecule inhibitors of RORγt and use them in the treatment of RORγt-mediated inflammation and autoimmune diseases.

Up to now, there are total of 4 small molecule compounds of RORγt inhibitors in clinical phase 2, 7 small molecules of RORγt inhibitors are in clinical phase 1, and no compound has entered clinical phase 3. Therefore, there remains a great need for the discovery and development of new RORγt inhibitor compounds for the prevention and/or treatment of RORγt-related diseases. In addition to having satisfactory RORγt inhibitory activity, such compounds are also expected to have high selectivity for ROR subtypes and good or even improved druggability based on structure optimization, so as to provide more drug choices for patients with related diseases meanwhile to provide a better therapeutic effect.

BRIEF DESCRIPTION OF THE INVENTION

The present disclosure relates to a group of compounds useful for prevention or treatment of diseases related to RORγt. In particular, it has been identified that, the compounds of the present disclosure not only exhibit satisfactory RORγt inhibitory activity, have the capability to inhibit Th17 cell differentiation so as to inhibit IL-17 secretion, but also exhibit good absorption performance in in vivo pharmacokinetic experiments, indicating improved druggability and improved bioavailability. Thus, the compounds of the present disclosure can achieve the purpose of preventing or treating diseases related to RORγt, and the prepared medicaments are expected to have improved absorption, improved therapeutic effect at the same dose, or provide the same therapeutic effect at a lower dose, and/or reduce possible side effects. Therefore, the present disclosure also provides the use of the compounds of the present disclosure in the manufacture of a medicament for the prevention or treatment of diseases associated with RORγt, pharmaceutical compositions comprising the compounds and methods of preventing and/or treating diseases associated with RORγt by administering the compounds.

Accordingly, in one aspect of the present disclosure, provided herein is a compound of formula (I), a stereoisomer, a tautomer, a stable isotopic variant, a pharmaceutically acceptable salt or a solvate thereof:

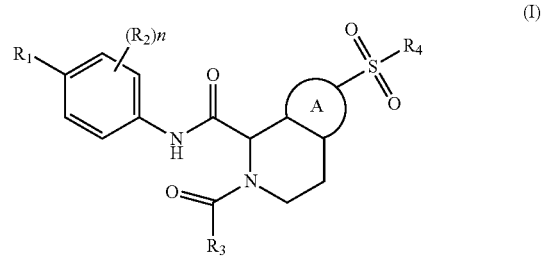

wherein:
  A is aryl, cycloalkenyl or heteroaryl;
  $R_1$ is selected from $C_1$-$C_6$alkyl, $C_1$-$C_6$alkoxy, $C_1$-$C_6$alkylthio, —$NR_aR_b$, $C_3$-$C_7$cycloalkyl, 4-7 membered heterocycloalkyl, $C_5$-$C_7$cycloalkenyl or 5-7 membered heterocycloalkenyl, each of which is optionally substituted with one or more groups independently selected from: halogen, cyano, nitro, $R_a$, —C(O)$R_a$, —C(O)O$R_a$, —C(O)$NR_aR_b$, —S(O)$R_a$, —S(O)$_2R_a$, —S(O)$_2NR_aR_b$, —O$R_a$, —S$R_a$ or —$NR_aR_b$;
  $R_2$ at each occurrence is independently selected from hydrogen, halogen, cyano, nitro, $C_1$-$C_6$alkyl optionally substituted with halogen, $C_1$-$C_6$alkoxy optionally substituted with halogen, or $C_1$-$C_6$alkylthio optionally substituted with halogen;
  $R_3$ is selected from hydrogen, $C_1$-$C_6$alkyl, $C_3$-$C_7$cycloalkyl, 4-7 membered heterocycloalkyl, —O$R_a$ or —$NR_aR_b$, wherein the $C_1$-$C_6$alkyl, the $C_3$-$C_7$cycloalkyl or the 4-7 membered heterocycloalkyl is optionally substituted with a group independently selected from: halogen, cyano, nitro, $R_a$, —C(O)$R_a$, —C(O)O$R_a$, —C(O)$NR_aR_b$, —S(O)$R_a$, —S(O)$_2R_a$, —S(O)$_2NR_aR_b$, —O$R_a$, —S$R_a$ or —$NR_aR_b$;
  $R_4$ is selected from $C_1$-$C_6$alkyl, $C_3$-$C_7$cycloalkyl, 4-7 membered heterocycloalkyl or —$NR_aR_b$, wherein the $C_1$-$C_6$alkyl, the $C_3$-$C_7$cycloalkyl or the 4-7 membered heterocycloalkyl is optionally substituted with a group independently selected from: halogen, cyano, nitro, $R_a$, —C(O)$R_a$, —C(O)O$R_a$, —C(O)$NR_aR_b$, —S(O)$R_a$, —S(O)$_2R_a$, —S(O)$_2NR_aR_b$, —O$R_a$, —S$R_a$ or —$NR_aR_b$;
  $R_a$ and $R_b$ are each independently selected from hydrogen, $C_1$-$C_6$alkyl, $C_3$-$C_7$cycloalkyl or 4-7 membered heterocycloalkyl, each optionally substituted with one or more halogen, cyano, or nitro; and
  n is 0, 1, 2 or 3.

In another aspect of the present disclosure, provided herein is a compound of formula (I), a stereoisomer, a tautomer, a stable isotopic variant, a pharmaceutically acceptable salt or a solvate thereof having RORγt inhibitory activity, for use as a medicament, especially for use as a RORγt inhibitor.

In another aspect of the present disclosure, provided herein is a compound of formula (I), a stereoisomer, a tautomer, a stable isotopic variant, a pharmaceutically acceptable salt or a solvate thereof for use in the treatment, especially in the treatment or prevention of diseases associated with RORγt.

In another aspect of the present disclosure, provided herein is a pharmaceutical composition comprising a compound of the present disclosure as described above and a pharmaceutically acceptable excipient. In a specific aspect, provided herein is the pharmaceutical composition of the present disclosure for use in the prevention or treatment of diseases associated with RORγt. In a specific aspect, such pharmaceutical composition can further comprise other therapeutically active ingredient(s) suitable for use in combination with the compounds of the present disclosure.

In another aspect of the present disclosure, provided herein is a pharmaceutical combination comprising a compound of the present disclosure as described above and additional therapeutic active ingredient(s).

In another aspect of the present disclosure, provided herein is a method of preventing or treating diseases associated with RORγt in a mammal, particularly in human, comprising administering an effective amount of a compound of the present disclosure or a pharmaceutical composition comprising thereof as disclosed herein.

In another aspect of the present disclosure, provided herein is use of a compound or a pharmaceutical composition of the present disclosure as described above for preventing or treating diseases associated with RORγt.

In another aspect of the present disclosure, provided herein is use of a compound or a pharmaceutical composition of the present disclosure as described above in the manufacture of a medicament for use in the prevention or treatment of diseases associated with RORγt.

In additional aspects, provided herein is a method for synthesizing the compound of the present disclosure, wherein representative synthetic schemes and routes are described hereinafter.

Other objects and advantages of the present disclosure would be obvious to those skilled in the art upon reading the subsequent detailed descriptions.

DETAILED DESCRIPTION OF THE INVENTION

Definitions

Unless specified otherwise, the terms used in the description and claims herein have the following meanings. Specific terms or phrases without specified definitions, should not be recognised as indefinite or unclear, but should be understood in accordance with the ordinary meaning in the art. Many groups defined herein are optionally substituted, the substituents list provided in the part of definitions are only illustrative, and are not intended to limit substituents defined in other parts of the description and claims herein.

The term "alkyl" as used herein refers to a straight or branched chain aliphatic hydrocarbon group having specified number of carbon atom. Specifically, an alkyl may contain from 1 to 6, 1 to 5, 1 to 4, 1 to 3 or 1 to 2 carbon atoms. Examples of suitable $C_1$-$C_6$ alkyl include, but are not limited to, methyl, ethyl, n-propyl, isopropyl, n-butyl, isobutyl, sec-butyl, tert-butyl, n-pentyl, isopentyl, neopentyl, n-hexyl and isohexyl. In particular, an alkyl has 1 to 3 carbon atoms.

The term "alkoxy" as used herein refers to a —O-alkyl group, wherein the alkyl has the meaning as defined herein. Specifically, this term refers to —O—$C_{1-6}$ alkyl group. Examples of suitable alkoxy include, but are not limited to, methoxy, ethoxy, n-propoxy, isopropoxy, n-butoxy, isobutoxy, tert-butoxy, n-pentyloxy, n-hexyloxy and 1,2-dimethylbutoxy. In particular, analkoxy has 1 to 3 carbon atoms.

The term "alkylthio" as used herein refers to a —S-alkyl group, wherein the alkyl has the meaning as defined herein. Specifically, this term refers to —O—$C_{1-6}$ alkyl group. Examples of suitable alkylthio include, but are not limited to, methylthio, ethylthio, n-propylthio, isopropylthio, n-butylthio, tert-butylthio, sec-butylthio, n-pentylthio, n-hexylthio and 1,2-dimethylbutylthio. In particular, analkylthio has 1 to 3 carbon atoms.

The term "halogen-substituted $C_1$-$C_6$ alkyl" as used herein refers to the $C_1$-$C_6$ alkyl described above wherein one or more (e.g., 1, 2, 3, 4 or 5) hydrogen atoms are replaced by halogens. It will be understood by those skilled in the art that when there are more than one halogen substituent, the halogens may be the same or different, and may be located on the same or different C atoms. Examples of "halogen substituted $C_1$-$C_6$ alkyl" are e.g., —$CH_2F$, —$CHF_2$, —$CF_3$, —$CCl_3$, —$C_2F_5$, —$C_2Cl_5$—, —$CH_2CF_3$, —$CH_2Cl$, —$CH_2CH_2CF_3$ or —$CF(CF_3)_2$, etc.

The term "halogen-substituted $C_1$-$C_6$ alkoxy" as used herein refers to the $C_1$-$C_6$ alkoxy described above wherein one or more (e.g., 1, 2, 3, 4 or 5) hydrogen atoms are replaced by halogens. It will be understood by those skilled in the art that when there are more than one halogen substituent, the halogens may be the same or different, and may be located on the same or different C atoms. Examples of "halogen substituted $C_1$-$C_6$ alkoxy" are e.g., —OCH$_2$F, —OCHF$_2$, —OCF$_3$, —OCCl$_3$, —OC$_2$F$_5$, —OC$_2$Cl$_5$, —OCH$_2$CF$_3$, —OCH$_2$Cl or —OCH$_2$CH$_2$CF$_3$, etc.

The term "halogen-substituted $C_1$-$C_6$ alkylthio" as used herein refers to the $C_1$-$C_6$ alkylthio described above wherein one or more (e.g., 1, 2, 3, 4 or 5) hydrogen atoms are replaced by halogens. It will be understood by those skilled in the art that when there are more than one halogen substituent, the halogens may be the same or different, and may be located on the same or different C atoms. Examples of "halogen substituted $C_1$-$C_6$ alkylthio" are e.g., —SCH$_2$F, —SCHF$_2$, —SCF$_3$, —SCCl$_3$, —SC$_2$F$_5$, —SC$_2$Cl$_5$, —SCH$_2$CF$_3$, —SCH$_2$Cl or —SCH$_2$CH$_2$CF$_3$, etc.

The term "cycloalkyl" as used herein refers to a monocyclic, fused polycyclic, bridged polycyclic, or spirocyclic non-aromatic saturated cyclic hydrocarbon ring structure having specified number of ring atoms. The cycloalkyl group may have 3 to 12 carbon atoms, specifically 3 to 10 carbon atoms, more specifically 3 to 7 carbon atoms, i.e. $C_3$-$C_7$ cycloalkyl. Suitable examples of cycloalkyl include, but are not limited to, monocyclic group, e.g., cyclopropyl, cyclobutyl, cyclopentyl, cyclohexyl and cycloheptyl.

The term "halogen-substituted $C_3$-$C_7$cycloalkyl" as used herein refers to the $C_3$-$C_7$cycloalkyl described above wherein one or more (e.g., 1, 2, 3, 4 or 5) hydrogen atoms are replaced by halogens. It will be understood by those skilled in the art that when there are more than one halogen substituent, the halogens may be the same or different, and may be located on the same or different C atoms. Examples include, but are not limited to, 2-fluorocyclopropyl, 2,3-difluorocyclopropyl, 2,2,3,3-tetra fluorocyclopropyl, 2,3-difluorocyclobutyl, 2,4-difluorocyclobutyl, etc.

The term "cycloalkenyl" as used herein refers to a monocyclic, fused polycyclic, bridged polycyclic or spirocyclic non-aromatic unsaturated hydrocarbon ring structure having specified number of ring atoms and comprising at least one carbon-carbon double bond. A cycloalkenyl group may have 3 to 12 carbon atoms, specifically 3 to 10, and more specifically 5 to 7 carbon atoms, i.e. a $C_5$-$C_7$ cycloalkenyl group. Examples of suitable cycloalkenyl groups include, but are not limited to, monocyclic structures, such as cyclopentenyl, cyclopentadienyl, cyclohexenyl, cyclohexadienyl, cycloheptenyl, cycloheptadienyl, cycloheptatrienyl.

The term "heterocycloalkyl" as used herein refers to a monocyclic, fused polycyclic, spirocyclic or bridged polycyclic non-aromatic saturated ring structure comprising one or more heteroatoms independently selected from O, N and S and having specified number off ring atoms, or N-oxide thereof, or S-oxide thereof, or S-dioxide thereof. The heterocycloalkyl group may have 4 to 12 ring members, specifically 4 to 10 ring members, more specifically 4 to 7 ring members. The heterocycloalkyl group typically comprises up to 4 heteroatoms, more typically up to 3 heteroatoms, more typically up to 2 heteroatoms, for example single heteroatom, e.g., a 4-7 membered monocyclic heterocycloalkyl comprising one heteroatom such as N, i.e. a 4-7 membered heterocycloalkyl comprising nitrogen. Suitable examples of heterocycloalkyl include, but are not limited to, azetidinyl, oxetanyl, thietanyl, pyrrolidinyl (e.g., 1-pyrrolidinyl, 2-pyrrolidinyl and 3-pyrrolidinyl), tetrahydrofuranyl (e.g., 1-tetrahydrofuranyl, 2-tetrahydrofuranyl and 3-tetrahydrofuranyl), tetrahydrothiophenyl (e.g., 1-tetrahydrothiophenyl, 2-tetrahydrothiophenyl and 3-tetrahydrothiophenyl), piperidinyl (e.g., 1-piperidinyl, 2-piperidinyl, 3-piperidinyl, 4-piperidinyl), tetrahydropranyl (e.g., 4tetrahydropyranyl), tetrahydrothiopyranyl (e.g., 4-tetrahydrothiopyranyl), morpholinyl, thiomorpholinyl, dioxanyl, piperazinyl or azepanyl.

The term "heterocycloalkenyl" as used herein refers to a "heterocycloalkyl" as defined herein comprising at least one double bond. Examples of suitable heterocycloalkenyl groups include, but are not limited to:

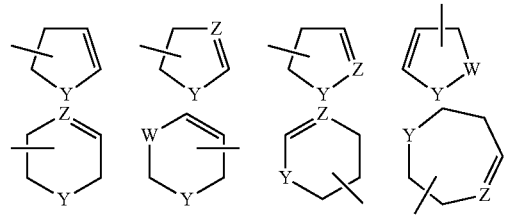

wherein each W is selected from CH$_2$, NH, O, and S; each Y is selected from NH, O, C(═O), SO$_2$, and S; and each Z is selected from N and CH, provided that each ring contains at least one atom selected from N, O or S.

The term "aryl" as used herein refers to a monovalent aromatic hydrocarbon group derived by removing one hydrogen atom from a single carbon atom in an aromatic ring system. Specifically, an aryl refers to a monocyclic or fused polycyclic aromatic ring structure having specified number of ring atoms. Specifically, the term includes groups containing 6 to 10 ring members. Particular aryl groups include phenyl and naphthyl, most particularly phenyl.

The term "heteroaryl" as used herein refers to a monocyclic or fused polycyclic aromatic ring structure comprising one or more heteroatoms independently selected from O, N and S and specified number of ring atoms, or N-oxide, or S-oxide or S-dioxide thereof. In particular, the aromatic ring structure may have 5 to 9 ring members. The heteroaryl group can be, for example, a 5-6 membered monocyclic ring, or a fused bicyclic structure formed from two fused 5-membered rings, or fused 5-membered and 4-membered rings. Typically, the heteroaryl ring comprises up to 4 heteroatoms, more typically up to 3 heteroatoms, more typically up to 2, for example a single heteroatom independently selected from O, N and S, wherein N and S may be in an oxidized state such as N oxide, S═O or S(O)$_2$. In one embodiment, the heteroaryl ring comprises at least one ring nitrogen atom, at least one ring sulfur atom, or at least one ring oxygen atom. For example, the heteroaryl group can be a 5-6 membered heteroaryl group comprising 1 or 2 heteroatoms independently selected from N, O, or S. Examples of suitable 5-membered monocyclic heteroaryl groups include, but are not limited to, pyrrolyl, furanyl, thiophenyl, imidazolyl, furazanyl, oxazolyl, oxadiazolyl, oxatriazolyl, isoxazolyl, thiazolyl, isothiazolyl, pyrazolyl, triazolyl, and tetrazolyl; examples of suitable 6-membered monocyclic heteroaryl groups include, but are not limited to, pyridinyl, pyrazinyl, pyridazinyl, pyrimidinyl, and triazinyl. Examples of suitable bicyclic heteroaryl groups comprising a 5-membered ring fused to another 5-membered ring include, but are not limited to, imidazothiazolyl and imidazoimidazolyl.

The term halo" or "halogen" as used herein refers to fluorine (F), chlorine (Cl), bromine (Br) and iodine (I). Particular halogens are fluorine or chlorine. The term "halogen substituted" groups as used herein is intended to include mono- or polyhalogenated groups in which one or more of the same or different halogens replace one or more hydrogens in the group.

The term "cyano" as used herein refers to a group —CN.
The term "nitro" as used herein refers to a group —$NO_2$.
The term "amino" as used herein refers to a group —$NH_2$.
The term "optionally substituted with one or more . . ." as used herein refers to that the group may be unsubstituted or may be substituted by one or more (e.g., 0, 1, 2, 3, 4, or 5 or more, or any range derivable therein) substituents listed for that group, wherein the substituents may be the same or different. In one embodiment, an optionally substituted group has 1 substituent. In another embodiment, an optionally substituted group has 2 substituents. In another embodiment, an optionally substituted group has 3 substituents. In another embodiment, an optionally substituted group has 4 substituents.

Unless otherwise defined, the $C_1$-$C_6$ alkyl, $C_3$-$C_7$ cycloalkyl or 4-7 membered heterocycloalkyl used in the definitions of the compounds herein optionally carries one or more substituents, which may be selected from H, F, Cl, Br, I, cyano, nitro, $C_1$-$C_6$ alkyl (e.g., methyl, ethyl, propyl, isopropyl, butyl, isobutyl, sec-butyl, tert-butyl, pentyl, neopentyl, hexyl, 1,2-dimethylbutyl, etc.), $C_3$-$C_7$ cycloalkyl (cyclopropyl, cyclobutyl, cyclopentyl, cyclohexyl, cycloheptyl), —OH, —O—$C_1$-$C_6$ alkyl (such as methoxy, ethoxy, n-propoxy, isopropoxy, n-butoxy, tert-butoxy, sec-butoxy, n-pentoxy, n-hexyloxy and 1,2-dimethylbutoxy, etc.), —SH, —S—$C_1$-$C_6$ alkyl (e.g., methylthio, ethylthio, n-propylthio, isopropylthio, n-butylthio, tert-butylthio, sec-butylthio, n-pentylthio, n-hexylthio and 1,2-dimethylbutylthio, etc.) or —$NH_2$, —NH—$C_1$-$C_6$ alkyl (e.g., methylamino, ethylamino, propylamino, isopropylamino, n-butylamino, tert-butylamino, sec-butylamino, n-pentylamino, n-hexylamino and 1,2-dimethylbutylamino, etc.), —N($C_1$-$C_6$ alkyl)$_2$ (e.g., dimethylamino, methylethylamino, diethylamino, etc.), wherein the $C_1$-$C_6$ alkyl or $C_3$-$C_7$ cycloalkyl is optionally substituted by one or more halogen (preferably F).

It is understood by those of ordinary skill in the art of organic synthesis that, for stable chemically feasible heterocycles, whether aromatic or non-aromatic, the maximum number of heteroatoms or the type of heteroatoms therein is determined by ring size, degree of unsaturation, and valence of the heteroatoms. In general, a heterocycle can have 1 to 4 heteroatoms, so long as the heterocycle or heteroaromatic ring is chemically feasible and stable.

The term "compound(s) of the invention" or "compound(s) of the disclosure" as used herein is intended to encompass compounds of general formula (I) as defined herein or any preferred or specific embodiments thereof (including compounds of formula (Ia), formula (Ia'), formula (Ia") and formula (Ib)), their stereoisomers, tautomers, stable isotopic variants, pharmaceutically acceptable salts or solvates, and prodrugs. Similarly, references herein to an "intermediate", whether or not they themselves are claimed, is intended to encompass their free forms as well as each of the aforementioned derivative forms, where the context so permits.

The term "pharmaceutically acceptable" as used herein refers to such molecular entities and compositions that have been approved by regulatory agencies in various countries or could be approved by the same, or listed in a generally recognized pharmacopeia for use in animals, and more particularly in humans, or when administered to animals in particular to humans in appropriate amounts do not produce disadvantageous, allergic or other adverse reactions.

The term "pharmaceutically acceptable salt" as used herein refers to salts of the compounds described herein which are pharmaceutically acceptable and which possess the desired pharmacological activities of the parent compounds. Specifically, such salts are non-toxic and can be addition salts with inorganic acids, organic acids or bases. Specifically, the salts include: (1) acid addition salts formed with inorganic acids such as hydrochloric acid, hydrobromic acid, sulfuric acid, nitric acid, phosphoric acid, etc.; or acid addition salts formed with organic acids, such as acetic acid, propionic acid, caproic acid, glycolic acid, pyruvic acid, lactic acid, malonic acid, succinic acid, malic acid, maleic acid, fumaric acid, tartaric acid, citric acid, benzoic acid, cinnamic acid, mandel acid, methanesulfonic acid, ethanesulfonic acid, benzenesulfonic acid, 2-naphthalenesulfonic acid, 4-toluenesulfonic acid, camphorsulfonic acid, glucoheptanoic acid, 3-phenylpropionic acid, trimethylacetic acid, tert-butylacetic acid, lauryl sulfuric acid, gluconic acid, glutamic acid, hydroxynaphthoic acid, salicylic acid, stearic acid, muconic acid, etc.; or (2) salts formed when the acidic proton present in the parent compound is either replaced by a metal ion such as an alkali metal ion, an alkaline earth metal ions or an aluminum ion, or coordinates with an organic base such as ethanolamine, diethanolamine, triethanolamine, N-methylglucamine, etc. Those skilled in the art understand the general principles and techniques for preparing pharmaceutically acceptable salts, for example those described in Berge et al., Pharm ScL, 66, 1-19. (1977).

The term "prodrug" as used herein refers to compounds that have cleavable groups and are converted by solvolysis or under physiological conditions to the compounds described herein which are pharmaceutically active in vivo, including derivatives of the compounds described herein. Prodrugs include acid derivatives well known in the art, such as esters prepared by reacting the parent acid compound with a suitable alcohol, or amides prepared by reacting the parent acid compound with a substituted or unsubstituted amine, or anhydrides or mixed anhydrides. Simple aliphatic or aromatic esters, amides, and anhydrides derived from the pendant acid groups of the compounds of the invention are particularly suitable prodrugs. Particular such prodrugs are $C_{1-8}$ alkyl, $C_{2-8}$ alkenyl, optionally substituted $C_{6-10}$ aryl and ($C_{6-10}$ aryl)-($C_{1-4}$ alkyl) esters of the compounds described herein.

The term "stereoisomer" as used herein refers to isomers formed due to at least one asymmetric center. In compounds having one or more (e.g., 1, 2, 3 or 4) asymmetric centers, it can give rise to racemic mixtures, single enantiomers, diastereomeric mixtures and individual diastereomers. Certain individual molecules may also exist as geometric isomers (cis/trans). Similarly, the compounds of the disclosure may exist as mixtures of two or more different structural forms in rapid equilibrium (often referred to as tautomers). Representative examples of tautomers include keto-enol tautomers, phenol-ketone tautomers, nitroso-oxime tautomers, imine-enamine tautomers etc. For example, a nitroso-oxime can exist in solution in equilibrium in the following tautomeric forms:

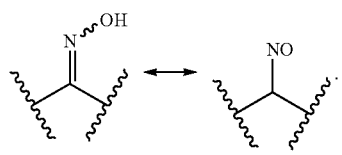

It is to be understood that the scope of this disclosure covers all such isomers or mixtures thereof in any ratio (e.g., 60%, 65%, 70%, 75%, 80%, 85%, 90%, 95%, 96%, 97%, 98%, 99%).

The compound of the invention may contain one or more asymmetric centers and thus may be prepared as (R)- or (S)-stereoisomers, respectively, or as mixtures thereof. "" or "" used herein in the structures or structure moieties indicates the relative configuration of the asymmetric center, i.e., the chiral center. Correspondingly, in the names of the compounds or intermediates provided herein, R and S are used to indicate the relative configurations of the chiral center.

The term "solvate" as used herein refers to solvent addition forms comprising stoichiometric or non-stoichiometric amounts of solvent, including, for example, solvates with water, such as hydrates, or solvates with organic solvents, such as methanol, ethanol or acetonitrile, i.e. as methanolate, ethanolate or acetonitrile, respectively; or in the form of any polymorph. It should be understood that such solvates of the compounds of the present invention also include solvates of pharmaceutically acceptable salts of the compounds of the present invention.

As used herein, the term "isotopic variant" refers to a compound wherein one or more atoms constituting the compound being replaced by an atom having an atomic mass or mass number different from the atomic mass or mass number normally found in nature. Examples of isotopes that can be incorporated into the compounds of the invention include, for example, $^2H$, $^3H$, $^{13}C$, $^{14}C$, $^{15}N$, $^{17}O$, $^{18}$, $^{31}P$, $^{32}P$, $^{35}S$, $^{18}F$, and $^{36}Cl$. In some embodiments, the incorporated isotope is 2H (deuterium); in other embodiments, the incorporated isotope is 3H (tritium). In some embodiments, the incorporated isotope is 14C. The compounds of the present disclosure may contain unnatural proportions of atomic isotopes at one or more atoms constituting the compounds, thereby forming isotopic variations of the compounds of the present invention or pharmaceutically acceptable salts thereof, which whether radioactive or not are intended to be encompassed within the scope of the present invention.

The term "RORγt-associated disease" or "RORγt-related disease" as used herein refers to a disease in which RORγt contributes to the occurrence and progression of the disease, or a disease in which inhibition of RORγt will reduce the incidence, alleviate or eliminate disease symptoms. In respect to the present disclosure, "RORγt-associated disease" is selected from inflammatory or autoimmune diseases, cancer, etc., including but not limited to psoriasis, rheumatoid arthritis, psoriatic arthritis, ankylosing spine inflammation, multiple sclerosis, systemic lupus erythematosus, graft-versus-host disease, inflammatory bowel disease, Crohn's disease, ulcerative colitis, chronic obstructive pulmonary disease, asthma, glomerulonephritis, lupus nephritis, myocarditis, thyroiditis, xerophthalmia, uveitis, Behcet's disease, allergic dermatitis, acne, scleroderma, bronchitis, dermatomyositis, allergic rhinitis, necrotizing enterocolitis (NEC), liver fibrosis, Non-alcoholic steatohepatitis (NASH), novel coronavirus pneumonia (Corona Virus Disease 2019, COVID-19), insulin-dependent type I diabetes, triple-negative breast cancer and prostate cancer, etc. Preferred indications of the present disclosure are selected from psoriasis, rheumatoid arthritis, psoriatic arthritis, ankylosing spondylitis, multiple sclerosis, inflammatory bowel disease, xerophthalmia, allergic dermatitis, chronic obstructive pulmonary disease (COPD), asthma, necrotizing enterocolitis, liver fibrosis, nonalcoholic steatohepatitis, COVID-19, triple-negative breast cancer and prostate cancer.

The term "subject" or "individual" as used herein includes human or non-human animals. Exemplary human individuals include human individuals with a disease (e.g., a disease described herein) (referred to as patients) or normal individuals. "Non-human animals" in the present disclosure include all vertebrates such as non-mammals (e.g., birds, amphibians, reptiles) and mammals such as non-human primates, livestock and/or domesticated animals (e.g., sheep, dogs, cats, cows, pigs, etc.).

The term "therapeutically effective amount" as used herein refers to an amount that, when administered to a subject to treat a disease, is sufficient to reduce or completely alleviate the symptoms or other deleterious effects of the disorder; reverse, completely stop or slow the progression of the disorder; or reduce risk of the exacerbation of the disorder. The "effective amount" will vary depending on the compound, the disease and its severity, and the age, weight, etc., of the subject to be treated.

The term "prevention" or "preventing" as used herein refers to administering one or more compounds of the present invention to a subject, e.g, a mammal, e.g, a human, which is suspected of having been afflicted or susceptible to RORγt-associated diseases as defended herein, especially inflammatory or autoimmune diseases, so as to reduce the risk of the defined diseases. The term "prevention" or "preventing" comprises the use of the compounds of the present invention before any clinical and/or pathological symptoms are diagnosed or determined.

The term "treatment" or "treating" as used herein refers to administering one or more compounds as described herein to a subject, e.g, a mammal, e.g, a human, suffering the disease, or having a symptom of the disease, for the purpose of curing, relieving, alleviating or affecting the disease or symptoms of the disease. In specific embodiments of the disclosure, the disease is a disease associated with RORγt as defined herein, especially an inflammatory or autoimmune disease.

The term "pharmaceutical combination" as used herein refers to that a compound of the present invention may be used in combination with other active agents for purposes of the present invention. The other active agent may be one or more additional compounds of the present invention, or may be a second or additional (e.g, the third) compound which is compatible with the compound of the present invention, i.e., does not adversely affect each other, or has complementary activities to the compound of the present invention. Such active agents are suitably present in combination in amounts that are effective for the purpose intended. The other active agents may be administered together with the compounds of the present invention in a unitary pharmaceutical composition, or administered separately in separate discrete units, and, when administered separately this may occur simultaneously or sequentially. Such sequential administration may be close or remote in time.

The term "pharmaceutically acceptable excipient or carrier" as used herein refers to one or more compatible solid or liquid filler or gelling substances, which are pharmacologically inactive, compatible with the other ingredients in the composition and should be acceptable for administration to wane-blooded animals, such as humans, for use as a carrier or vehicle for the compounds of the present invention in administration forms, examples of which include, but are not limited to, cellulose and its derivatives (e.g., carboxymethyl cellulose sodium, cellulose acetate, etc.), gelatin, talc, solid lubricants (e.g., magnesium stearate), calcium sulfate, vegetable oils, polyols (e.g., propylene glycol, glycerol, mannitol, sorbitol, etc.), emulsifiers (e.g., Tweens), wetting agents (e.g., sodium lauryl sulfate), colorants, flavors, stabilizers, antioxidants, preservatives, etc.

Unless otherwise specified, $C_{n-n+m}$ or $C_n$-$C_{n+m}$ in the definitions of the compound of the present invention includes each case of n to n+m carbon atoms, e.g., $C_{1-6}$ includes $C_1$, $C_2$, $C_3$, $C_4$, $C_5$ and $C_6$, also includes any range of n to n+m, e.g., $C_{1-6}$ includes $C_{1-2}$, $C_{1-3}$, $C_{1-4}$, $C_{2-6}$, $C_{3-6}$ and so on. Similarly, "n membered to n+m membered" in the definitions of the compound of the present invention means that the number of ring atoms is from n to n+m, for example, a 3-12 membered ring includes a 3 membered ring, a 4 membered ring, a 5 membered ring, a 6 membered ring, and a 12-membered ring, etc., also includes any range of n to n+m membered, for example, a 3-12 membered ring includes a 3-6 membered ring, a 3-9 membered ring, a 5-6 membered ring, a 5-7 membered ring, a 6-7 membered ring, a 6-8 membered ring and a 6-10 membered ring, etc.

It is to be understood that the dosages referred to when the compounds of the invention, pharmaceutical compositions comprising them, pharmaceutical combinations, and related uses and methods are described herein, are by weight in free thrill but not on any salt, hydrate or solvate thereof etc., unless otherwise defined in the description.

Compounds of the Present Disclosure

The terms "compound(s) of the invention/disclosure" and "compound(s) of the present invention/disclosure" as used throughout the present description, unless otherwise indicated, encompass compounds of formula (I) and stereoisomers, tautomers, stable isotopic variants, pharmaceutically acceptable salts or solvates and prodrugs thereof as defined in each embodiment and specific or preferable embodiments thereof as described herein. The stereoisomers, tautomers, stable isotopic variants, pharmaceutically acceptable salts or solvates and prodrugs are as described in the definitions section above. Preferably, a compound of the present invention is a compound of formula (I) in free form or a pharmaceutically acceptable salt or solvate thereof; most preferably is a compound of formula (I) in free form or a pharmaceutically acceptable salt thereof.

Certain compounds of the present disclosure may exist in polymorphic or amorphous forms, which also fall within the scope of the present invention. When in solid crystalline form, the compound of formula (I) may be in the form of a co-crystal with another chemical entity, and this description includes all such co-crystals.

When a chiral center is present, the compound of the present disclosure may exist as an individual enantiomer or as a mixture of enantiomers. According to one embodiment, there is provided a compound of formula (I), or a pharmaceutically acceptable salt thereof, which is a single enantiomer with an enantiomeric excess (% ee) of >95, >98%, or >99%. Preferably, a single enantiomer is present with >99% enantiomeric excess (% ee).

Specifically, in one aspect, the present disclosure provides a compound of formula (I), a stereoisomer, a tautomer, a stable isotopic variant, a pharmaceutically acceptable salt or a solvate thereof:

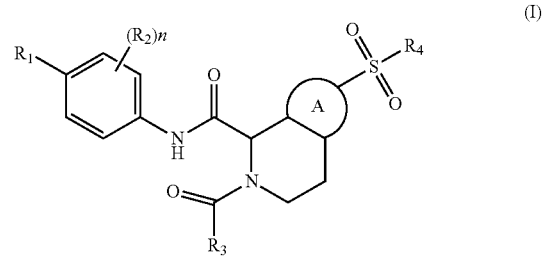

wherein:
A is aryl, cycloalkenyl or heteroaryl;
$R_1$ is selected from $C_1$-$C_6$ alkyl, $C_1$-$C_6$ alkoxy, $C_1$-$C_6$ alkylthio, $C_3$-$C_7$ cycloalkyl, 4-7 membered heterocycloalkyl, $C_5$-$C_7$ cycloalkenyl or 5-7 membered heterocycloalkenyl, wherein each of which is optionally substituted with one or more groups independently selected from: halogen, cyano, nitro, $R_a$, —C(O)$R_a$, —C(O)O$R_a$, —C(O)N$R_aR_b$, —S(O)$R_a$, —S(O)$_2R_a$, —S(O)$_2$N$R_aR_b$, —O$R_a$, —S$R_a$ or —N$R_aR_b$;
$R_2$ at each occurrence is independently selected from hydrogen, halogen, cyano, nitro, $C_1$-$C_6$ alkyl optionally substituted with halogen, $C_1$-$C_6$ alkoxy optionally substituted with halogen, or $C_1$-$C_6$ alkylthio optionally substituted with halogen;
$R_3$ is selected from hydrogen, $C_1$-$C_6$ alkyl, $C_3$-$C_7$ cycloalkyl, 4-7 membered heterocycloalkyl, —O$R_a$ or —N$R_aR_b$, wherein the $C_1$-$C_6$ alkyl, the $C_3$-$C_7$ cycloalkyl or the 4-7 membered heterocycloalkyl is optionally substituted with a group independently selected from: halogen, cyano, nitro, $R_a$, —C(O)$R_a$, —C(O)O$R_a$, —C(O)N$R_aR_b$, —S(O)$R_a$, —S(O)$_2R_a$, —S(O)$_2$N$R_aR_b$, —O$R_a$, —S$R_a$ or —N$R_aR_b$;
$R_4$ is selected from $C_1$-$C_6$ alkyl, $C_3$-$C_7$ cycloalkyl, 4-7 membered heterocycloalkyl or —N$R_aR_b$, the $C_1$-$C_6$ alkyl, the $C_3$-$C_7$ cycloalkyl or the 4-7 membered heterocycloalkyl is optionally substituted with a group independently selected from: halogen, cyano, nitro, $R_a$, —C(O)$R_a$, —C(O)O$R_a$, —C(O)N$R_aR_b$, —S(O)$R_a$, —S(O)$_2R_a$, —S(O)$_2$N$R_aR_b$, —O$R_a$, —S$R_a$ or —N$R_aR_b$;
$R_a$ and $R_b$ are each independently selected from hydrogen, $C_1$-$C_6$ alkyl, $C_3$-$C_7$ cycloalkyl or 4-7 membered heterocycloalkyl, each optionally substituted with one or more halogen, cyano or nitro; and
n is 0, 1, 2 or 3.

In one embodiment of the compound of formula (I), A is phenyl.

In one embodiment of the compound of formula (I), A is a 5-7 membered cycloalkenyl, specific examples include cyclopentenyl, cyclopentadienyl, cyclohexenyl, cyclohexadienyl, cycloheptenyl, cycloheptadienyl, cycloheptatrienyl.

In one embodiment of the compound of formula (I), A is a 5-6 membered heteroaryl comprising 1 or 2 heteroatoms independently selected from N, O or S, and specific examples include pyrrolyl, furyl, thienyl, imidazolyl, oxazolyl, isoxazolyl, thiazolyl, isothiazolyl, pyrazolyl, pyridyl, pyrazinyl, pyridazinyl and pyrimidinyl.

In one embodiment of the compound of formula (I), A is a 5 membered heteroaryl comprising 1 or 2 heteroatoms independently selected from N, O or S, and specific examples include pyrrolyl, furanyl, thiophenyl, imidazolyl, oxazolyl, isoxazolyl, thiazolyl, isothiazolyl and pyrazolyl.

In one embodiment of the compound of formula (I), A is a 5 membered heteroaryl comprising 1 heteroatom independently selected from N, O or S, and specific examples include pyrrolyl, furyl and thienyl.

In one embodiment of the compound of formula (I), $R_1$ is $C_1$-$C_6$ alkyl, preferably $C_1$-$C_3$ alkyl, substituted with one or more groups independently selected from: F, Cl, Br, I, $R_a$, —$OR_a$, —$SR_a$ or —$NR_aR_b$, wherein $R_a$ and $R_b$ are each independently selected from H or $C_1$-$C_6$ alkyl optionally substituted with one or more halogens, preferably $C_1$-$C_3$ alkyl optionally substituted with one or more halogens.

In one embodiment of the compound of formula (I), $R_1$ is $C_1$-$C_6$ alkyl, preferably $C_1$-$C_3$ alkyl, substituted with one or more groups, preferably at least three groups, independently selected from: F, Cl, Br, I, $R_a$ or —$OR_a$, wherein $R_a$ is H or $C_1$-$C_6$ alkyl substituted by one or more halogens, preferably at least 3 halogens (preferably F), preferably $C_1$-$C_3$ alkyl substituted by one or more halogens, preferably at least 3 halogens (preferably F).

In one embodiment of the compound of formula (I), $R_1$ is $C_1$-$C_3$ alkyl, substituted with at least three groups independently selected from: F, Cl, Br, I, —OH, —O—$C_1$-$C_3$ alkyl substituted with at least 3 halogens (preferably F) or $C_1$-$C_3$ alkyl substituted with at least 3 halogens (preferably F).

In one embodiment of the compound of formula (I), $R_1$ is methyl, substituted with two $C_1$-$C_3$alkyl groups substituted with at least three F and one group select from F, Cl, Br, I, —OH, —O—$C_1$-$C_3$alkyl substituted with at least three F. In a specific embodiment, $R_1$ is

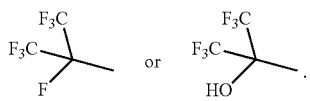

In one embodiment of the compound of formula (I), $R_1$ is $C_1$-$C_6$ alkoxy, preferably $C_1$-$C_3$alkoxy, optionally substituted with one or more groups independently selected from: F, Cl, Br, I. In a specific embodiment, $R_1$ is $C_1$-$C_3$ alkoxy substituted with one or more halogens (preferably F), preferably at least three halogens (preferably F), such as trifluoromethoxy, trifluoroethoxy, pentafluoroethoxy, pentafluoropropoxy.

In one embodiment of the compound of formula (I), $R_1$ is $C_1$-$C_6$ alkylthio, preferably $C_1$-$C_3$ alkylthio, optionally substituted with one or more groups independently selected from: F, Cl, Br, I. In a preferred embodiment, $R_1$ is $C_1$-$C_3$ alkylthio, substituted with one or more halogens (preferably F), preferably at least three halogens (preferably F), such as trifluoromethylthio, trifluoroethylthio, tetrafluoroethylthio, pentafluoropropylthio.

In one embodiment of the compound of formula (I), $R_1$ is —$NR_aR_b$, wherein $R_a$ and $R_b$ are each independently selected from H or $C_1$-$C_6$alkyl optionally substituted with one or more halogens. In a specific embodiment, $R_1$ is —$NR_aR_b$, wherein one of $R_a$ and $R_b$ is H, and the other is $C_1$-$C_6$ alkyl, preferably $C_1$-$C_3$ alkyl, substituted with one or more halogens (preferably F), preferably at least three halogens (preferably F), such as trifluoromethyl, trifluoroethyl, pentafluoropropyl. In another specific embodiment, $R_1$ is —$NR_aR_b$, wherein $R_a$ and $R_b$ are both $C_1$-$C_6$ alkyl, preferably $C_1$-$C_3$ alkyl, substituted with one or more halogens (preferably F), preferably at least three halogens (preferably F), such as trifluoromethyl, tetrafluoroethyl, pentafluoropropyl.

In one embodiment of the compound of formula (I), $R_1$ is $C_3$-$C_7$ cycloalkyl, optionally substituted with one or more groups independently selected from: halogen, $C_1$-$C_6$ alkyl substituted with one or more halogens, —OH or —O—$C_1$-$C_6$ alkyl substituted with one or more halogens. In a specific embodiment, $R_1$ is cyclopropane, cyclobutane, cyclopentane or cyclohexane, optionally substituted with one or more, such as 1, 2 or 3 groups independently selected from F, Cl, Br, I, trifluoromethyl, trifluoroethyl, tetrafluoroethyl, pentafluoropropyl, trifluoromethoxy, trifluoroethoxy, pentafluoroethoxy, pentafluoropropoxy.

In one embodiment of the compound of formula (I), $R_1$ is 4-7 membered heterocycloalkyl, optionally substituted with one or more groups independently selected from: halogen, $C_1$-$C_6$ alkyl substituted with one or more halogens, —OH or —O—$C_1$-$C_6$ alkyl substituted with one or more halogens. In a specific embodiment, $R_1$ is azetidinyl, oxetanyl, thietanyl, pyrrolidinyl (e.g., 1-pyrrolidinyl, 2-pyrrolidinyl and 3-pyrrolidinyl), tetrahydrofuranyl (e.g., 1-tetrahydrofuranyl, 2-tetrahydrofuranyl and 3-tetrahydrofuranyl), tetrahydrothienyl (e.g., 1-tetrahydrothienyl, 2-tetrahydrothienyl and 3-tetrahydrothienyl), piperidinyl (e.g., 1-piperidinyl, 2-piperidinyl, 3-piperidinyl and 4-piperidinyl), tetrahydropyranyl (e.g., 4-tetrahydropyranyl), tetrahydrothiopyranyl (e.g., 4-tetrahydrothiopyranyl), morpholinyl, thiomorpholinyl, dioxanyl, piperazinyl or azepanyl, each of which is optionally substituted with one or more groups such as 1, 2 or 3 groups independently selected from e.g. F, Cl, Br, I, trifluoromethyl, trifluoroethyl, tetrafluoroethyl, pentafluoropropyl, trifluoromethoxy, trifluoroethoxy, pentafluoroethoxy, pentafluoropropoxy.

In one embodiment of the compound of formula (I), $R_1$ is $C_5$-$C_7$ cycloalkenyl, optionally substituted with one or more groups independently selected from: halogen, $C_1$-$C_6$alkyl substituted with one or more halogens, —OH or —O—$C_1$-$C_6$alkyl substituted with one or more halogens. In a specific embodiment, $R_1$ is e.g., cyclopentenyl, cyclopentadienyl, cyclohexenyl, cyclohexadienyl, cycloheptenyl, cycloheptadienyl, cycloheptatrienyl, each of which is optionally substituted with one or more groups, such as 1, 2 or 3 groups, e.g., independently selected from F, Cl, Br, I, trifluoromethyl, trifluoroethyl, tetrafluoroethyl, pentafluoropropyl, trifluoromethoxy, trifluoroethoxy, pentafluoroethoxy, pentafluoropropoxy.

In one embodiment of the compound of formula (I), $R_1$ is 5-7 membered heterocycloalkenyl, optionally substituted with one or more groups independently selected from: halogen, $C_1$-$C_6$ alkyl substituted with one or more halogens, —OH or —O—$C_1$-$C_6$ alkyl substituted with one or more halogens. In a specific embodiment, $R_1$ is selected from

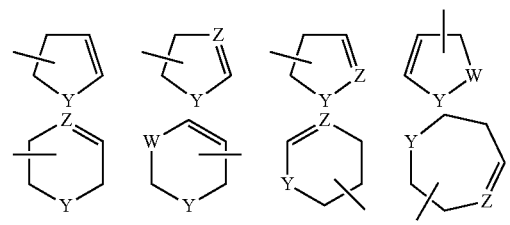

wherein each W is selected from $CH_2$, NH, O and S, each Y is selected from NH, O, C(=O), $SO_2$ and S; and each Z is selected from N and CH, provided that each ring comprises at least one heteroatom selected from O, N or S, and each of which is optionally substituted with one or more groups, such as 1, 2 or 3 groups independently selected from e.g., F, Cl, Br, I, trifluoromethyl, trifluoroethyl, pentafluoroethyl, pentafluoropropyl, trifluoromethoxy, trifluoroethoxy, pentafluoroethoxy, pentafluoropropoxy. In a more specific embodiment, $R_1$ is cyclopentenyl, cyclohexenyl or cycloheptenyl, comprising one heteroatom selected from N, O or S, such as

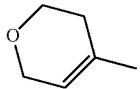

In one embodiment of the compound of formula (I), $R_2$ is hydrogen.

In one embodiment of the compound of formula (I), n is 1, and $R_2$ at each occurrence is independently selected from halogen, or $C_1$-$C_6$ alkyl substituted with one or more halogens (preferably F). In a specific embodiment, $R_2$ at each occurrence is independently selected from halogen, preferably F or Cl.

In one embodiment of the compound of formula (I), n is 2, and $R_2$ at each occurrence is independently selected from halogen, or $C_1$-$C_6$ alkyl substituted with one or more halogens (preferably F). In a specific embodiment, $R_2$ at each occurrence is independently selected from halogen, preferably F or Cl.

In one embodiment of the compound of formula (I), $R_3$ is $C_1$-$C_6$ alkyl, preferably $C_1$-$C_3$ alkyl, such as methyl, ethyl, propyl or isopropyl.

In one embodiment of the compound of formula (I), $R_3$ is $C_1$-$C_6$ alkyl, preferably $C_1$-$C_3$ alkyl, optionally substituted with —C(O)OR$_a$ or —C(O)NR$_a$R$_b$, wherein R$_a$ and R$_b$ are each independently selected from H or $C_1$-$C_3$ alkyl optionally substituted with one or more halogens (preferably F). In a more specific embodiment, $R_3$ is e.g., methyl, ethyl, propyl, isopropyl, —CH$_2$COOH, —CH$_2$CH$_2$COOH, —CH$_2$CH$_2$CH$_2$COOH, —CH$_2$—COOCH$_3$, —CH$_2$—CH$_2$—COOCH$_3$, —CH$_2$—COOCF$_3$, —CH$_2$—CH$_2$—COOCF$_3$, —CH$_2$C(O)NH$_2$, —CH$_2$C(O)NHCH$_3$, —CH$_2$C(O)N(CH$_3$)$_2$ etc.

In one embodiment of the compounds of formula (I), $R_3$ is —$C_1$-$C_6$ alkyl, preferably $C_1$-$C_3$ alkyl, optionally substituted with F, Cl, Br, I, R$_a$ or —OR$_a$, wherein R$_a$ is H or $C_1$-$C_3$ alkyl optionally substituted with one or more halogens (preferably F). Specific examples include, but are not limited to, methyl, ethyl, propyl, isopropyl, —CF$_3$, —CH$_2$CF$_3$, —CH$_2$OH, —CH$_2$CH$_2$OH, —CH$_2$OCH$_3$, —CH$_2$CH$_2$OCH$_3$, —CH$_2$OCF$_3$ or —CH$_2$CH$_2$OCF$_3$ etc.

In one embodiment of the compound of formula (I), $R_3$ is —$C_1$-$C_6$ alkyl, preferably $C_1$-$C_3$ alkyl, optionally substituted with $C_3$-$C_7$ cycloalkyl optionally substituted with halogen (preferably F). Specific examples include, but are not limited to, methyl, ethyl, propyl, isopropyl, cyclopropylmethyl, cyclopropylethyl, cyclobutylmethyl, cyclobutylethyl, cyclopentylmethyl, cyclopentyl ethyl, etc.

In one embodiment of the compound of formula (I), $R_3$ is —$C_1$-$C_6$ alkyl, preferably $C_1$-$C_3$ alkyl, optionally substituted with —NR$_a$R$_b$, wherein R$_a$ and R$_b$ are independently selected from H or $C_1$-$C_3$ alkyl optionally substituted with one more halogen (preferably F). Specific examples include, but are not limited to, methyl, ethyl, propyl, isopropyl, aminomethyl, aminoethyl, aminopropyl, methylaminomethyl, dimethylaminomethyl, methylethylamino methyl, etc.

In one embodiment of the compound of formula (I), $R_3$ is $C_3$-$C_7$ cycloalkyl, optionally substituted with groups independently selected from: halogen, R$_a$, —NR$_a$R$_b$, —C(O)OR$_a$ or —C(O)NR$_a$R$_b$, wherein R$_a$ and R$_b$ are each independently selected from H or $C_1$-$C_6$ alkyl optionally substituted with one or more halogen (preferably F). In a specific embodiment, $R_3$ is cyclopropyl, cyclobutyl, cyclopentyl or cyclohexyl.

In one embodiment of the compound of formula (I), $R_3$ is —OR$_a$ or —NR$_a$R$_b$, wherein R$_a$ and R$_b$ are each independently selected from H, $C_1$-$C_6$ alkyl, $C_3$-$C_7$ cycloalkyl or 4-7 membered heterocycloalkyl, each is optionally substituted with one or more halogens. In a specific embodiment, $R_3$ is —NR$_a$R$_b$, wherein R$_a$ and R$_b$ are each independently selected from H or $C_1$-$C_3$ alkyl optionally substituted with one or more halogens (preferably F). In a more specific embodiment, $R_3$ is e.g., —NH$_2$, —NHCH$_3$, —NCH$_3$CH$_3$, —N(CH$_2$CH$_3$)CH$_3$ or —N(CH$_2$CH$_3$)(CH$_2$CH$_3$) etc.

In one embodiment of the compound of formula (I), $R_4$ is $C_1$-$C_6$ alkyl, preferably $C_1$-$C_3$ alkyl, optionally substituted with one or more halogens (preferably F), such as methyl, ethyl, propyl, isopropyl, trifluoromethyl, trifluoroethyl, tetrafluoroethyl, pentafluoropropyl etc. In a more specific embodiment, $R_4$ is selected from $C_1$-$C_3$ alkyl, such as methyl, ethyl, propyl or isopropyl.

In one embodiment of the compound of formula (I), $R_4$ is $C_1$-$C_6$ alkyl, preferably $C_1$-$C_3$ alkyl, optionally substituted with groups independently selected from: R$_a$, —C(O)OR$_a$, —C(O)NR$_a$R$_b$, —OR$_a$ or —NR$_a$R$_b$, wherein R$_a$ and R$_b$ are each independently selected from H, $C_1$-$C_6$ alkyl or $C_3$-$C_7$ cycloalkyl, optionally substituted with one or more halogens (preferably F).

In a specific embodiment, $R_4$ is $C_1$-$C_6$ alkyl, preferably $C_1$-$C_3$ alkyl, optionally substituted with R$_a$, wherein R$_a$ is selected from H, $C_1$-$C_3$ alkyl optionally substituted with one or more halogens (preferably F) or $C_3$-$C_7$ cycloalkyl optionally substituted with one or more halogens (preferably F), such as methyl, ethyl, propyl, isopropyl, —CH$_2$—CF$_3$, —CH$_2$-cyclopropyl, —CH$_2$-cyclobutyl, —CH$_2$-cyclopentyl, —CH$_2$—CH$_2$-cyclopropyl, —CH$_2$—CH$_2$-cyclobutyl, —CH$_2$—CH$_2$-cyclopentyl etc.

In a specific embodiment, $R_4$ is $C_1$-$C_6$ alkyl, preferably $C_1$-$C_3$ alkyl, optionally substituted with —OR$_a$ or —NR$_a$R$_b$, wherein R$_a$ and R$_b$ are each independently selected from H or $C_1$-$C_3$ alkyl optionally substituted with one or more halogens or $C_3$-$C_7$ cycloalkyl optionally substituted with one or more halogens. In a specific embodiment, $R_4$ is selected from $C_1$-$C_3$ alkyl, optionally substituted with —NR$_a$R$_b$, wherein R$_a$ and R$_b$ are each independently selected from H or $C_1$-$C_3$ alkyl optionally substituted with one or more halogens (preferably F). Specific examples include, but are not limited to, methyl, ethyl, propyl, isopropyl, aminomethyl, aminoethyl, aminopropyl, methylaminomethyl, dimethylaminomethyl, methylethylaminomethyl, etc.

In one embodiment of the compound of formula (I), $R_4$ is $C_3$-$C_7$ cycloalkyl, optionally substituted with groups independently selected from: halogen, R$_a$, —C(O)OR$_a$, —C(O)NR$_a$R$_b$, —OR$_a$ or —NR$_a$R$_b$, wherein R$_a$ and R$_b$ are each independently selected from H, $C_1$-$C_6$ alkyl optionally substituted with one or more halogens (preferably F) or $C_3$-$C_7$ cycloalkyl optionally substituted with one or more halogens (preferably F).

In a specific embodiment, $R_4$ is $C_3$-$C_7$ cycloalkyl, optionally substituted with groups independently selected from: halogen, R$_a$, —OR$_a$ or —NR$_a$R$_b$, wherein R$_a$ and R$_b$ are each independently selected from H or $C_1$-$C_6$ alkyl optionally substituted with one or more halogens (preferably F). In a more specific embodiment, $R_4$ is $C_3$-$C_7$ cycloalkyl, optionally substituted with groups independently selected from:

halogen, $C_1$-$C_6$ alkyl optionally substituted with one or more halogens (preferably F) or —$NR_aR_b$, wherein $R_a$ and $R_b$ are each independently selected from H or $C_1$-$C_3$ alkyl optionally substituted with one or more halogens (preferably F). In a more specific embodiment, $R_4$ is cyclopropyl, cyclobutyl, cyclopentyl or cyclohexyl, each is optionally substituted with one or more, such as 1, 2 or 3 groups independently selected from e.g., F, Cl, Br, I, methyl, ethyl, propyl, isopropyl, —$CF_3$, —$CH_2CF_3$, —$NH_2$, —$NHCH_3$, —$NCH_3CH_3$, —$N(CH_2CH_3)CH_3$ or —$N(CH_2CH_3)(CH_2CH_3)$.

In one embodiment of the compound of formula (I), $R_4$ is selected from 4-7 membered heterocycloalkyl, optionally substituted with groups independently selected from: halogen, $R_a$, —$C(O)OR_a$, —$C(O)NR_aR_b$, —$OR_a$ or —$NR_aR_b$, wherein $R_a$ and $R_b$ are each independently selected from H, $C_1$-$C_6$ alkyl optionally substituted with one or more halogens (preferably F) or $C_3$-$C_7$ cycloalkyl optionally substituted with one or more halogens (preferably F).

In a specific embodiment, $R_4$ is 4-7 membered heterocycloalkyl, optionally substituted with groups independently selected from: halogen, $R_a$, —$OR_a$ or —$NR_aR_b$, wherein $R_a$ and $R_b$ are each independently selected from H or $C_1$-$C_6$ alkyl optionally substituted with one or more halogens (preferably F). In a more specific embodiment, $R_4$ is 4-7 membered heterocycloalkyl optionally substituted with groups independently selected from: halogen, $C_1$-$C_6$ alkyl optionally substituted with one or more halogens (preferably F) or —$NR_aR_b$, wherein $R_a$ and $R_b$ are each independently selected from H or $C_1$-$C_3$ alkyl optionally substituted with one or more halogens (preferably F).

In a more specific embodiment, $R_4$ is selected from e.g., azetidinyl, oxetanyl, thietanyl, pyrrolidinyl (e.g., 1-pyrrolidinyl, 2-pyrrolidinyl and 3-pyrrolidinyl), tetrahydrofuranyl (e.g., 1-tetrahydrofuranyl, 2-tetrahydrofuranyl and 3-tetrahydrofuranyl), tetrahydrothienyl (e.g., 1-tetrahydrothienyl, 2-tetrahydrothienyl and 3-tetrahydrothienyl) thienyl), piperidinyl (e.g., 1-piperidinyl, 2-piperidinyl, 3-piperidinyl and 4-piperidinyl), tetrahydropyranyl (e.g., 4-tetrahydropyranyl), tetrahydrothiopyranyl (e.g., 4-tetrahydrothiopyranyl), thiomorpholinyl, dioxanyl, piperazinyl or azepanyl, each of which is optionally substituted with one or more, such as 1, 2 or 3 groups independently selected from F, Cl, Br, I, methyl, ethyl, propyl, isopropyl, —$CF_3$, —$CH_2CF_3$, —$NH_2$, —$NHCH_3$, —$NCH_3CH_3$, —$N(CH_2CH_3)CH_3$ or —$N(CH_2CH_3)(CH_2CH_3)$.

In one embodiment of the compound of formula (I), $R_4$ is selected from —$NR_aR_b$, wherein $R_a$ and $R_b$ are each independently selected from H or $C_1$-$C_6$ alkyl optionally substituted with one or more halogens (preferably F). In specific embodiments, $R_4$ is selected from e.g., —$NH_2$, —$NHCH_3$, —$NCH_3CH_3$, —$N(CH_2CH_3)CH_3$, —$N(CH_2CH_3)(CH_2CH_3)$—, —$NHCF_3$, —$N(CH_3)CF_3$, —$N(CF_3)CF_3$, —$N(CH_2CF_3)CF_3$ or —$N(CH_2CF_3)(CH_2CF_3)$.

It should be noted that the compound of formula (I) of the present disclosure covers each independent embodiment or each specific embodiment as mentioned above, and also covers the embodiments formed by any combination or sub-combination of each independent embodiment or each specific embodiment as mentioned above, and also covers the embodiments formed by any combination of any preferred or exemplified embodiment as mentioned above.

Preferably, the compound of formula (I) of the present disclosure is a compound of formula (Ia), especially formula (Ia'), a stereoisomer, a tautomer, a stable isotopic variant, a pharmaceutically acceptable salt or a solvate thereof,

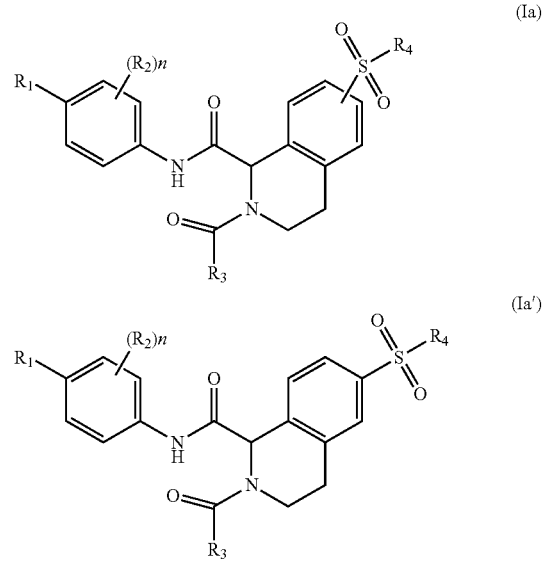

wherein $R_1$, $R_2$, $R_3$, $R_4$ and n each has the definitions as defined herein for the general or specific embodiments of compounds of formula (I).

More preferably, the compound of formula (I) of the present disclosure is a compound of formula (Ia), especially formula (Ia'), a stereoisomer, a tautomer, a stable isotopic variant, a pharmaceutically acceptable salt or a solvate thereof, wherein
- $R_1$ is selected from $C_1$-$C_6$ alkyl, $C_1$-$C_6$ alkoxy or 5-7 membered heterocycloalkenyl, wherein each of which is optionally substituted with one or more groups independently selected from: halogen, $R_a$ or —$OR_a$;
- $R_2$ at each occurrence is independently selected from hydrogen, halogen or $C_1$-$C_6$ alkyl optionally substituted with halogen;
- $R_3$ is selected from hydrogen, $C_1$-$C_6$ alkyl, $C_3$-$C_7$ cycloalkyl or —$NR_aR_b$, wherein the $C_1$-$C_6$ alkyl or the $C_3$-$C_7$ cycloalkyl is optionally substituted with a group independently selected from: halogen, $R_a$, —$C(O)OR_a$, —$C(O)NR_aR_b$, —$S(O)_2NR_aR_b$, —$OR_a$ or —$NR_aR_b$;
- $R_4$ is selected from $C_1$-$C_6$ alkyl or —$NR_aR_b$, the $C_1$-$C_6$ alkyl is optionally substituted with a group independently selected from: $R_a$, halogen, —$OR_a$ or —$NR_aR_b$;
- $R_a$ and $R_b$ are each independently selected from H, or $C_1$-$C_6$ alkyl optionally substituted with one or more halogens, or $C_3$-$C_7$ cycloalkyl optionally substituted with one or more halogens; and
- n is 0, 1 or 2.

In one specific embodiment of the abovementioned more preferred compound of formula (Ia), especially formula (Ia'), $R_1$ is $C_1$-$C_6$ alkyl, preferably $C_1$-$C_3$ alkyl, which is substituted with at least 3 groups independently selected from: halogen, $R_a$ or —$OR_a$, wherein $R_a$ is H or $C_1$-$C_3$ alkyl substituted with one or more halogens. In a more specific embodiment, $R_1$ is $C_1$-$C_3$ alkyl, which is substituted with two $C_1$-$C_3$ alkyl substituted with at least 3 halogens (preferably F) and one group independently selected from halogen (preferably F) or —OH, for example. $R_1$ is methyl, ethyl or propyl, the substituents are two trifluoromethyl or trifluoroethyl groups and one halogen, or the substituents are two trifluoromethyl or trifluoroethyl groups and one —OH.

In one specific embodiment, $R_1$ is methyl, which is substituted with two $C_1$-$C_3$ alkyl groups substituted with at least three F and one group selected from F, Cl, Br, I or —OH. In a specific embodiment, $R_1$ is

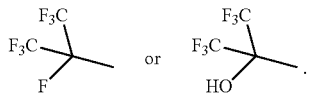

In one specific embodiment of the abovementioned more preferred compound of formula (Ia), especially formula (Ia'), $R_1$ is $C_1$-$C_6$alkoxy substituted with one or more halogens. In a more specific embodiment, $R_1$ is $C_1$-$C_3$alkoxy, substituted with one or more halogens, preferably three halogens (preferably F), such as trifluoromethoxy, trifluoroethoxy, trifluoropropoxy, pentafluoroethoxy.

In one specific embodiment of the above-mentioned more preferred compound of formula (Ia), especially formula (Ia'), $R_1$ is 5-7 membered heterocycloalkenyl optionally substituted with one or more groups independently selected from: halogen, $R_a$ or —$OR_a$, wherein $R_a$ is H or $C_1$-$C_3$ alkyl substituted with one or more halogens. In a more specific embodiment, $R_1$ is cyclopentenyl or cyclohexenyl group containing 1 heteroatom selected from N, O or S, such as

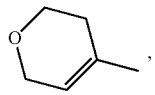

optionally substituted with one or more groups independently selected from: halogen (preferably F), $R_a$ or —$OR_a$, wherein $R_a$ is H or $C_1$-$C_3$ alkyl substituted with one or more halogens (preferably F).

In one specific embodiment of the above-mentioned more preferred compound of formula (Ia), especially formula (Ia'), $R_2$ at each occurrence is independently selected from hydrogen or halogen. In a more specific embodiment, $R_2$ is H. In a more specific embodiment, n=1 and $R_2$ at each occurrence is independently selected from halogen preferably F or Cl. In a more specific embodiment, n=2 and $R_2$ at each occurrence is independently selected from halogen, preferably F or Cl.

In one specific embodiment of the above-mentioned more preferred compound of formula (Ia), especially formula (Ia'), $R_3$ is H.

In one specific embodiment of the above-mentioned more preferred compound of formula (Ia), especially formula (Ia'), $R_3$ is $C_1$-$C_6$ alkyl, preferably $C_1$-$C_3$ alkyl, such as methyl, ethyl, propyl or isopropyl.

In one specific embodiment of the above-mentioned more preferred compound of formula (Ia), especially formula (Ia'), $R_3$ is $C_1$-$C_6$ alkyl, preferably $C_1$-$C_3$ alkyl, optionally substituted with —C(O)$OR_a$ or —C(O)$NR_aR_b$, wherein $R_a$ and $R_b$ are each independently selected from H or $C_1$-$C_3$ alkyl optionally substituted with one or more halogens (preferably F). In a more specific embodiment, $R_3$ is, e.g., methyl, ethyl, propyl, isopropyl, —CH$_2$COOH, —CH$_2$CH$_2$COOH, —CH$_2$CH$_2$CH$_2$COOH, —CH$_2$—COOCH$_3$, —CH$_2$—CH$_2$—COOCH$_3$, —CH$_2$—COOCF$_3$, —CH$_2$—CH$_2$—COOCF$_3$, —CH$_2$C(O)NH$_2$, —CH$_2$C(O)NHCH$_3$, —CH$_2$C(O)N(CH$_3$)$_2$, etc.

In one specific embodiment of the above-mentioned more preferred compound of formula (Ia), especially formula (Ia'), $R_3$ is —$C_1$-$C_6$ alkyl, preferably $C_1$-$C_3$ alkyl, optionally substituted with —$NR_aR_b$, wherein $R_a$ and $R_b$ are each independently selected from H or $C_1$-$C_3$ alkyl optionally substituted with one or more halogens (preferably F). Specific examples include, but are not limited to, methyl, ethyl, propyl, isopropyl, aminomethyl, aminoethyl, aminopropyl, methylaminomethyl, dimethylaminomethyl, methylethylamino methyl, etc.

In one specific embodiment of the above-mentioned more preferred compound of formula (Ia), especially formula (Ia'), $R_3$ is $C_1$-$C_6$ alkyl, preferably $C_1$-$C_3$ alkyl, substituted with $C_3$-$C_7$ cycloalkyl optionally substituted with halogen (preferably F). Specific examples include, but are not limited to, cyclopropylmethyl, cyclopropylethyl, cyclobutylmethyl, cyclobutylethyl, cyclopentylmethyl, cyclopentylethyl, etc.

In one specific embodiment of the above-mentioned more preferred compound of formula (Ia), especially formula (Ia'), $R_3$ is $C_3$-$C_7$ cycloalkyl optionally substituted with groups independently selected from: halogen, $R_a$, —C(O)$OR_a$ or —$NR_aR_b$, wherein $R_a$ and $R_b$ are each independently selected from H or $C_1$-$C_3$ alkyl optionally substituted with one or more halogens (preferably F). In a more specific embodiment, $R_3$ is $C_3$-$C_5$ cycloalkyl, such as cyclopropyl, cyclobutyl, cyclopentyl.

In one specific embodiment of the above-mentioned more preferred compound of formula (Ia), especially formula (Ia'), $R_3$ is —$NR_aR_b$, wherein $R_a$ and $R_b$ are each independently selected from H or $C_1$-$C_3$ alkyl optionally substituted with one or more halogens (preferably F), such as —NH$_2$, —NHCH$_3$, —NCH$_3$CH$_3$, —N(CH$_2$CH$_3$)CH$_3$, —N(CH$_2$CH$_3$)(CH$_2$CH$_3$)—, —NHCF$_3$, —N(CH$_3$)CF$_3$, —N(CF$_3$)CF$_3$, —N(CH$_2$CF$_3$)CF$_3$ or —N(CH$_2$CF$_3$)(CH$_2$CF$_3$)—.

In one specific embodiment of the above-mentioned more preferred compound of formula (Ia), especially formula (Ia'), $R_4$ is $C_1$-$C_6$ alkyl, preferably $C_1$-$C_3$ alkyl, optionally substituted with one or more halogens (preferably F), such as methyl, ethyl, propyl, isopropyl, trifluoromethyl, trifluoroethyl, tetrafluoroethyl, pentafluoropropyl, etc. In a more specific embodiment, $R_4$ is selected from $C_1$-$C_3$ alkyl, such as methyl, ethyl, propyl or isopropyl.

In one specific embodiment of the above-mentioned more preferred compound of formula (Ia), especially formula (Ia'), $R_4$ is $C_1$-$C_6$ alkyl, preferably $C_1$-$C_3$ alkyl, optionally substituted with $C_1$-$C_3$ alkyl optionally substituted with one or more halogens (preferably F) or $C_3$-$C_7$ cycloalkyl optionally substituted with one or more halogens (preferably F), such as methyl, ethyl, propyl, isopropyl, —CH$_2$—CF$_3$, —CH$_2$-cyclopropyl, —CH$_2$-cyclobutyl, —CH$_2$-cyclopentyl, —CH$_2$—CH$_2$-cyclopropyl, —CH$_2$—CH$_2$-cyclobutyl, —CH$_2$—CH$_2$-cyclopentyl, etc.

In one specific embodiment of the above-mentioned more preferred compound of formula (Ia), especially formula (Ia'), $R_4$ is $C_1$-$C_6$ alkyl, preferably $C_1$-$C_3$ alkyl, optionally substituted with —$NR_aR_b$, wherein $R_a$ and $R_b$ are each independently selected from H or $C_1$-$C_3$ alkyl optionally substituted with one or more halogens (preferably F), such as —CH$_2$NH$_2$, —CH$_2$CH$_2$NH$_2$, —CH$_2$NHCH$_3$, —CH$_2$N(CH$_3$)$_2$, —CH$_2$N(CH$_2$CH$_3$)CH$_3$, —CH$_2$N(CH$_2$CH$_3$)(CH$_2$CH$_3$)—, —CH$_2$NHCF$_3$, —CH$_2$N(CH$_3$)CF$_3$, —CH$_2$N(CF$_3$)CF$_3$, —CH$_2$N(CH$_2$CF$_3$)CF$_3$ or —CH$_2$N(CH$_2$CF$_3$)(CH$_2$CF$_3$), etc.

In one specific embodiment of the above mentioned more preferred compound of formula (Ia), especially formula (Ia'), $R_4$ is selected from —$NR_aR_b$, wherein $R_a$ and $R_b$ are each independently selected from H or $C_1$-$C_6$ alkyl optionally substituted with one or more halogens (preferably F). In a specific embodiment, $R_4$ is selected from e.g., —NH$_2$, —NHCH$_3$, —N(CH$_3$)$_2$, —N(CH$_2$CH$_3$)CH$_3$, —N(CH$_2$CH$_3$)

$(CH_2CH_3)-$, $-NHCF_3$, $-N(CH_3)CF_3$, $-N(CF_3)CF_3$, $-N(CH_2CF_3)CF_3$ or $-N(CH_2CF_3)(CH_2CF_3)-$.

In one specific embodiment of the above-mentioned more preferred compound of formula (Ia), especially formula (Ia'), n is 0.

In one specific embodiment of the above-mentioned more preferred compound of formula (Ia), especially formula (Ia'), n is 1.

In one specific embodiment of the above-mentioned more preferred compound of formula (Ia), especially formula (Ia'), n is 2.

It should be noted that, the above-mentioned more preferred compound of formula (Ia), especially formula (Ia') covers each independent embodiment or each specific embodiment as mentioned above, and also covers the embodiments formed by any combination or sub-combination of each independent embodiment or each specific embodiment as mentioned above.

Most preferably, the compound of formula (I) of the present disclosure is a compound of formula (Ia''), a stereoisomer, a tautomer, a stable isotopic variant, a pharmaceutically acceptable salt or a solvate thereof,

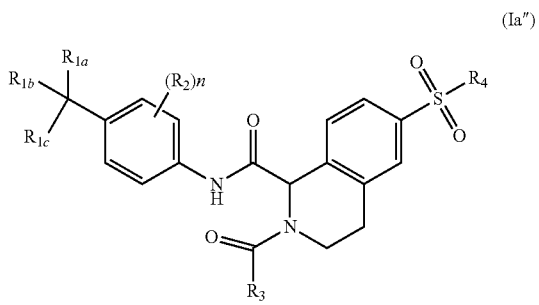

(Ia'')

wherein:
- any two of $R_{1a}$, $R_{1b}$, $R_{1c}$ are selected from $C_1$-$C_6$ alkyl substituted with one or more halogens, and the remaining of $R_{1a}$, $R_{1b}$, $R_{1c}$ is independently selected from halogen or $-OR_a$;
- $R_2$ at each occurrence is independently selected from hydrogen, halogen or $C_1$-$C_6$ alkyl optionally substituted with halogen;
- $R_3$ is selected from hydrogen, $C_1$-$C_6$ alkyl, $C_3$-$C_7$ cycloalkyl or $-NR_aR_b$, wherein the $C_1$-$C_6$ alkyl or the $C_3$-$C_7$ cycloalkyl is optionally substituted with a group independently selected from: $-C(O)OR_a$, $-C(O)NR_aR_b$, $-S(O)_2NR_aR_b$, $-OR_a$ or $-NR_aR_b$;
- $R_4$ is selected from $C_1$-$C_6$ alkyl;
- $R_a$ and $R_b$ are each independently selected from H or $C_1$-$C_6$ alkyl optionally substituted with one or more halogens, and
- n is 0, 1 or 2.

In one specific embodiment of the above-mentioned most preferred compound of formula (Ia''), any two of $R_{1a}$, $R_{1b}$, $R_{1c}$ are $C_1$-$C_3$ alkyl substituted with at least 3 halogens (preferably F) and the remaining is independently selected from halogen (preferably F), $-OH$ or $C_1$-$C_3$ alkoxy substituted by one or more halogens (preferably F), such as

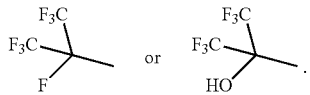

In one specific embodiment of the above-mentioned most preferred compound of formula (Ia''), $R_2$ at each occurrence is independently selected from hydrogen or halogen. In a more specific embodiment, $R_2$ is H. In a more specific embodiment, n=1 and $R_2$ at each occurrence is independently selected from halogen, preferably F or Cl. In a more specific embodiment, n=2 and $R_2$ at each occurrence is independently selected from halogen, preferably F or Cl.

In one specific embodiment of the above-mentioned most preferred compound of formula (Ia''), $R_3$ is H.

In one specific embodiment of the above-mentioned most preferred compound of formula (Ia''), $R_3$ is $C_1$-$C_6$ alkyl, preferably $C_1$-$C_3$ alkyl, such as methyl, ethyl, propyl or isopropyl.

In one specific embodiment of the above-mentioned most preferred compound of formula (Ia''), $R_3$ is $C_1$-$C_6$ alkyl, preferably $C_1$-$C_3$ alkyl, optionally substituted with groups independently selected from: $-C(O)OR_a$ or $-NR_aR_b$, wherein $R_a$ and $R_b$ are each independently selected from H or $C_1$-$C_3$ alkyl optionally substituted with one or more halogens (preferably F), such as methyl, ethyl, propyl, isopropyl, aminomethyl, aminoethyl, aminopropyl, methylaminomethyl, dimethylaminomethyl, methylethylaminomethyl, $-CH_2COOH$, $-CH_2CH_2COOH$, $-CH_2CH_2CH_2COOH$, $-CH_2-COOCH_3$, $-CH_2-CH_2-COOCH_3$, $-CH_2-COOCF_3$, $-CH_2-CH_2-COOCF_3$, etc.

In one specific embodiment of the above-mentioned most preferred compound of formula (Ia''), $R_3$ is $C_3$-$C_7$ cycloalkyl optionally substituted with groups independently selected from: $-C(O)OR_a$ or $-NR_aR_b$, wherein $R_a$ and $R_b$ are each independently selected from H or $C_1$-$C_3$ alkyl optionally substituted with one or more halogens (preferably F). In a more specific embodiment, $R_3$ is $C_3$-$C_7$ cycloalkyl, such as cyclopropyl, cyclobutyl or cyclopentyl.

In one specific embodiment of the above-mentioned most preferred compound of formula (Ia''), $R_3$ is $-NR_aR_b$, wherein $R_a$ and $R_b$ are each independently selected from H or $C_1$-$C_3$ alkyl optionally substituted with one or more halogens (preferably F), such as $-NH_2$, $-NHCH_3$, $-NCH_3CH_3$, $-N(CH_2CH_3)CH_3$, $-N(CH_2CH_3)(CH_2CH_3)$, $-NHCF_3$, $-N(CH_3)CF_3$, $-N(CF_3)CF_3$, $-N(CH_2CF_3)CF_3$ or $-N(CH_2CF_3)(CH_2CF_3)$.

In one specific embodiment of the above-mentioned most preferred compound of formula (Ia''), $R_4$ is $C_1$-$C_6$ alkyl, preferably $C_1$-$C_3$ alkyl, such as methyl, ethyl, propyl, isopropyl, butyl, isobutyl or tert-butyl.

In one specific embodiment of the above-mentioned most preferred compound of formula (Ia''), n is 0.

In one specific embodiment of the above-mentioned most preferred compound of formula (Ia''), n is 1.

In one specific embodiment of the above-mentioned most preferred compound of formula (Ia''), n is 2.

It should be noted that, the above-mentioned most preferred compound of formula (Ia''), covers each independent embodiment or each specific embodiment as mentioned above, and also covers the embodiments formed by any combination or sub-combination of each independent embodiment or each specific embodiment as mentioned above.

The first aspect of the present disclosure also provides the compound of formula (Ib) as follows, a stereoisomer, a tautomer, a stable isotopic variant, a pharmaceutically acceptable salt or a solvate thereof, which is also a subset of the compound of formula (I),

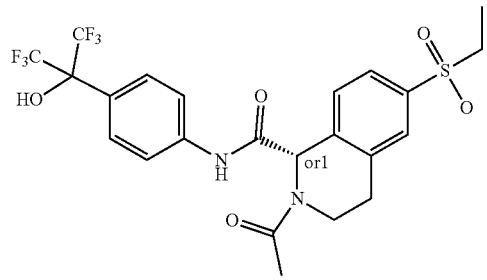

(Ib)

wherein:
X$_1$ and X$_2$ are each independently selected from C, N, O or S, provided that (1) X$_1$ and X$_2$ are not both O and/or S, and (2) at least one of X$_1$ and X$_2$ is selected from N, O or S;
R$_1$, R$_2$, R$_3$, R$_4$ and n have the definitions as defined above for the compound of formula (I).

In one embodiment of the compound of formula (Ib), X$_1$ is selected from N, O S, X$_2$ is CH.

In one embodiment of the compound of formula (Ib), R$_1$, R$_2$, R$_3$, R$_4$ and n have the definitions as defined above in each embodiment or specific embodiment of the more preferred compounds of formula (Ia).

In one embodiment of the compound of formula (Ib), R$_1$, R$_2$, R$_3$, R$_4$ and n have the definitions as defined above in each embodiment or specific embodiment of the most preferred compounds of formula (Ia″).

It should be noted that, the above-mentioned compound of formula (Ib), covers each independent embodiment or each specific embodiment as mentioned above, and also covers the embodiments formed by any combination or sub-combination of each independent embodiment or each specific embodiment as mentioned above.

Specific embodiments of the compound of the present disclosure include, but are not limited to, the following compounds, stereoisomers, tautomers, stable isotopic variants, pharmaceutically acceptable salts or solvates thereof,

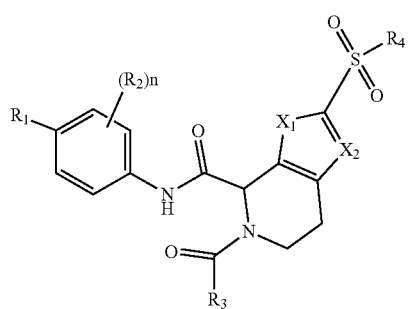

1

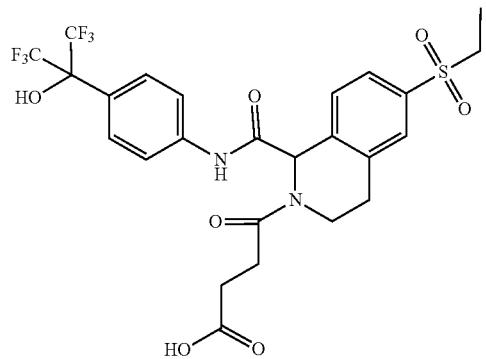

2

3

4

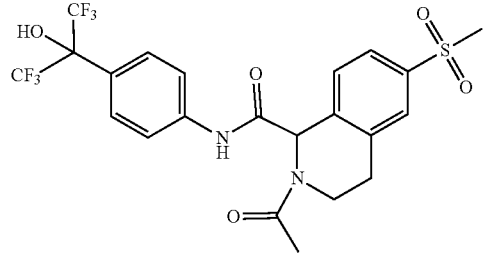

5

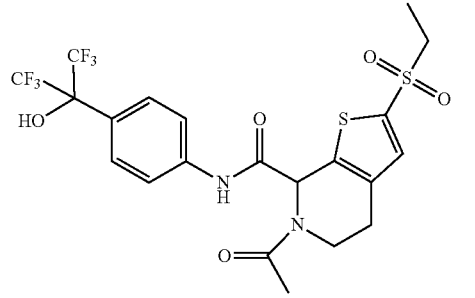

6

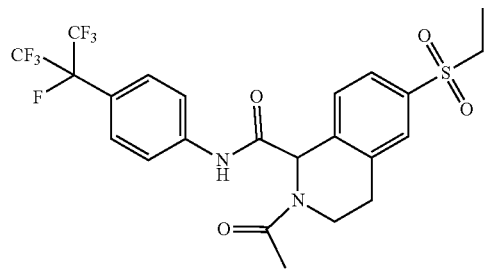

7

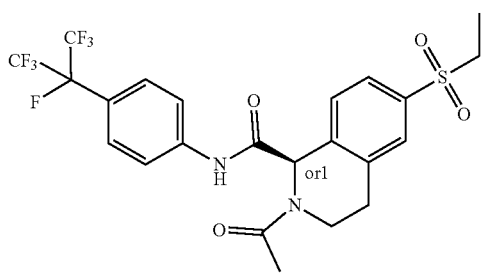
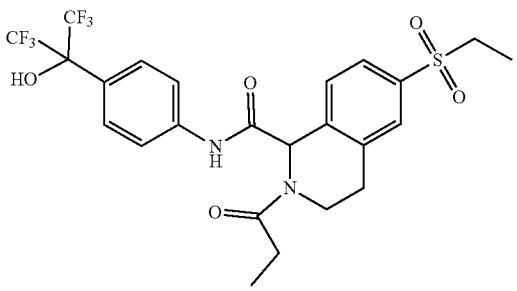
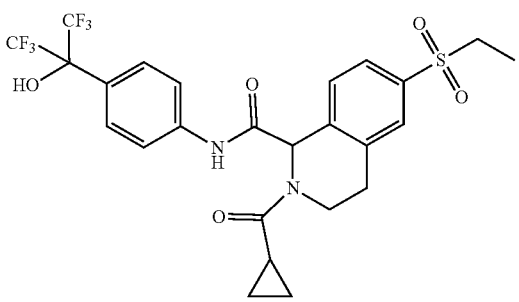
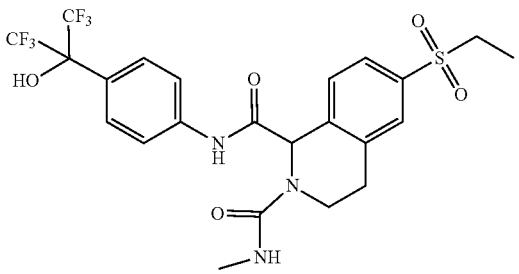
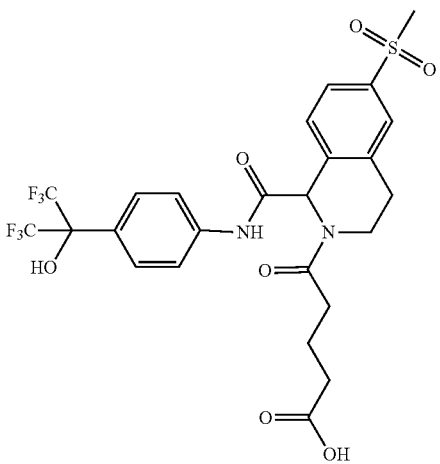

27

-continued

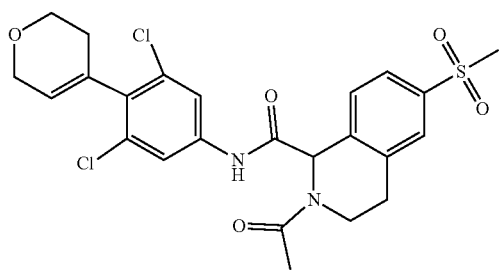

17

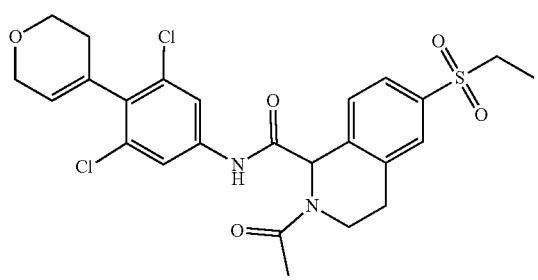

18

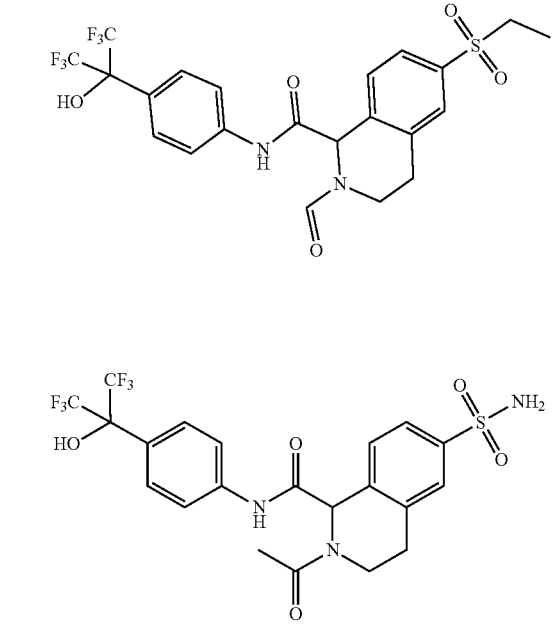

19

20

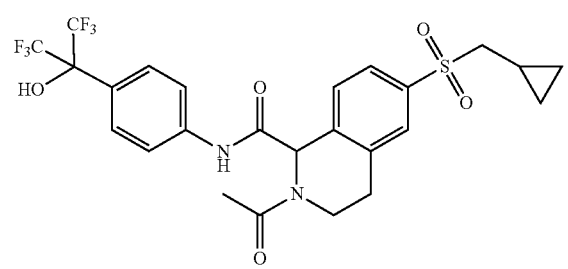

21

28

-continued

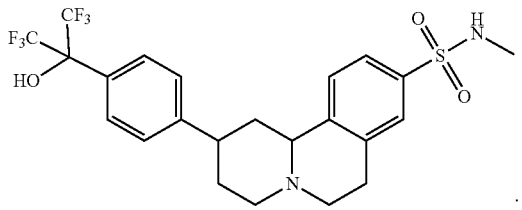

22

Preferred specific embodiments of the compound of the present disclosure include, but are not limited to, the following compounds, stereoisomers, tautomers, stable isotopic variants, pharmaceutically acceptable salts or solvates thereof,

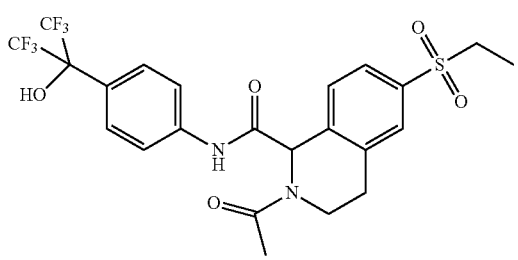

1

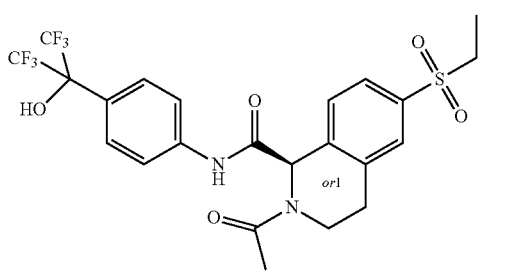

2

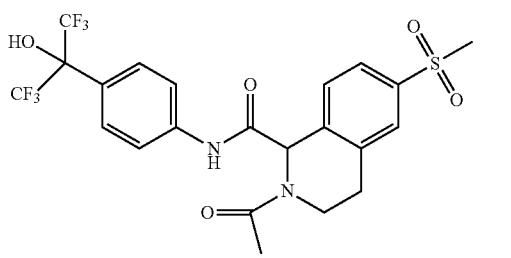

5

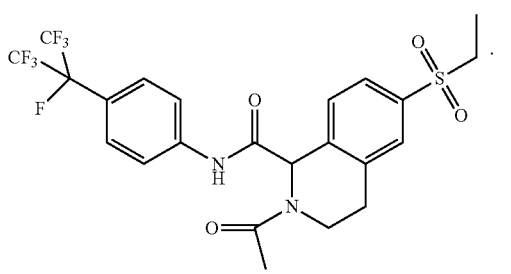

7

Beneficial Effects of the Present Invention

The present disclosure provides a class of aniline compounds with the structure of general formula (I). It has been found through research that such compounds can effectively inhibit the RORγt protein receptor, thereby regulating the differentiation of Th17 cells and inhibiting the production of IL-17, and can be used as a medicine for the treatment of inflammatory and autoimmune-related diseases.

Specifically, the compounds of the present disclosure have the following beneficial effects:

High inhibitory activity on RORγt receptor: RORγt luciferase reporter gene assay shows that IC50s are in the range of 0.1 nM~10 μM, preferably in the range of 0.1 nM~0.5 μM;

Regulating the differentiation of Th17 cells, and inhibiting the production of EL-17; and/or Good pharmacokinetic properties, such as longer $t_{1/2}$, allowing for example greater dosing intervals, longer half-life, and better patient compliance;

Improved $AUC_0$-last data, allowing better druggability and higher bioavailability: and/or Goof safety profile, e.g., excellent properties such as membrane permeability, P450 (reduced risk of drug interactions), solubility.

Based on the above-mentioned beneficial effects of the compounds of the present disclosure, technical solutions are also provided in each aspect as described hereinafter.

Compounds of the Disclosure for Use in Therapy or as a Medicament

In one aspect, the present disclosure provides compounds of the present disclosure for use as medicaments, particularly as RORγt inhibitors.

In another aspect, the present disclosure provides compounds of the present disclosure for use in the treatment, especially in the treatment and/or prevention of diseases associated with RORγt.

In specific embodiments, the present disclosure provides compounds of the present disclosure for use in the treatment and/or prevention of diseases in which RORγt contributes to the occurrence and progression of the disease or in which inhibition of RORγt will reduce the incidence, reduce or eliminate disease symptoms. The diseases are e.g., inflammatory or autoimmune diseases, cancer, including but not limited to psoriasis, rheumatoid arthritis, psoriatic arthritis, ankylosing spondylitis, multiple sclerosis, systemic lupus erythematosus graft-versus-host disease, inflammatory bowel disease, Crohn's disease, ulcerative colitis, chronic obstructive pulmonary disease, asthma, glomerulonephritis, lupus nephritis, myocarditis, thyroiditis, xerophthalmia, uveitis, Behcet's disease, allergic dermatitis, acne, scleroderma, bronchitis, dermatomyositis, allergic rhinitis, necrotizing enterocolitis, liver fibrosis, Non-alcoholic steatohepatitis (NASH), novel coronavirus pneumonia, insulin dependence type I diabetes, triple-negative breast cancer and prostate cancer, etc.

Pharmaceutical Compositions and their Administration

In another aspect, in order to use the compounds of the present specification for therapeutic or prophylactic purposes, the compounds of the present disclosure can be formulated into pharmaceutical compositions according to standard pharmaceutical practice. Meanwhile, based on the good pharmacokinetic properties, improved $AUC_{0\text{-}last}$ and good druggability of the compounds of the present disclosure, medicines with better pharmacokinetic properties and higher bioavailability can be prepared from the compounds of the present disclosure.

Accordingly, the present disclosure provides a pharmaceutical composition comprising the above-described compound of the present disclosure and a pharmaceutically acceptable excipient.

In a specific embodiment, the pharmaceutical composition of the present disclosure is provided for the prevention or treatment of diseases associated with RORγt in a mammal such as a human subject.

In a specific embodiment, the pharmaceutical compositions of the present disclosure may additionally comprise additional therapeutically active ingredients suitable for use in combination with the compounds of the present disclosure. In another specific embodiment, the additional therapeutic agent is as defined herein for the pharmaceutical combination.

The pharmaceutical compositions of the present disclosure can be formulated by techniques known to those skilled in the art, such as those disclosed in Remington's Pharmaceutical Sciences 20th Edition. For example, the pharmaceutical compositions of the present disclosure described above can be prepared by admixing a compound of the present disclosure with one or more pharmaceutically acceptable excipients. The preparation may further include the step of admixing one or more other active ingredients with a compound of the present disclosure and one or more pharmaceutically acceptable excipients.

The choice of excipients for inclusion in a particular composition will depend on factors such as the mode of administration and the form of the composition provided. Suitable pharmaceutically acceptable excipients are well known to those skilled in the art and are described, for example, in Ansel, Howard C., et al., Ansel's Pharmaceutical Dosage Forms and Drug Delivery Systems. Philadelphia: Lippincott, Williams & Wilkins, 2004, including e.g., adjuvants, diluents (e.g., glucose, lactose or mannitol), carriers, pH adjusters, buffers, sweeteners, fillers, stabilizers, surfactants, wetting agents, lubricants, emulsifiers, suspending agents, preservatives, antioxidants, opacifiers, glidants, processing aids, colorants, perfuming agents, flavoring agents, and other known additives.

The pharmaceutical compositions of the present disclosure can be administered in a standard manner. For example, suitable modes of administration include oral, intravenous, rectal, parenteral, topical, transdermal, ocular, nasal, buccal or pulmonary (inhalation) administration, wherein parenteral infusion includes intramuscular, intravenous, intraarterial, intraperitoneal or subcutaneous administration. For these purposes, the compounds of the present disclosure may be formulated by methods known in the art into forms, such as tablets, capsules, syrups, powders, granules, aqueous or oily solutions or suspensions, (lipid) emulsions, dispersible powders, suppositories, ointments, creams, drops, aerosols, dry powder formulations and sterile injectable aqueous or oily solutions or suspensions.

The magnitude of a prophylactic or therapeutic dose of a compound of the disclosure will vary depending on a range of factors, including the individual being treated, the severity of disorder or condition, the rate of administration, the disposition of the compound, and the judgment of the prescribing physician. In general, effective dose ranges from about 0.0001 to about 5000 mg/kg body weight/day, e.g., about 0.01 to about 1000 mg/kg/day (single or divided administration). For a human of 70 kg, this would add up to about 0.007 mg/day to about 7000 mg/day, e.g., about 0.7 mg/day to about 1500 mg/day. Depending on the mode of administration, the content or amount of the compound of the present disclosure in a pharmaceutical composition may be about 0.01 mg to about 1000 mg, suitably 0.1-500 mg, preferably 0.5-300 mg, more preferably 1-150 mg, particularly preferably 1-50 mg, e.g., 1.5 mg, 2 mg, 4 mg, 10 mg, 25 mg, etc.; accordingly, the pharmaceutical composition of the present disclosure will comprise 0.05 to 99% w/w (weight percent), e.g., 0.05 to 80% w/w, e.g., 0.10 to 70% w/w, e.g., 0.10 to 50% w/w of a compound of the invention, all weight percentages are based on the total composition. It is to be understood that it may be necessary in certain circumstances to use doses beyonding these limits.

In a specific embodiment, the present disclosure provides a pharmaceutical composition comprising a compound of the present disclosure and one or more pharmaceutically acceptable excipients, and the composition is formulated for oral administration. The composition may be provided in unit dosage forms, e.g., in the form of a tablet, capsule, or oral liquid. Such unit dosage forms may contain 0.1 mg to 1 g, e.g., 5 mg to 250 mg, of a compound of the present disclosure as the active ingredient.

In a specific embodiment, the present disclosure provides a pharmaceutical composition comprising a compound of the present disclosure and one or more pharmaceutically acceptable excipients, and the composition is formulated for topical administration. Topical administration can be in the forms of, e.g., creams, lotions, ointments or transdermal patches.

In a specific embodiment, the present disclosure provides a pharmaceutical composition comprising a compound of the present disclosure and one or more pharmaceutically acceptable excipients, and the composition is formulated for administration by inhalation. Administration by inhalation can be by oral inhalation or intranasal administration. When administered by oral inhalation, the compounds of the present disclosure can be effectively used in the present invention in daily dose, e.g., up to 500 µg, such as 0.1-50 µg, 0.1-40 µg, 0.1-30 µg, 0.1-20 µg or 0.1-10 µg of the present compounds. Pharmaceutical compositions of the present disclosure for oral inhalation may be formulated as dry powders, suspensions (in liquid or gas) or solutions (in liquid), and may be in any suitable form and using any suitable inhaler device known in the art, including, e.g., metered dose inhaler (MDI), dry powder inhaler (DPI), nebulizer, and soft mist inhaler. Multi-chamber devices can be used to deliver the compounds of the present specification and one or more other active ingredients (when present).

Treatment Methods and Uses

Based on the beneficial effects of the compounds of the present disclosure as described above, the compounds of the present disclosure can be used in methods of treating various disorders in animals, especially mammals such as humans.

Therefore, in another aspect, the present disclosure provides a method of modulating, especially inhibiting the activity of RORγt, comprising contacting a cell with a compound of the present disclosure as described above to modulate, especially inhibit the activity of RORγt in the cell.

In another aspect, the present disclosure provides a method of preventing or treating a disease associated with RORγt (e.g., a disease treatable or preventable by RORγt comprising administering to an individual in need thereof an effective amount of a compound of the present disclosure or a pharmaceutical composition comprising the same as described above.

In another aspect, the present disclosure provides a use of the compound of the present disclosure or the pharmaceutical composition comprising the same as described above, for inhibiting RORγt activity, or for treating and/or preventing a disease associated with RORγt, e.g., a disease treatable or preventable by RORγt inhibition. In another aspect, the present disclosure also provides a use of the compound of the present disclosure or the pharmaceutical composition comprising the same as described above in the manufacture of a medicament, especially medicaments with RORγt receptor inhibitory activity.

In another aspect, the present disclosure provides a use of the compound of the present disclosure or the pharmaceutical composition comprising the same as described above, in the manufacture of a medicament for the treatment or prevention of a disease associated with RORγt, such as a disease treatable or preventable by RORγt inhibition, wherein the compound or pharmaceutical composition is optionally combined with one or more chemotherapy or immunotherapy.

Drug Combination

The compounds of the present disclosure can be administered as the sole active ingredient or in combination with additional drugs or therapies. The additional drugs or therapies may have or produce the same or different pharmacological efficacy, provided that they do not result in an undesired reduction in activity, adverse interactions or side effects when used in combination with the compounds of the present disclosure.

Therefore, in another aspect, the present disclosure provides a pharmaceutical combination comprising a compound of the present disclosure and one or more other drugs or therapies acting through the same or different action mechanisms, as described above, consisting of the same. In a specific embodiment, the pharmaceutical combination is used to inhibit RORγt activity, or to treat and/or prevent a disease associated with RORγt.

The compounds of the present disclosure and the other active agents used in combination in the pharmaceutical combination of the present disclosure may be administered simultaneously, separately or sequentially by the same or different routes of administration. The other active agents may be co-administered with the compounds of the present disclosure in a single pharmaceutical composition, or administered separately from the compounds of the present disclosure in separate discrete units, such as a combination product, preferably in the form of a kit. When administered separately, it may be carried out simultaneously, or sequentially either close or spaced in time. Furthermore, the compounds of the present disclosure and the additional drugs may be incorporated into the combination therapy (i) prior to delivering the combination product to a physician (e.g., in the case of a kit comprising the compound of the present disclosure and the additional drugs); (ii) immediately prior to administration by the physician himself (or under the direction of the physician): (iii) by the patient himself, e.g., during sequential administration of the compound of the disclosure and the additional drugs.

Therefore, in a specific embodiment, the present disclosure also provides a kit comprising two or more separate pharmaceutical compositions, at least one of which comprises a compound of the present disclosure and the remainder comprise other active agents used in combination, and means for containing said compositions, respectively. The kit of the present disclosure is particularly suitable for administering different dosage forms, such as oral and parenteral dosage forms, or for administering different compositions at different dosage intervals.

In the pharmaceutical combinations of the present invention, suitable amounts of the compounds of the present disclosure and other active agents in combination can generally be determined by those skilled in the art, for example, from the dosage ranges of the compounds described in this specification and the approved or published dosage ranges of the other active compounds. The doses of other drugs co-administered will, of course, vary depending on factors such as the type of co-drug used, the specific drug used, the condition being treated, the general health of patients, the judgment of physician or veterinarian involved.

With respect to the pharmaceutical compositions and combinations of the present disclosure, the other active agents may be one or more second or additional (e.g., the third) compounds that do not adversely affect each other with the compounds of the present disclosure, and have enhanced or complementary activities. For example, these active agents may be compounds known to modulate other biologically active pathways, or may be compounds that modulate different components of the biologically active pathways involving the compounds of the disclosure, or even compounds having biological targets overlapping with those of the compounds of the present disclosure.

In a specific embodiment, the present disclosure provides a pharmaceutical combination, for example, for use as a medicament for the treatment of one of the diseases listed herein, such as psoriasis, COPD, asthma, psoriatic arthritis or ankylosing spondylitis, comprising a compound of the present disclosure, and at least one active ingredient selected from:
  a) β-adrenergic receptor agonists;
  b) Muscarinic receptor antagonists;
  c) Joint muscarinic receptor antagonists and beta-adrenergic receptor agonists; and
  d) Glucocorticoid receptor agonists (steroidal or non-steroidal);
  e) Phosphodiesterase-4 (PDE4) inhibitor.

The compounds of the present disclosure may also be combined with other therapies including, but are not limited to, surgeries, radiation therapies, transplantations (e.g., stem cell transplantation, bone marrow transplantation), tumor immunotherapies, etc.

Accordingly, the present disclosure provides a method for inhibiting RORγt activity or for treating and/or preventing a disease associated with RORγt, comprising administering to a subject in need thereof a pharmaceutical combination of the present disclosure. The present disclosure also provides a use of the pharmaceutical combination of the present disclosure in the manufacture of a medicament for inhibiting RORγt activity or for treating and/or preventing a RORγt-related disease.

For the various aspects described above involving pharmaceutical compositions, methods of treatment and uses, and pharmaceutical combinations, diseases associated with RORγt (e.g., diseases treatable or preventable by RORγt inhibition) include inflammatory or autoimmune diseases, cancers, etc., including but not limited to psoriasis, rheumatoid arthritis, psoriatic arthritis, ankylosing spondylitis, multiple sclerosis, systemic lupus erythematosus, graft-versus-host disease, inflammatory bowel disease, Crohn's disease, ulcerative colitis, chronic obstructive pulmonary disease, asthma, glomerulonephritis, lupus nephritis, myocarditis, thyroiditis, xerophthalmia, uveitis, Behcet's disease, allergic dermatitis, acne, scleroderma, bronchitis, dermatomyositis, allergic rhinitis, necrotizing enterocolitis, liver fibrosis, non-alcoholic steatohepatitis (NASH), novel coronavirus pneumonia, insulin-dependent type I diabetes, triple-negative breast cancer and prostate cancer, etc. Preferred RORγt-associated diseases are selected from the group consisting of psoriasis, rheumatoid arthritis, psoriatic arthritis, ankylosing spondylitis, multiple sclerosis, inflammatory bowel disease, xerophthalmia, allergic dermatitis, chronic obstructive pulmonary disease (COPD), asthma, necrotizing enterocolitis, liver fibrosis, nonalcoholic steatohepatitis (NASH), novel coronavirus pneumonia, triple-negative breast cancer and prostate cancer.

For the above-mentioned compounds, pharmaceutical compositions, methods, uses, pharmaceutical combinations of the present disclosure, the compounds of formula (Ia), especially formula (Ia'), stereoisomers, tautomers, stable isotopic variants, pharmaceutically acceptable salts or solvates thereof as described above are preferred; the compounds of formula (Ia"), stereoisomers, tautomers, stable isotopic variants, pharmaceutically acceptable salts or solvates thereof as described above and the specific compounds listed above are more preferred; the compounds of formula (Ia") and the specific compounds listed above, e.g., compounds 1-18, or pharmaceutically acceptable salts or solvates thereof, are most preferred.

When administration dosages of a compound or drug are described herein, it should be understood that such dosages are based on the weight of the free base, excluding any derived ingredients thereof, unless the specification indicates otherwise.

Synthesis of Compounds of the Present Disclosure

In another aspect, the present disclosure also provides a process for the preparation of compounds of formula (I). General synthetic schemes for synthesizing the compounds of the present disclosure are exemplified below. For each reaction step, appropriate reaction conditions are known to those skilled in the art or can be routinely determined. The starting materials and reagents used in the preparation of these compounds are generally commercially available, or can be prepared by the methods below, the methods analogous to those given below, or the methods known in the art, unless otherwise specified. If necessary, the starting materials and intermediates in the synthetic schemes can be separated and purified by conventional techniques, including but not limited to filtration, distillation, crystallization, chromatography and the like. The materials can be characterized using conventional methods including physical constants and spectral data.

In one embodiment, the process includes the following steps:

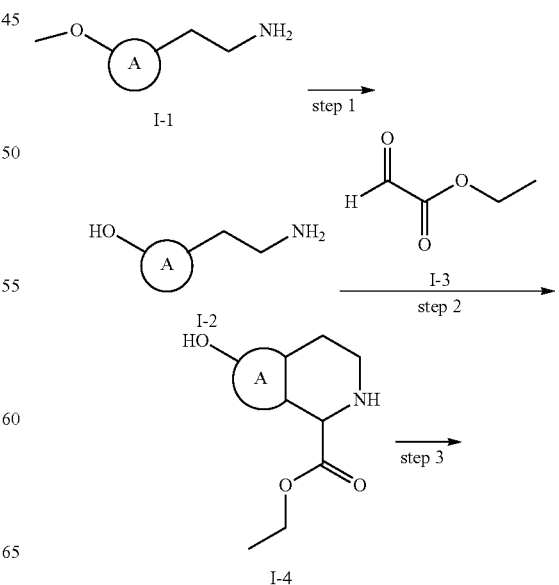

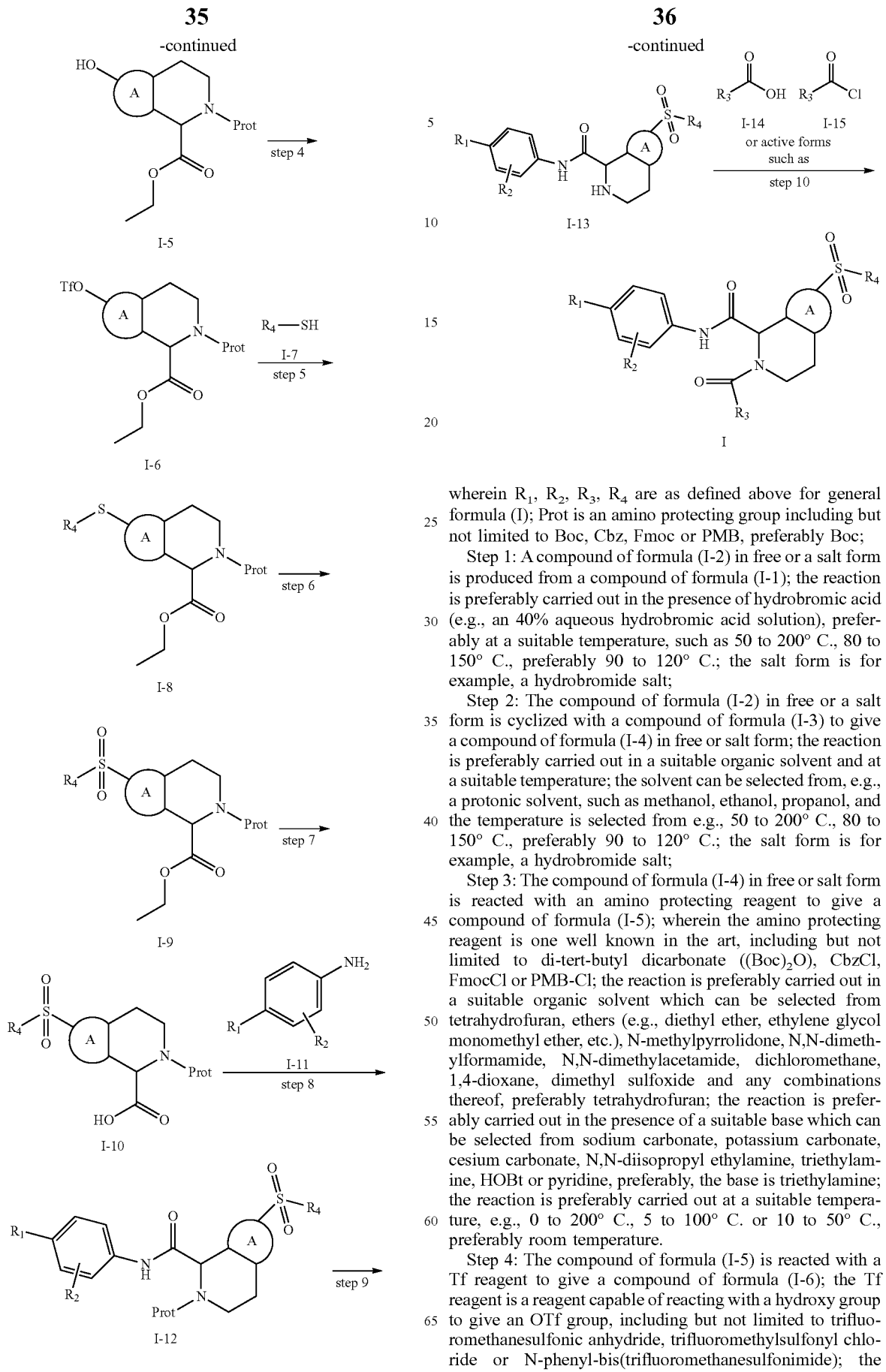

wherein $R_1$, $R_2$, $R_3$, $R_4$ are as defined above for general formula (I); Prot is an amino protecting group including but not limited to Boc, Cbz, Fmoc or PMB, preferably Boc;

Step 1: A compound of formula (I-2) in free or a salt form is produced from a compound of formula (I-1); the reaction is preferably carried out in the presence of hydrobromic acid (e.g., an 40% aqueous hydrobromic acid solution), preferably at a suitable temperature, such as 50 to 200° C., 80 to 150° C., preferably 90 to 120° C.; the salt form is for example, a hydrobromide salt;

Step 2: The compound of formula (I-2) in free or a salt form is cyclized with a compound of formula (I-3) to give a compound of formula (I-4) in free or salt form; the reaction is preferably carried out in a suitable organic solvent and at a suitable temperature; the solvent can be selected from, e.g., a protonic solvent, such as methanol, ethanol, propanol, and the temperature is selected from e.g., 50 to 200° C., 80 to 150° C., preferably 90 to 120° C.; the salt form is for example, a hydrobromide salt;

Step 3: The compound of formula (I-4) in free or salt form is reacted with an amino protecting reagent to give a compound of formula (I-5); wherein the amino protecting reagent is one well known in the art, including but not limited to di-tert-butyl dicarbonate ((Boc)$_2$O), CbzCl, FmocCl or PMB-Cl; the reaction is preferably carried out in a suitable organic solvent which can be selected from tetrahydrofuran, ethers (e.g., diethyl ether, ethylene glycol monomethyl ether, etc.), N-methylpyrrolidone, N,N-dimethylformamide, N,N-dimethylacetamide, dichloromethane, 1,4-dioxane, dimethyl sulfoxide and any combinations thereof, preferably tetrahydrofuran; the reaction is preferably carried out in the presence of a suitable base which can be selected from sodium carbonate, potassium carbonate, cesium carbonate, N,N-diisopropyl ethylamine, triethylamine, HOBt or pyridine, preferably, the base is triethylamine; the reaction is preferably carried out at a suitable temperature, e.g., 0 to 200° C., 5 to 100° C. or 10 to 50° C., preferably room temperature.

Step 4: The compound of formula (I-5) is reacted with a Tf reagent to give a compound of formula (I-6); the Tf reagent is a reagent capable of reacting with a hydroxy group to give an OTf group, including but not limited to trifluoromethanesulfonic anhydride, trifluoromethylsulfonyl chloride or N-phenyl-bis(trifluoromethanesulfonimide); the reaction is preferably carried out in the presence of a base selected from sodium carbonate, potassium carbonate, cesium carbonate, N,N-diisopropyl ethylamine, triethylamine, HOBt or pyridine; the reaction is preferably carried out in an organic solvent which can be selected from dichloromethane, tetrahydrofuran, ethers (e.g., diethyl ether, ethylene glycol monomethyl ether, etc.), N-methylpyrrolidone, N,N-dimethylformamide, N,N-dimethylacetamide, 1,4-dioxane, dimethyl sulfoxide and any combinations thereof, preferably dichloromethane; the reaction is preferably carried out at a suitable temperature, e.g., −50° C. to 200° C., −20° C. to 100° C., such as −10° C. to 50° C., such as −10° C. to 10° C., preferably in an ice bath: the reaction is preferably carried out under an atmosphere of inert gas, including but not limited to nitrogen, argon or helium, etc;

Step 5: The compound of formula (I-6) is coupled with the compound of formula (I-7) under the action of a catalyst, such as a palladium catalyst, to obtain the compound of formula (I-8); Wherein the palladium catalyst is a palladium catalyst for coupling well-known in the art, including but not limited to $Pd_2(dba)_3$, etc.; the reaction is preferably carried out in a suitable organic solvent, and the organic solvent can be selected from tetrahydrofuran, ethers (e.g., diethyl ether, ethylene glycol monomethyl ether, etc.), N-methylpyrrolidone, N,N-dimethylformamide, N,N-dimethylacetamide, dichloromethane, 1,4-dioxane, dimethyl sulfoxide and any combinations thereof, preferably 1,4-dioxane; the reaction is preferably carried out in the presence of a phosphine ligand including but not limited to 4,5-bisdiphenylphosphine-9,9-dimethylxanthene; the reaction is preferably carried out in the presence of a suitable base which can be selected from sodium carbonate, potassium carbonate, cesium carbonate, N,N-diisopropylethylamine, triethylamine, HOBt or pyridine, preferably, the base is N,N-diisopropylethylamine; the reaction is preferably carried out at a suitable temperature, e.g., 50 to 200° C., 80 to 150° C., preferably 90 to 120° C.;

Step 6: The compound of formula (I-8) is converted to the compound of formula (I-9) under the action of an oxidant; the oxidant is selected from, e.g., $H_2O_2$, mCPBA and peracetic acid; the reaction is preferably carried out in an organic solvent, and the organic solvent can be selected from dichloromethane, tetrahydrofuran, ethers (e.g., diethyl ether, ethylene glycol monomethyl ether, etc.), N-methylpyrrolidone, N,N-dimethylformamide, N,N-dimethylacetamide, 1,4-dioxane, dimethyl sulfoxide and any combinations thereof, preferably dichloromethane; the reaction is preferably carried out at a suitable temperature, e.g., −50° C. to 200° C., −20° C. to 100° C., e.g., −10° C. to 50° C., e.g., −10° C. to 10° C., preferably in an ice bath;

Step 7: The compound of formula (I-9) is hydrolyzed to generate the compound of formula (I-10); the reaction is preferably carried out in the presence of a base, and the base can be selected from sodium hydroxide, potassium hydroxide, sodium carbonate, potassium carbonate or cesium carbonate, and the base is preferably applied in the form of an aqueous solution; the reaction is preferably carried out in an organic solvent, which can be selected from alcoholic solvents (e.g., methanol, ethanol or propanol), tetrahydrofuran, ethers (e.g., diethyl ether, ethylene glycol monomethyl ether, etc.), N-methylpyrrolidone, N,N-dimethylformamide, N,N-dimethylacetamide, 1,4-dioxane, dimethyl sulfoxide and any combinations thereof, preferably methanol; the reaction is preferably carried out at a suitable temperature, e.g., −20° C. to −200° C., 5 to 100° C., 10 to 50° C., preferably room temperature;

Step 8: The compound of formula (I-10) is reacted with the compound of formula (I-11) under the action of a condensing agent to give the compound of formula (I-12); wherein the condensing agent is a condensing agent well known in the art for coupling carboxylic acids and amines, including but not limited to 1-propylphosphonic anhydride (T3P), EDC, DCC, HATU, etc.; the reaction is preferably performed in a suitable organic solvent, the organic solvent can be selected from dichloromethane, tetrahydrofuran, ethers (e.g., diethyl ether, ethylene glycol monomethyl ether, etc.), N-methylpyrrolidone, N,N-dimethylformamide, N,N-dimethylacetamide, 1,4-dioxane, dimethyl sulfoxide and any combinations thereof, preferably dichloromethane; the reaction is preferably carried out in the presence of a suitable base, and the base includes but is not limited to sodium carbonate, potassium carbonate, cesium carbonate, N,N-diisopropylethylamine, triethylamine, HOBt or pyridine, preferably, the base is N,N-diisopropylethylamine; the reaction is preferably carried out at a suitable temperature, e.g., 0 to 200° C., 10 to 100° C. or 20 to 50° C., preferably room temperature (20-25° C.).

Step 9: The compound of formula (I-12) is removed of the amino protecting group to give the compound of formula (I-13); the reaction is carried out, e.g., under the action of an acid (e.g., TFA or HCl), and the reaction is preferably carried out in a suitable organic, the organic solvent can be selected from dichloromethane, tetrahydrofuran, ethers (e.g., diethyl ether, ethylene glycol monomethyl ether, etc.), N-methylpyrrolidone, N,N-dimethylformamide, N,N-dimethylacetamide, 1,4-dioxane, dimethyl sulfoxide and any combinations thereof, preferably dichloromethane; the reaction is preferably carried out at a suitable temperature, e.g., −50° C. to 200° C., −20° C. to 100° C., such as −10° C. to 50° C., such as −10° C. to 20° C.;

Step 10: The compound of formula (I-13) is reacted with the compound of formula (I-14) or its activated form (e.g., the corresponding acyl chloride (formula (I-15) or anhydride) to give the target compound I; the reaction is preferably carried out in the presence of a base, the base can be selected from sodium carbonate, potassium carbonate, cesium carbonate, N,N-diisopropylethylamine, triethylamine, HOBt or pyridine; the reaction is preferably carried out in an organic solvent, and the organic solvent can be selected from dichloromethane, tetrahydrofuran, ethers (e.g., diethyl ether, ethylene glycol monomethyl ether, etc.), N-methylpyrrolidone, N,N-dimethylformamide, N,N-dimethylacetamide, 1,4-dioxane, dimethyl sulfoxide, and any combinations thereof, preferably dichloromethane; the reaction may be carried out in the presence of a condensing agent which is well known in the art for coupling carboxylic acids and amines, including but not limited to 1-propyl phosphonic anhydride (T3P), EDC, DCC, HATU; the reaction is preferably carried out at a suitable temperature, e.g., 0 to 200° C., 10 to 100° C. or 20 to 50° C., preferably room temperature (20-25° C.).

The above synthetic scheme only exemplifies the preparation of some compounds of the present disclosure. The compounds of the present disclosure, or stereoisomers, tautomers, stable isotopic derivatives, pharmaceutically acceptable salts or solvates thereof can be prepared by a variety of methods, including the methods given above, the methods given in the Examples or a method analogous to them, by those of ordinary skill in the art on the basis of the above-mentioned synthetic scheme in combination with conventional techniques in the art.

The compounds described in the present specification are further illustrated in the following examples. These examples are provided only to illustrate, but not to limit.

Embodiments of Carrying Out the Invention

The technical solutions of the present disclosure are further illustrated below with reference to specific examples, but the protection scope of the present disclosure is not limited to them. All modifications or equivalent substitutions that do not depart from the concept of the present invention are included in the protection scope of the present disclosure.

The experimental methods without specified conditions in the following examples, are generally in accordance with the conventional conditions for this type of reaction, or in accordance with the conditions suggested by manufacturers. Percentages and parts are by weight unless otherwise specified. Unless otherwise stated, ratios of liquids are by volume.

Unless otherwise specified, the experimental materials and reagents used in the following examples can be obtained from commercial sources, prepared according to methods in the prior art, or prepared according to methods analogous to those disclosed in this application.

Compound names used herein are IUPAC names. Abbreviations used herein have the meanings commonly understood in the art unless clearly defined otherwise in the specification. The meanings of the abbreviations used in the specification are listed below:

Pd$_2$(dba)$_3$: Tri(dibenzylideneacetone) dipalladium

HATU: 2-(7-Azobenzotriazole)-N,N,N',N', -tetramethyl-urea hexafluorophosphate

DIEA: N,N-diisopropylethylamine

DCM: Dichloromethane

EA: Ethyl acetate

PE: Petroleum ether

LC-MS: Liquid Chromatography Mass Spectrometry

ESI: Electrospray ionization m/z Mass-to-charge ratio

TLC: Thin Layer Chromatography

Ret.time: Retention time

Synthesis Examples

In the preparation of the target compounds provided by the present disclosure, column chromatography was carried out with silica gel (300-400 mesh) produced by Rushan Sun Desiccant Co., Ltd.; thin-layer chromatography was carried out with GF254 (0.25 mm); nuclear magnetic resonance spectroscopy (NMR) was carried out with Varian-400 nuclear magnetic resonance spectrometer; liquid chromatography/mass spectrometry (LC/MS) was carried out with Agilent TechnologiESI 6120 liquid chromatography/mass spectrometer.

In addition, all operations involving easily oxidizable or easily hydrolyzed raw materials are carried out under nitrogen protection. Unless otherwise specified, the raw materials used in the present disclosure are all commercially available which can be used directly without further purification, and the temperatures used in the present disclosure are all in degrees Celsius ° C.

Where the structure of the compound of the present disclosure is inconsistent with the name thereof, the structural formula generally controls, unless it can be determined from the context that the name of the compound is correct.

Example 1: 2-Acetyl-6-(ethylsulfonyl)-N-(4-(1,1,1,3,3,3-hexafluoro-2-hydroxypropan-2-yl)phenyl)-1,2,3,4-tetrahydroisoquinoline-1-carboxamide

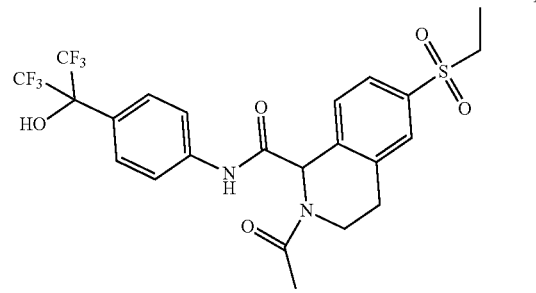

Step 1: Synthesis of 3-(2-aminoethyl)phenol hydrobromide

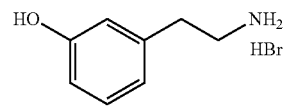

2-(3-Methoxyphenyl)ethanamine (9.00 g, 59.5 mmol) was dissolved in 40% aqueous hydrobromic acid (120 g, 595 mmol). The reaction solution was stirred at 110° C. for 6 hours, and LC-MS monitored the completion of the reaction. The reaction solution was concentrated under reduced pressure to obtain the target compound (9.00 g, crude, light brown solid). LC-MS (ESI) m/z: 179.1 [M+ACN+H]$^+$.

Step 2: Synthesis of ethyl 6-hydroxy-1,2,3,4-tetrahydroisoquinoline-1-carboxylate hydrobromide

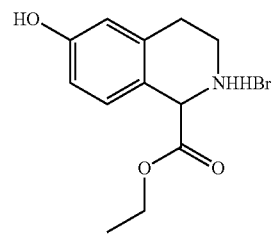

3-(2-Aminoethyl)phenol hydrobromide (9.00 g, 65.6 mmol) was dissolved in ethanol (90 mL). At room temperature, a solution of 50% ethyl glyoxylate in toluene (14.7 g, 72.2 mmol) was added dropwise to the reaction solution. After the addition was completed, the reaction mixture was stirred for reaction at 100° C. overnight, and LC-MS monitored the completion of the reaction. The reaction solution was concentrated under reduced pressure to obtain the target compound (20.0 g, crude, brown oil). LC-MS (ESI) m/z: 222.0 [M+H]$^+$.

Step 3: Synthesis of 2-(tert-butyl) 1-ethyl 6-hydroxy-3,4-dihydroisoquinoline-1,2(1H)-dicarboxylate

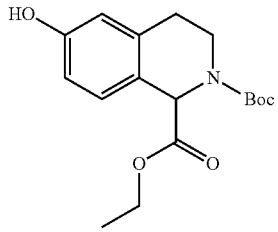 [SMILES: CCOC(=O)C1c2ccc(O)cc2CCN1C(=O)OC(C)(C)C]

Ethyl 6-hydroxy-1,2,3,4-tetrahydroisoquinoline-1-carboxylate hydrobromide (20.0 g, 66.2 mmol) was dissolved in a mixture of tetrahydrofuran (200 mL) and water (40 mL), triethylamine (11.0 mL, 79.4 mmol) and di-tert-butyl dicarbonate (16.7 mL, 72.8 mmol) were sequentially added to the reaction solution, at room temperature. After the addition was completed, the reaction solution was further stirred at room temperature for 1 hour, and LC-MS monitored the completion of the reaction. The reaction solution was poured into water (150 mL), extracted with EA (50 mL×2), the organic phases were combined, washed with saturated aqueous ammonium chloride solution (100 mL), dried over anhydrous sodium sulfate, filtered, and the filtrate was concentrated under reduced pressure to obtain the crude product, which was separated and purified by silica gel column (PE:EA=4:1–2:1) to obtain the target compound (12.3 g, 64.4% yield in three steps, yellow oil). LC-MS (ESI) m/z: 320.1 [M–H].

Step 4: Synthesis of 2-(tert-butyl) 1-ethyl 6-(((trifluoromethyl)sulfonyl)oxy)-3,4-dihydroisoquinoline-1,2(1H)-dicarboxylate

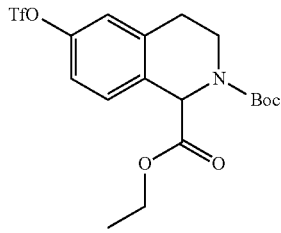

2-(tert-Butyl) 1-ethyl 6-hydroxy-3,4-dihydroisoquinoline-1,2(1H)-dicarboxylate (1.10 g, 3.42 mmol) was dissolved in dry DCM (20 mL), N-phenylbis(trifluoromethanesulfonimide) (1.47 g, 4.11 mmol) and DIEA (1.13 mL, 6.85 mmol) were sequentially added to the reaction solution, under an ice bath and nitrogen protection. After the addition was completed, the ice bath was removed, the reaction mixture was stirred at room temperature for 3 hours, and LC-MS monitored the completion of the reaction. The reaction solution was concentrated under reduced pressure to obtain the target compound (3.70 g, crude, brown oil). LC-MS (ESI) m/z: 353.9 [M–BOC+H]$^+$.

Step 5: Synthesis of 2-(tert-butyl) 1-ethyl 6-(ethylthio)-3,4-dihydroisoquinoline-1,2(1H)-dicarboxylate

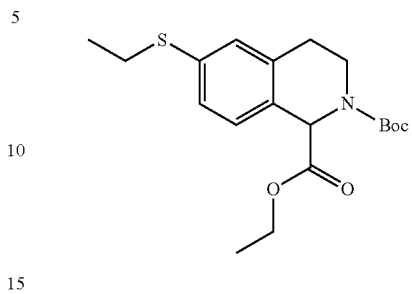

2-(tert-Butyl) 1-ethyl 6-(((trifluoromethyl)sulfonyl)oxy)-3,4-dihydroisoquinoline-1,2(1H)-dicarboxylate (3.70 g, 8.16 mmol), Pd$_2$(dba)$_3$ (747 mg, 0.816 mmol), 4,5-bisdiphenylphosphine-9,9-dimethylxanthene (944 mg, 1.63 mmol), DIEA (2.70 mL, 16.3 mmol), ethanethiol (1.22 mL, 16.3 mmol) and 1,4-dioxane (20 mL) were sequentially added to a sealed tube. Nitrogen was blown into the sealed tube, then the tube was quickly sealed, the reaction mixture was stirred at 100° C. overnight, and LC-MS monitored the completion of the reaction. The reaction solution was cooled to room temperature, filtered, and the filtrate was concentrated under reduced pressure to obtain the crude product, which was separated and purified by silica gel column (PE:EA=20:1–15:1) to obtain the target compound (1.80 g, crude, yellow oil). LC-MS (ESI) m/z: 266.0 [M–BOC+H]$^+$.

Step 6: Synthesis of 2-(tert-butyl) 1-ethyl 6-(ethylsulfonyl)-3,4-dihydroisoquinoline-1,2(1H)-dicarboxylate

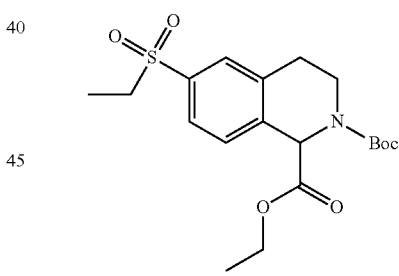

2-(tert-Butyl) 1-ethyl 6-(ethylthio)-3,4-dihydroisoquinoline-1,2(1H)-dicarboxylate (1.80 g, 4.92 mmol) was dissolved in DCM (30 mL). Under an ice bath, m-chloroperoxybenzoic acid (2.50 g, 12.3 mmol, 85%) was slowly added to the reaction solution. After the addition was completed, the ice bath was removed, the reaction mixture was stirred at room temperature for 2 hours, and LC-MS monitored the completion of the reaction. The reaction solution was filtered, and the filtrate was sequentially washed with saturated sodium bicarbonate (20 mL) and saturated brine (20 mL), dried over anhydrous sodium sulfate, filtered, and the filtrate was concentrated under reduced pressure to obtain the crude product, which was separated and purified by silica gel column (PE:EA-15:1–5:1) to obtain the target compound (1.10 g, 81.0% yield in three steps, yellow oil). LC-MS (ESI) m/z: 396.1 [M–H]$^-$.

Step 7: Synthesis of 2-(tert-butoxycarbonyl)-6-(ethylsulfonyl)-1,2,3,4-tetrahydroisoquinoline-1-carboxylic acid

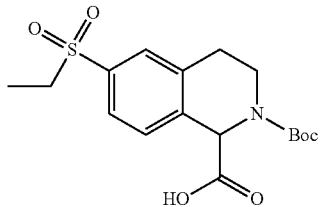 [SMILES: CCS(=O)(=O)c1ccc2c(c1)CCN(C(=O)OC(C)(C)C)C2C(=O)O]

2-(tert-Butyl) 1-ethyl 6-(ethylsulfonyl)-3,4-dihydroisoquinoline-1,2(1H)-dicarboxylate (460 mg, 1.16 mmol) was dissolved in in methanol (5 mL), 1 mol/L aqueous sodium hydroxide solution (3.47 mL, 3.47 mmol) was added dropwise to the reaction solution at room temperature. After the addition was completed, the reaction solution was further stirred at room temperature for 2 hours, and LC-MS monitored the completion of the reaction. The reaction solution was poured into ice water (20 mL), adjusted to around pH 3 with 1 mol/L hydrochloric acid, extracted with EA (10 mL×2), the organic phases were combined, dried over anhydrous sodium sulfate, filtered, and the filtrate was concentrated under reduced pressure to obtain the target compound (362 mg, 84.7% yield, yellow solid). LC-MS (ESI) m/z: 737.1 [2M−H]⁻.

Step 8: Synthesis of tert-butyl 6-(ethylsulfonyl)-1-((4-(1,1,1,3,3,3-hexafluoro-2-hydroxypropan-2-yl)phenyl)carbamoyl)-3,4-dihydroisoquinoline-2(1H)-carboxylate

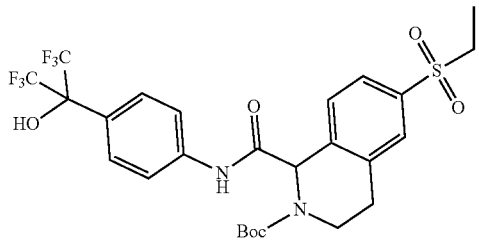 [SMILES: CCS(=O)(=O)c1ccc2c(c1)CCN(C(=O)OC(C)(C)C)C2C(=O)Nc1ccc(C(O)(C(F)(F)F)C(F)(F)F)cc1]

2-(tert-Butoxycarbonyl)-6-(ethylsulfonyl)-1,2,3,4-tetrahydroisoquinoline-1-carboxylic acid (360 mg, 0.975 mmol) and 2-(4-aminophenyl)-1,1,1,3,3,3-hexafluoropropan-2-ol (253 mg, 0.975 mmol) were dissolved in dry DCM (5 mL). At room temperature, a 50% solution of 1-propylphosphonic anhydride in ethyl acetate (1.24 g, 1.95 mmol) and DIEA (0.483 mL, 2.92 mmol) were sequentially added dropwise to the reaction solution. After the addition was completed, the reaction mixture was stirred at room temperature overnight. The reaction solution was poured into saturated sodium bicarbonate (20 mL), extracted with DCM (15 mL×2), the organic phases were combined, washed with saturated brine (30 mL), dried over anhydrous sodium sulfate, filtered, and the filtrate was concentrated under reduced pressure to obtain crude product, which was separated and purified by silica gel column (PE:EA=2:1–0:1) to obtain the target compound (170 mg, 28.6% yield, pale yellow solid). LC-MS (ESI) m/z: 609.1 [M−H]⁻.

Step 9: Synthesis of 6-(ethylsulfonyl)-N-(4-(1,1,1,3,3,3-hexafluoro-2-hydroxypropan-2-yl)phenyl)-1,2,3,4-tetrahydroisoquinoline-1-carboxamide hydrochloride

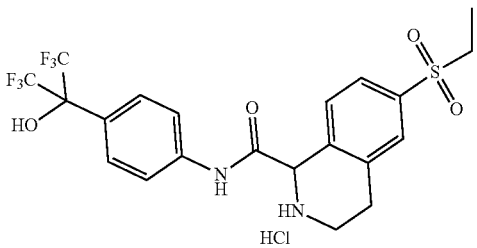 [SMILES: CCS(=O)(=O)c1ccc2c(c1)CCNC2C(=O)Nc1ccc(C(O)(C(F)(F)F)C(F)(F)F)cc1 ; Cl]

tert-Butyl 6-(ethylsulfonyl)-1-((4-(1,1,1,3,3,3-hexafluoro-2-hydroxypropan-2-yl)phenyl)carbamoyl)-3,4-dihydroisoquinoline-2(1H)-carboxylate (170 mg, 0.278 mmol) was dissolved in DCM (2 mL). Under ice bath, a solution of 6 mol/L hydrochloric acid in dioxane (1 mL) was added dropwise to the reaction solution. After the addition was completed, the ice bath was removed, the reaction mixture was further stirred at room temperature for 2 hours, and LC-MS monitored the completion of the reaction. The reaction solution was concentrated under reduced pressure to obtain the target compound (120 g, 84.4% yield, yellow solid). LC-MS (ESI) m/z: 509.1 [M−H]⁻.

Step 10: Synthesis of 2-acetyl-6-(ethylsulfonyl)-N-(4-(1,1,1,3,3,3-hexafluoro-2-hydroxypropan-2-yl)phenyl)-1,2,3,4-tetrahydroisoquinoline-1-carboxamide

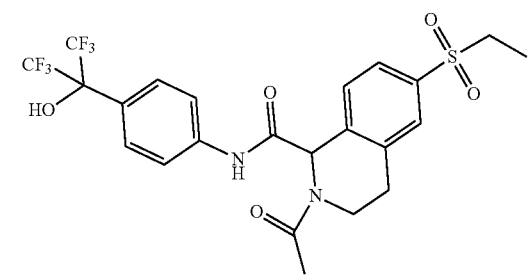

6-(Ethylsulfonyl)-N(4(1,1,1,3,3,3-hexafluoro-2-hydroxypropan-2-yl)phenyl)-1,2,3,4-tetrahydroisoquinoline-1-carboxamide hydrochloride (42.0 mg, 0.0823 mmol) was dissolved in dry DCM (3 mL). At room temperature, DIEA (0.054 mL, 0.329 mmol) and acetyl chloride (0.018 mL, 0.247 mmol) were sequentially added dropwise to the reaction solution. After the addition was completed, the reaction solution was further stirred at room temperature for 30 minutes, and LC-MS monitored the completion of the reaction. The reaction solution was directly concentrated and dissolved in methanol (3 mL), and 1 mol/L aqueous sodium hydroxide solution (2 mL) was added dropwise to the reaction solution at room temperature. After the addition was completed, the reaction was further stirred at room temperature for 30 minutes, and LC-MS monitored the completion of the reaction. The reaction solution was poured into water (20 mL), extracted with EA (15 ruL×2), the organic phases were combined, washed with saturated ammonium chloride (20 mL), dried over anhydrous sodium sulfate and filtered, and the filtrate was concentrated under reduced pressure to obtain the crude product, which was separated and purified by silica gel column (PE:EA=1:1–0:1) to obtain the target compound (10.0 mg, 22.6% yield, white solid). LC-MS (ESI) m/z: 553.0 [M+H]$^+$. $^1$H NMR (400 MHz, DMSO-d$_6$) δ 11.04, 10.77 (s, 1H), 8.42 (s, 1H), 7.81 (d, J=8.2 Hz, 1H), 7.79-7.76 (m, 1H), 7.75-7.71 (m, 1H), 7.70-7.64 (m, 2H), 7.58 (d, J=8.8 Hz, 2H), 5.91, 5.87 (s, 1H), 4.09-4.00 (m, 1H), 3.70-3.63 (m, 1H), 3.27-3.21 (m, 2H), 3.20-3.16 (m, 1H), 3.06-2.98 (m, 1H), 2.14, 2.11 (s, 3H), 1.07 (t, J=7.4 Hz, 3H).

Examples 2 and 3: (R)-2-acetyl-6-(ethylsulfonyl)-N-(4-(1,1,1,3,3,3-hexafluoro-2-hydroxypropan-2-yl)phenyl)-1,2,3,4-tetrahydroisoquinoline-1-carboxamide or (S)-2-acetyl-6-(ethylsulfonyl)-N-(4-(1,1,1,3,3,3-hexafluoro-2-hydroxypropan-2-yl)phenyl)-1,2,3,4-tetrahydroisoquinoline-1-carboxamide

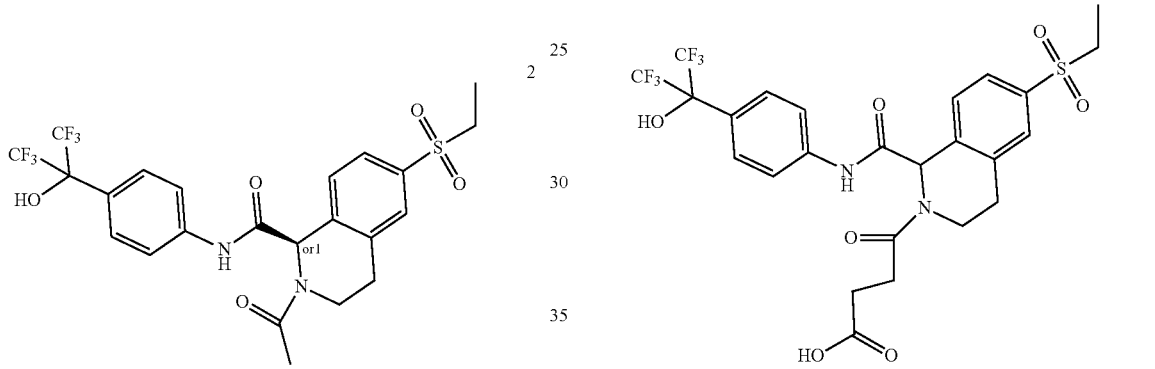

Racemate 2-acetyl-6-(ethylsulfonyl)-N-(4-(1,1,1,3,3,3-hexafluoro-2-hydroxypropan-2-yl)phenyl)-1,2,3,4-tetrahydroisoquinoline-1-carboxamide (500 mg dissolved in ~120 mL methanol, 6.0 mL injection volume) was resolved by Waters SFC 150 (room temperature, 100 bar, 214 nm) and 250*25 mm 10 μm Dr.maish Reprosil Chiral-OM (similar to DAICELCITIRALCEL® OD) (supercritical carbon dioxide:methanol, 70:30, 3.0 min, 70 mL/min) to give (R)-2-acetyl-6-(ethylsulfonyl)-N-(4-(1,1,1,3,3,3-hexafluoro-2-hydroxypropan-2-yl)phenyl)-1,2,3,4-tetrahydroisoquinoline-1-carboxamide or (S)-2-acetyl-6-(ethylsulfonyl)-N-(4-(1,1,1,3,3,3-hexafluoro-2-hydroxypropan-2-yl)phenyl)-1,2,3,4-tetrahydroisoquinoline-1-carboxamide (175 mg, white solid, Ret.time=3.762 min, e.e. 99%). LC-MS (ESI) m/z 553.2 [M+H]$^+$. $^1$H NMR (400 MHz, CDCl$_3$) δ 9.76 (s, 1H), 7.83-7.74 (m, 2H), 7.64 (d, J=8.6 Hz, 1H), 7.52-7.39 (m, 4H), 6.19 (s, 1H), 4.39 (s, 1H), 4.03-3.93 (m, 1H), 3.82-3.72 (m, 1H), 3.35-3.25 (m, 1H), 3.11 (q, J=7.4 Hz, 2H), 3.06-2.97 (m, 1H), 2.35 (s, 3H), 1.29 (t, J=7.4 Hz, 3H).

(S)-2-acetyl-6-(ethylsulfonyl)-N-(4-(1,1,1,3,3,3-hexafluoro-2-hydroxypropan-2-yl)phenyl)-1,2,3,4-tetrahydroisoquinoline-1-carboxamide or (R)-2-acetyl-6-(ethylsulfonyl)-N-(4-(1,1,1,3,3,3-hexafluoro-2-hydroxypropan-2-yl)phenyl)-1,2,3,4-tetrahydrosoquinoline-1-carboxamide (186 mg, white solid, Ret.time=4.162 min, e.e. 98%). LC-MS (ESI) 553.1 [M+H]$^+$. $^1$H NMR (400 MHz, CDCl$_3$) δ 9.75 (s, 1H), 7.81-7.76 (m, 2H), 7.64 (d, J=8.6 Hz, 1H), 7.52-7.42 (m, 4H), 6.20 (s, 1H), 4.39 (s, 1H), 4.03-3.91 (m, 1H), 3.82-3.69 (m, 1H), 3.36-3.25 (m, 1H), 3.11 (q, J=7.4 Hz, 2H), 3.06-2.97 (m, 1H), 2.34 (s, 3H), 1.29 (t, J=7.4 Hz, 3H).

Example 4: 4-(6-(Ethylsulfonyl)-1-((4-(1,1,1,3,3,3-hexafluoro-2-hydroxypropan-2-yl)phenyl)carbamoyl)-3,4-dihydroisoquinolin-2(1H)-yl)-4-oxobutanoic acid

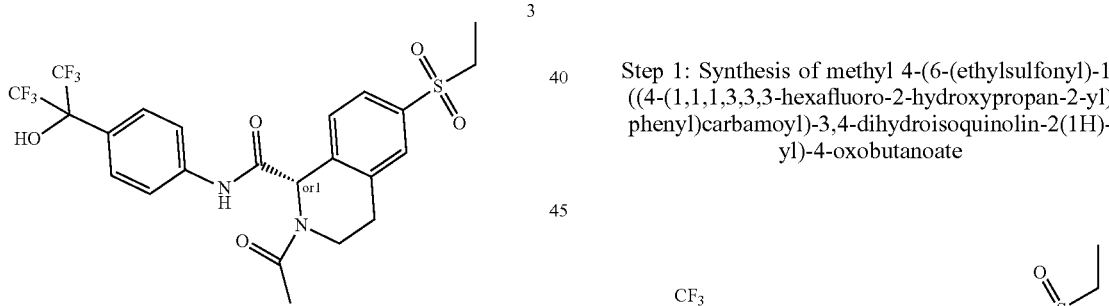

Step 1: Synthesis of methyl 4-(6-(ethylsulfonyl)-1-((4-(1,1,1,3,3,3-hexafluoro-2-hydroxypropan-2-yl)phenyl)carbamoyl)-3,4-dihydroisoquinolin-2(1H)-yl)-4-oxobutanoate

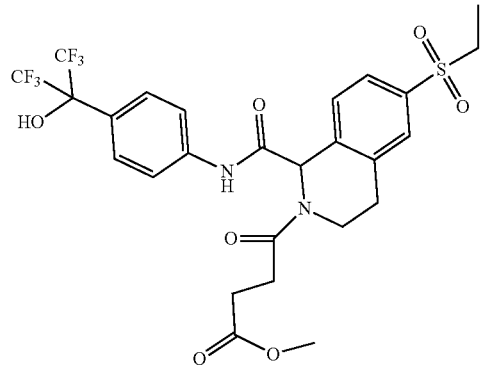 [SMILES: CCS(=O)(=O)c1ccc2c(c1)CCN(C(=O)CCC(=O)OC)C2C(=O)Nc1ccc(C(O)(C(F)(F)F)C(F)(F)F)cc1]

6-(Ethylsulfonyl)-N-(4-(1,1,1,3,3,3-hexafluoro-2-hydroxypropan-2-yl)phenyl)-1,2,3,4-tetrahydroisoquinoline-1-carboxamide hydrochloride (45.0 mg, 0.088 mmol) was dissolved in dry DCM (3 mL). At room temperature, DIEA (0.044 mL, 0.265 mmol) and methyl 4-chloro-4-oxobutyrate (33.2 mg, 0.221 mmol) were sequentially added dropwise to the reaction solution. After the addition was completed, the reaction solution was further stirred at room temperature for 30 minutes, and LC-MS monitored the completion of the reaction. The reaction solution was directly concentrated to obtain the target compound (70.0 mg, crude, brown oil). LC-MS (ESI) m/z: 625.0 [M+H]+.

Step 2: Synthesis of 4-(6-(Ethylsulfonyl)-1-((4-(1,1,1,3,3,3-hexafluoro-2-hydroxypropan-2-yl)phenyl)carbamoyl)-3,4-dihydroisoquinolin-2(1H)-yl)-4-oxobutanoic acid

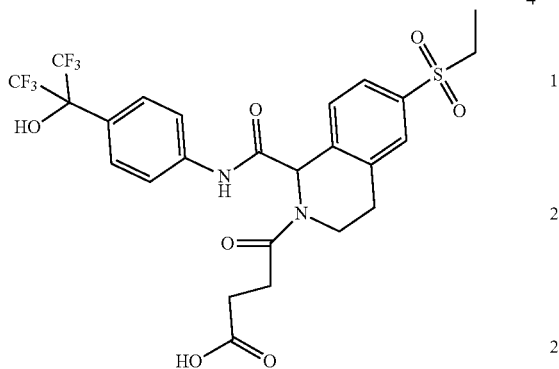

Methyl 4-(6-(ethylsulfonyl)-1-((4-(1,1,1,3,3,3-hexafluoro-2-hydroxypropan-2-yl)phenyl)carbamoyl)-3,4-dihydroisoquinolin-2(1H)-yl)-4-oxobutanoate (70.0 mg) was dissolved in methanol (3 mL), 1 mol/L aqueous sodium hydroxide solution (2 mL) was added dropwise to the reaction solution at room temperature. After the addition was completed, the reaction solution was further stirred at room temperature for 2 hours, and LC-MS monitored the completion of the reaction. The reaction solution was poured into ice water (20 mL), adjusted to around pH 3 with 1 mol/L hydrochloric acid, extracted with ethyl acetate (15 mL×2), the organic phases were combined, dried over anhydrous sodium sulfate, filtered, and the filtrate was concentrated under reduced pressure to obtain the crude product, which was separated and purified by reversed-phase silica gel column (water:acetonitrile=2:3) to obtain the target compound (14.0 mg, 26.0% yield in two steps, white solid). LC-MS (ESI) m/z: 611.0 [M+H]+. $^1$H NMR (400 MHz, DMSO-$d_6$) δ11.25, 10.76 (s, 1H), 8.37 (s, 1H), 7.83-7.79 (m, 1H), 7.79-7.66 (m, 4H), 7.60-7.54 (m, 2H), 6.07, 5.91 (s, 1H), 4.15-3.99 (m, 1H), 3.75-3.60 (m, 1H), 3.25 (q, J=14.7, 7.3 Hz, 2H), 3.19-3.12 (m, 1H), 3.05-2.97 (m, 1H), 2.74-2.67 (m, 1H), 2.64-2.57 (m, 1H), 2.42-2.34 (m, 2H), 1.07 (t, J=7.3 Hz, 3H).

Example 5: 2-Acetyl-N-(4-(1,1,1,3,3,3-hexafluoro-2-hydroxypropan-2-yl)phenyl)-6-(methylsulfonyl)-1,2,3,4-tetrahydroisoquinoline-1-carboxamide

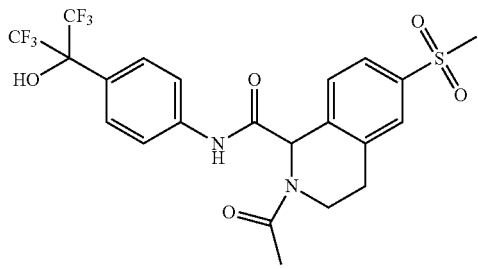

Step 1: Synthesis of 2-(tert-butyl) 1-ethyl 6-(methylthio)-3,4-dihydroisoquinoline-1,2(1H)-dicarboxylate

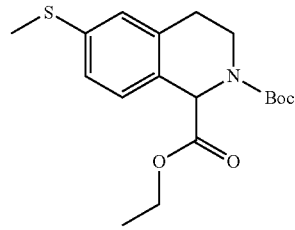 [SMILES: CCOC(=O)C1c2ccc(SC)cc2CCN1C(=O)OC(C)(C)C]

2-(tert-Butyl) 1-ethyl 6-(((trifluoromethyl)sulfonyl)oxy)-3,4-dihydroisoquinoline-1,2 (1H)-dicarboxylate (10.2 g, 12.4 mmol), Pd$_2$(dba)$_3$ (1.13 g, 1.24 mmol), 4,5-Bis(diphenylphosphino)-9,9-dimethylxanthene (1.43 g, 2.47 mmol), DIEA (4.09 mL, 24.7 mmol), methyl mercaptan (11.9 g, 24.7 mmol) and 1,4-dioxane (50 mL) were added to an autoclave. The autoclave was blown with nitrogen, and then quickly sealed. The reaction mixture was stirred at 100° C. for reaction overnight, and monitored by LC-MS. The reaction solution was cooled to room temperature, filtered, and the filtrate was concentrated under reduced pressure to obtain the crude product, which was separated and purified by silica gel column (PE:EA=20:1–15:1) to obtain the target compound (6.20 g, crude, yellow oil). LC-MS (ESI) m/z: 252.0 [M−Boc+H]+.

Step 2: Synthesis of 2-(tert-butyl) 1-ethyl 6-(methylsulfonyl)-3,4-dihydroisoquinoline-1,2(1H)-dicarboxylate

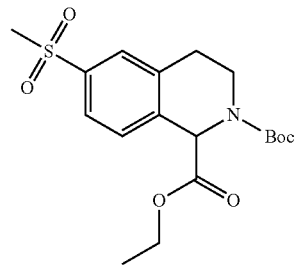 [SMILES: CCOC(=O)C1c2ccc(S(C)(=O)=O)cc2CCN1C(=O)OC(C)(C)C]

2-(tert-Butyl) 1-ethyl 6-(methylthio)-3,4-dihydroisoquinoline-1,2(1H)-dicarboxylate (6.20 g, 17.6 mmol) was dissolved in DCM (100 mL). Under an ice bath, m-chloroperoxybenzoic acid (8.95 g, 44.1 mmol, 85%) was slowly added to the reaction solution. After the addition was completed, the ice bath was removed, the reaction mixture was stirred at room temperature for 2 hours, and LC-MS monitored the completion of the reaction. The reaction solution was filtered, and the filtrate was sequentially washed with saturated sodium bicarbonate (100 mL) and saturated brine (100 mL), dried with anhydrous sodium sulfate and filtered, and the filtrate was concentrated under reduced pressure to obtain the crude product, which was separated and purified by silica gel column (PE:EA=10:1–2: 1) to obtain the target compound (1.38 g, 29.0% yield in two steps, yellow oil). LC-MS (ESI) m/z: 382.1 [M−H]−.

Step 3: Synthesis of 2-(tert-butoxycarbonyl)-6-(methylsulfonyl)-1,2,3,4-tetrahydroisoquinoline-1-carboxylic acid

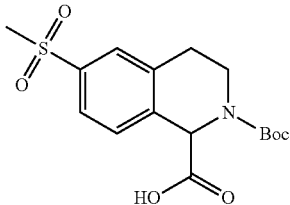 [SMILES: CC(C)(C)OC(=O)N1CCc2cc(S(C)(=O)=O)ccc2C1C(=O)O]

2-(tert-Butyl) 1-ethyl 6-(methylsulfonyl)-3,4-dihydroisoquinoline-1,2(1H)-dicarboxylate (1.38 g, 3.60 mmol) was dissolved in methanol (20 mL), 1 mol/L aqueous sodium hydroxide solution (10.8 mL, 10.8 mmol) was added dropwise to the reaction solution at room temperature. After the addition was completed, the reaction solution was further stirred at room temperature for 2 hours, and LC-MS monitored the completion of the reaction. The reaction solution was poured into ice water (30 mL) and adjusted to around pH 3 with 1 mol/L dilute hydrochloric acid, extracted with EA (20 mL×2), the organic phases were combined, dried with anhydrous sodium sulfate, filtered, and the filtrate was concentrated under reduced pressure to obtain the target compound (1.12 g, 87.6% yield, yellow solid). LC-MS (ESI) m/z: 709.1 [2M−H]⁻.

Step 4: Synthesis of tert-butyl 1-((4-(1,1,1,3,3,3-hexafluoro-2-hydroxypropan-2-yl)phenyl)carbamoyl)-6-(methylsulfonyl)-3,4-dihydroisoquinoline-2(1H)-carboxylate

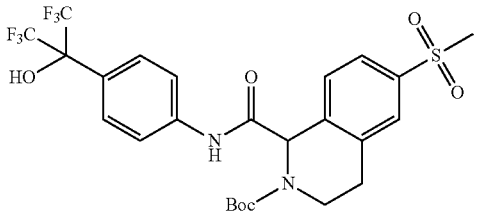

2-(tert-Butoxycarbonyl)-6-(methylsulfonyl)-1,2,3,4-tetrahydroisoquinoline-1-carboxylic acid (300 mg, 0.844 mmol) and 2-(4-aminophenyl)-1,1,1,3,3,3-hexafluoropropan-2-ol (219 mg, 0.844 mmol) were dissolved in dry DCM (5 mL). At room temperature, a solution of 50% 1-propylphosphonic anhydride in ethyl acetate (1.07 g, 1.69 mmol) and DIEA (0.419 mL, 2.53 mmol) were added dropwise to the reaction solution. After the addition was completed, the reaction mixture was stirred at room temperature overnight. The reaction solution was poured into saturated sodium bicarbonate (20 mL), extracted with DCM (15 mL×2), the organic phases were combined, washed with saturated brine (30 mL), dried over anhydrous sodium sulfate and filtered, and the filtrate was concentrated under reduced pressure to obtain the target compound (550 mg, crude, light brown solid). LC-MS (ESI) m/z: 595.1 [M−H]⁻.

Step 5: Synthesis of N-(4-(1,1,1,3,3,3-hexafluoro-2-hydroxypropan-2-yl)phenyl)-6-(methylsulfonyl)-1,2,3,4-tetrahydroisoquinoline-1-carboxamide hydrochloride

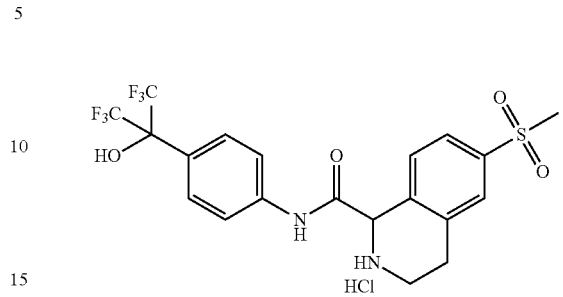

tert-Butyl 1-((4-(1,1,1,3,3,3-hexafluoro-2-hydroxypropan-2-yl)phenyl)carbamoyl)-6-(methylsulfonyl)-3,4-dihydroisoquinoline-2(1H)-carboxylate (550 mg, 0.922 mmol) was dissolved in DCM (6 mL). Under an ice bath, a solution of hydrochloric acid in dioxane (3 mL, 6 mol/L) was added dropwise to the reaction solution. After the addition was completed, the ice bath was removed, the reaction mixture was further stirred at room temperature for 2 hours, and LC-MS monitored the completion of the reaction. The reaction solution was concentrated under reduced pressure to obtain the target compound (550 mg, crude, brown solid). LC-MS (ESI) m/z: 497.0 [M+H]⁺.

Step 6: Synthesis of 2-acetyl-N-(4-(1,1,1,3,3,3-hexafluoro-2-hydroxypropan-2-yl)phenyl)-6-(methylsulfonyl)-1,2,3,4-tetrahydroisoquinoline-1-carboxamide

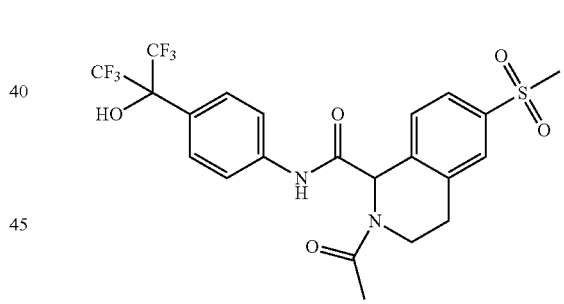

N-(4-(1,1,1,3,3,3-hexafluoro-2-hydroxypropan-2-yl)phenyl)-6-(methylsulfonyl)-1,2,3,4-tetrahydroisoquinoline-1-carboxamide hydrochloride (550 mg, 1.11 mmol) was dissolved in dry DCM (6 mL). At room temperature, DIEA (0.549 mL, 3.32 mmol) and acetyl chloride (0.198 mL, 2.77 mmol) were sequentially added dropwise to the reaction solution. After the addition was completed, the reaction solution was further stirred at room temperature for 30 minutes, and LC-MS monitored the completion of the reaction. The reaction solution was directly concentrated and dissolved in methanol (6 mL), and 1 mol/L aqueous sodium hydroxide solution (3 mL) was added dropwise to the reaction solution at room temperature. After the addition was completed, the reaction was further stirred at room temperature for 30 minutes, and LC-MS monitored the completion of the reaction. The reaction solution was poured into water (20 mL), extracted with EA (15 mL×2), the organic phases were combined, washed with saturated ammonium chloride (20 mL), dried over anhydrous sodium sulfate and filtered, and the filtrate was concentrated under reduced pressure to obtain the crude product, which was separated and purified by silica gel column (PE:EA=1:1–0:1) to obtain the target compound (120 mg, 26.4% yield in three steps, white solid). LC-MS (ESI) m/z: 539.0 [M+H]$^+$. $^1$H NMR (400 MHz, CDCl$_3$) δ 9.36 (s, 1H), 7.98-7.75 (m, 2H), 7.62-7.56 (m, 4H), 7.46 (d, J=8.3 Hz, 1H), 6.19 (s, 1H), 3.86 (s, 1H), 3.83-3.77 (m, 2H), 3.24-3.11 (m, 1H), 3.06 (s, 3H), 3.04-2.98 (m, 1H), 2.29 (s, 3H).

Example 6: 6-Acetyl-2-(ethylsulfonyl)-N-(4-(1,1,1,3,3,3-hexafluoro-2-hydroxypropan-2-yl)phenyl)-4,5,6,7-tetrahydrothieno[2,3-c]pyridine-7-carboxamide

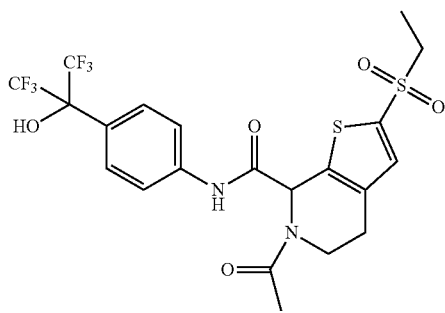

Step 1: Synthesis of 2-(thiophen-3-yl)ethan-1-amine hydrochloride

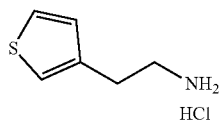

2-(Thiophen-3-yl)acetonitrile (4.63 mL, 40.6 mmol) was dissolved in dry tetrahydrofuran (60 mL). At room temperature, the borane in tetrahydrofuran (30.4 mL, 60.9 mmol, 2 mol/L) was added dropwise to the reaction solution. After the addition was completed, the reaction mixture was stirred at 60° C. overnight. The reaction solution was poured into 1 mol/L ice dilute hydrochloric acid (100 mL), extracted with EA (30 mL×3), the organic phases were combined, washed with saturated brine (60 mL), dried over anhydrous sodium sulfate, filtered, the filtrate was concentrated under reduced pressure to obtain crude product. The crude product was dissolved in methyl tert-butyl ether (20 mL), and added dropwise with 6 mol/L hydrochloric acid in dioxane until a white solid precipitated, filtered, and the filter cake was dried with an oil pump to obtain the target compound (4.80 g, 72.2% yield, white solid). LC-MS (ESI) m/z: 128.1 [M+H]$^+$.

Step 2: Synthesis of ethyl 4,5,6,7-tetrahydrothieno[2,3-c]pyridine-7-carboxylate

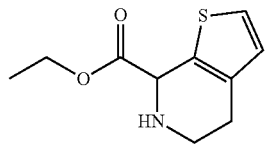

2-(Thiophen-3-yl)ethan-1-amine hydrochloride (2.80 g, 22.0 mmol) was dissolved in ethanol (30 mL). At room temperature, a solution of ethyl glyoxylate (4.94 g, 24.2 mmol, 50% in toluene) was added dropwise to the reaction solution. After the addition was completed, the reaction mixture was stirred at 100° C. overnight, and LC-MS monitored the completion of the reaction. The reaction solution was concentrated under reduced pressure to obtain the target compound (3.2 g, crude, brown oil). LC-MS (ESI) m/z: 212.0 [M+H]$^+$.

Step 3: Synthesis of ethyl 6-acetyl-4,5,6,7-tetrahydrothieno[2,3-c]pyridine-7-carboxylate

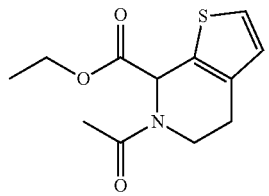 [SMILES: CCOC(=O)C1c2sccc2CCN1C(C)=O]

Ethyl 4,5,6,7-tetrahydrothieno[2,3-c]pyridine-7-carboxylate (1.00 g, 4.73 mmol) was dissolved in dry DCM (20 mL). At room temperature, DIEA (1.96 mL, 11.8 mmol) and acetyl chloride (0.507 mL, 7.10 mmol) were sequentially added dropwise to the reaction solution. After the addition was completed, the reaction solution was further stirred at room temperature for 1 hour, and LC-MS monitored the completion of the reaction. The reaction solution was directly concentrated to obtain the crude product, which was separated and purified by silica gel column (PE:EA=10:1–5:1) to obtain the target compound (571 mg, 32.8% yield in two steps, light brown oil). LC-MS (ESI) m/z: 254.0 [M+H]$^+$.

Step 4: Synthesis of ethyl 6-acetyl-2-bromo-4,5,6,7-tetrahydrothieno[2,3-c]pyridine-7-carboxylate

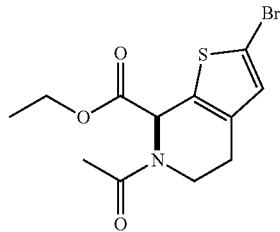 [SMILES: CCOC(=O)[C@H]1c2sc(Br)cc2CCN1C(C)=O]

Ethyl 6-acetyl-4,5,6,7-tetrahydrothieno[2,3-c]pyridine-7-carboxylate (571 mg, 2.25 mmol) was dissolved in DCM (10 mL). Under an ice bath, N-bromosuccinimide (602 mg, 3.381 mmol) was slowly added to the reaction solution. After the addition was completed, the ice bath was removed, the reaction mixture was further stirred at room temperature for 2 hours, and LC-MS monitored the completion of the reaction. The reaction solution was concentrated under reduced pressure to obtain the crude product, which was separated and purified by silica gel column (PE:EA=10:1–5:1) to obtain the target compound (631 mg, 84.3% yield, yellow oil). LC-MS (ESI) m/z: 331.9 [M+H]$^+$.

Step 5: Synthesis of ethyl 6-acetyl-2-(ethylthio)-4,5,6,7-tetrahydrothieno[2,3-c]pyridine-7-carboxylate

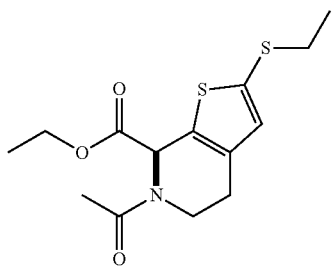 [SMILES: CCOC(=O)[C@H]1c2sc(SCC)cc2CCN1C(C)=O]

Ethyl 6-acetyl-2-bromo-4,5,6,7-tetrahydrothieno[2,3-c]pyridine-7-carboxylate (631 mg, 1.90 mmol), Pd$_2$(dba)$_3$ (174 mg, 0.190 mmol), 4,5-bis(diphenylphosphino)-9,9-dimethylxanthene (220 mg, 0.380 mmol), DIEA (0.628 mL, 3.80 mmol), ethanethiol (0.284 mL, 3.80 mmol) and 1,4-dioxane (8 mL) were sequentially added to the sealed tube. Nitrogen was blown into the sealed tube, and the tube was quickly sealed. The reaction mixture was stirred at 100° C. overnight, and LC-MS monitored the completion of the reaction. The reaction solution was cooled to room temperature, filtered, and the filtrate was concentrated under reduced pressure to obtain the crude product, which was separated and purified by silica gel column (PE:EA=4:1–2:1) to obtain the target compound (570 mg, 95.7% yield, brown oil). LC-MS (ESI) m/z: 314.0 [M+H]$^+$.

Step 6: Synthesis of ethyl 6-acetyl-2-(ethylsulfonyl)-4,5,6,7-tetrahydrothieno[2,3-c]pyridine-7-carboxylate

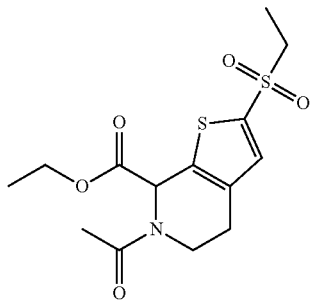 [SMILES: CCOC(=O)C1c2sc(S(=O)(=O)CC)cc2CCN1C(C)=O]

Ethyl 6-acetyl-2-(ethylthio)-4,5,6,7-tetrahydrothieno[2,3-c]pyridine-7-carboxylate (210 mg, 0.670 mmol) was dissolved in DCM (5 mL). Under an ice bath, in-chloroperoxybenzoic acid (272 mg, 1.34 mmol, 85%) was slowly added to the reaction solution. After the addition was completed, the ice bath was removed, the reaction mixture was stirred at room temperature for 2 hours, and LC-MS monitored the completion of the reaction. The reaction solution was filtered, and the filtrate was washed with saturated sodium bicarbonate (20 mL) and saturated brine (20 mL), dried over anhydrous sodium sulfate, filtered, and the filtrate was concentrated under reduced pressure to obtain the crude product, which was separated and purified by silica gel column (PE:EA=5:1–1:1) to obtain the target compound (89.0 mg, 38.5% yield, yellow oil). LC-MS (ESI) m/z: 346.0 [M+H]$^+$.

Step 7: Synthesis of 6-acetyl-2-(ethylsulfonyl)-4,5,6,7-tetrahydrothieno[2,3-c]pyridine-7-carboxylic acid

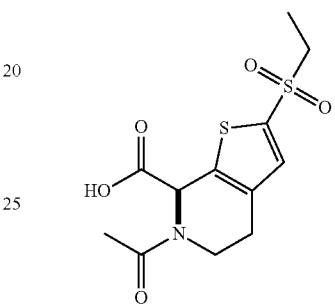

Ethyl 6-acetyl-2-(ethylsulfonyl)-4,5,6,7-tetrahydrothieno[2,3-c]pyridine-7-carboxylate (89.0 mg, 0.258 mmol) was dissolved in methanol (3 mL), 1 mol/L aqueous sodium hydroxide solution (0.773 mL) was added dropwise to the reaction solution at room temperature. After the addition was completed, the reaction solution was further stirred at room temperature for 2 hours, and LC-MS monitored the completion of the reaction. The reaction solution was poured into ice water (20 mL), adjusted to around pH 3 with 1 mol/L dilute hydrochloric acid, extracted with EA (10 mL×2), the organic phases were combined, dried over anhydrous sodium sulfate, filtered, and the filtrate was concentrated under reduced pressure to obtain the target compound (80.0 mg, 97.8% yield, yellow solid). LC-MS (ESI) m/z: 318.0 [M+H]$^+$.

Step 8: Synthesis of 6-acetyl-2-(ethylsulfonyl)-N-(4-(1,1,1,3,3,3-hexafluoro-2-hydroxypropan-2-yl)phenyl)-4,5,6,7-tetrahydrothieno[2,3-c]pyridine-7-carboxamide

6

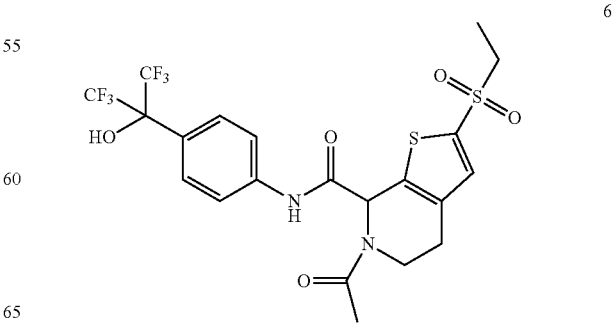

6-Acetyl-2-(ethylsulfonyl)-4,5,6,7-tetrahydrothieno[2,3-c]pyridine-7-carboxylic acid (40.0 mg, 0.126 mmol) and 2-(4-aminophenyl)-1,1,1,3,3,3-hexafluoropropan-2-ol (32.7 mg, 0.126 mmol) were dissolved in dry DCM (3 mL). At room temperature, a solution of 1-propylphosphonic anhydride in ethyl acetate (160 mg, 0.252 mmol, 50%) and DIEA (0.063 mL, 0.378 mmol) were sequentially added dropwise to the reaction solution. After the addition was completed, the reaction mixture was stirred at room temperature overnight. The reaction solution was poured into water (20 mL), extracted with DCM (15 mL×2), the organic phases were combined, washed sequentially with saturated ammonium chloride (20 mL), saturated sodium bicarbonate (20 mL) and saturated brine (20 mL), dried over anhydrous sodium sulfate, filtered, and the filtrate was concentrated under reduced pressure to obtain the crude product, which was separated and purified by silica gel column (PE:EA=2:1–0:1) to obtain the target compound (10.0 mg, 14.2% yield, white solid). $^1$H NMR (400 MHz, CDCl$_3$) δ 9.05 (s, 1H), 7.63 (d, J=8.5 Hz, 2H), 7.57 (d, J=8.6 Hz, 2H), 7.43 (s, 1H), 6.26 (s, 1H), 4.09-4.00 (m, 2H), 3.71-3.59 (m, 1H), 3.21 (q, J=7.4 Hz, 2H), 2.91-2.83 (m, 2H), 2.31 (s, 3H), 1.36 (t, J=7.4 Hz, 3H). LC-MS (ESI) m/z: 559.0 [M+H]$^+$.

Example 7: 2-Acetyl-6-(ethylsulfonyl)-N-(4-(perfluoropropan-2-yl)phenyl)-1,2,3,4-tetrahydroisoquinoline-1-carboxamide

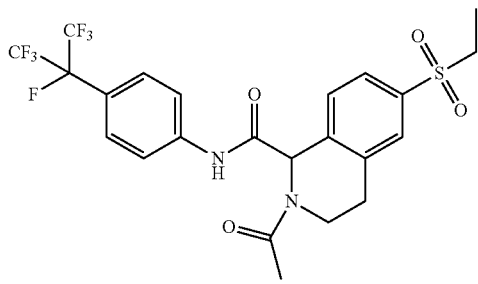 [SMILES: CCS(=O)(=O)c1ccc2c(c1)CCN(C(C)=O)C2C(=O)Nc1ccc(C(F)(C(F)(F)F)C(F)(F)F)cc1]

Step 1: Synthesis of 4-(perfluoropropan-2-yl)aniline

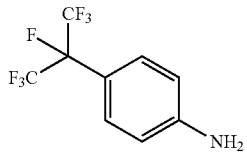

Aniline (1.00 g, 10.7 mmol), heptafluoro-2-iodopropane (1.82 mL, 12.9 mmol), sodium hydrosulfite (2.24 g, 12.9 mmol), tetrabutylammonium hydrogen sulfate (4.38 g, 12.9 mmol) and sodium bicarbonate (1.08 g, 12.9 mmol) were sequentially added to a mixed solvent of water (20 mL) and methyl tert-butyl ether (20 mL). After the addition was completed, the reaction mixture was stirred at room temperature overnight, TLC monitored the completion of the reaction. The reaction solution was poured into water (20 mL), extracted with methyl tert-butyl ether (20 mL×2), the organic phases were combined, washed with saturated brine (30 mL), dried over anhydrous sodium sulfate, filtered, and the filtrate was concentrated under reduced pressure to obtain the target compound (1.40 g, 49.9% yield, brown oil). $^1$H NMR (400 MHz, DMSO-d$_6$) δ 7.20 (d, J=8.3 Hz, 2H), 6.66 (d, J=8.5 Hz, 2H), 5.71 (s, 2H).

Step 2: Synthesis of tert-butyl 6-(ethylsulfonyl)-1-((4-(perfluoropropan-2-yl)phenyl)carbamoyl)-3,4-dihydroisoquinoline-2(1H)-carboxylate

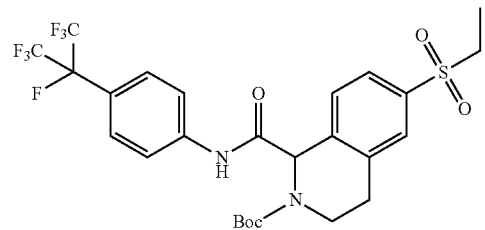 [SMILES: CCS(=O)(=O)c1ccc2c(c1)CCN(C(=O)OC(C)(C)C)C2C(=O)Nc1ccc(C(F)(C(F)(F)F)C(F)(F)F)cc1]

2-(tert-Butoxycarbonyl)-6-(ethylsulfonyl)-1,2,3,4-tetrahydroisoquinoline-1-carboxylic acid (100 mg, 0.271 mmol) and 4-(perfluoropropan-2-yl)aniline (70.7 mg, 0.271 mmol) were dissolved in dry DCM (5 mL). At room temperature, a solution of 1-propylphosphonic anhydride in ethyl acetate (345 mg, 0.541 mmol, 50%) and DIEA (0.134 mL, 0.812 mmol) were sequentially added to the reaction. After the addition was completed, the reaction mixture was stirred at room temperature overnight, and LC-MS monitored the completion of the reaction. The reaction solution was poured into water (20 mL), extracted with DCM (15 mL×2), and the organic phases were combined, sequentially washed with saturated ammonium chloride (20 mL), saturated sodium bicarbonate (20 mL) and saturated brine (20 mL), dried over anhydrous sodium sulfate and filtered, and the filtrate was concentrated under reduced pressure to obtain the target compound (200 mg, crude, brown oil). LC-MS (ESI) m/z: 611.2 [M−H]$^-$.

Step 3: Synthesis of 6-(ethylsulfonyl)-N-(4-(perfluoropropan-2-yl)phenyl)-1,2,3,4-tetrahydroisoquinoline-1-carboxamide hydrochloride

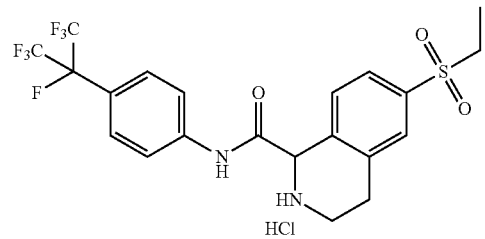 [SMILES: CCS(=O)(=O)c1ccc2c(c1)CCNC2C(=O)Nc1ccc(C(F)(C(F)(F)F)C(F)(F)F)cc1 ; Cl]

tert-Butyl 6-(ethylsulfonyl)-1-((4-(perfluoropropan-2-yl)phenyl)carbamoyl)-3,4-dihydroisoquinoline-2(1H)-carboxylate (200 mg) was dissolved in DCM (2 mL). Under an ice bath, a solution of hydrochloric acid in dioxane (1 mL, 6 mol/L) was added dropwise to the reaction solution. After the addition was completed, the ice bath was removed and the reaction mixture was further stirred at room temperature for 2 hours. The reaction solution was concentrated under reduced pressure to obtain the target compound (200 mg, crude, brown oil). LC-MS (ESI) m/z: 513.0 [M+H]$^+$.

Step 4: Synthesis of 2-acetyl-6-(ethylsulfonyl)-N-(4-(perfluoropropan-2-yl)phenyl)-1,2,3,4-tetrahydroisoquinoline-1-carboxamide

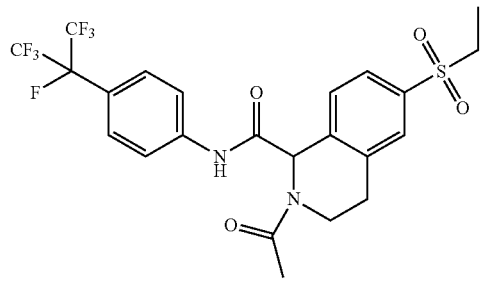

7

6-(Ethylsulfonyl)-N-(4-(perfluoropropan-2-yl)phenyl)-1,2,3,4-tetrahydroisoquinoline-1-carboxamide hydrochloride (200 mg, 0.390 mmol) was dissolved in dry DCM (3 mL). At room temperature, DIEA (0.129 mL, 0.781 mmol) and acetyl chloride (0.042 mL, 0.586 mmol) were sequentially added dropwise to the reaction solution. After the addition was completed, the reaction solution was further stirred at room temperature for 30 minutes. LC-MS monitored the completion of the reaction. The reaction solution was poured into saturated sodium bicarbonate (20 mL), extracted with DCM (10 mL×2), the organic phases were combined, washed with saturated ammonium chloride (20 mL), dried over anhydrous sodium sulfate and filtered, and the filtrate was concentrated under reduced pressure to obtain the crude product, which was separated and purified by silica gel column (PE:EA=2:1–0:1), and then separated and purified by reversed-phase column (acetonitrile:water=7:3) to obtain the target compound (15.0 mg, 10.0% yield in three steps, white solid). LC-MS (ESI) m/z: 555.0 [M+H]⁺. ¹H NMR (400 MHz, CDCl₃) δ 9.55 (s, 1H), 7.82-7.78 (m, 2H), 7.62 (d, J=8.8 Hz, 2H), 7.52-7.46 (m, 3H), 6.20 (s, 1H), 3.86-3.80 (m, 2H), 3.25-3.00 (m, 4H), 2.31 (s, 3H), 1.31 (t, J=7.4 Hz, 3H).

Example 8 and 9: (R)-2-Acetyl-6-(ethylsulfonyl)-N-(4-(perfluoropropan-2-yl)phenyl)-1,2,3,4-tetrahydroisoquinoline-1-carboxamide or (S)-2-acetyl-6-(ethylsulfonyl)-N-(4-(perfluoropropan-2-yl)phenyl)-1,2,3,4-tetrahydroisoquinoline-1-carboxamide

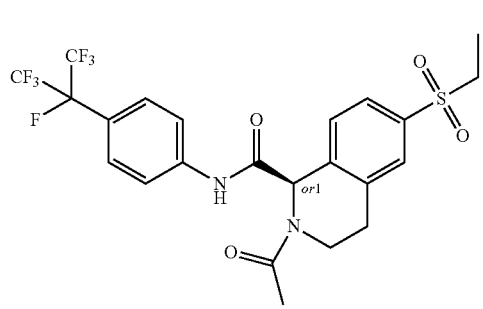

8

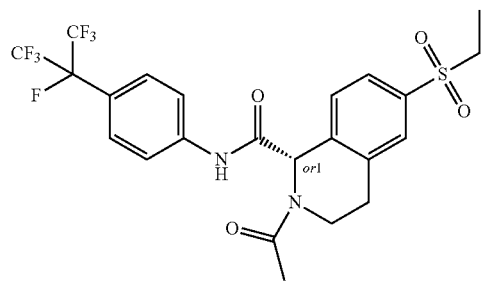

9

Racemate 2-acetyl-6-(ethylsulfonyl)-N-(4-(perfluoropropan-2-yl)phenyl)-1,2,3,4-tetrahydroisoquinoline-1-carboxamide (50.0 mg dissolved in approximately 25.0 mL methanol, 6.0 mL injection volume) was resolved by a Waters SFC 150 (room temperature, 100 bar, 214 nm) and 250*25 mm 10 μm Dr.maish Reprosil Chiral-OM (Similar to DAICELCHIRALCEL® OD) (supercritical carbon dioxide: methanol, 70:30, 3.5 min, 70 mL/min) to give (R)-2-acetyl-6-(ethylsulfonyl)-N-(4-(perfluoropropan-2-yl)phenyl)-1,2,3,4-tetrahydroisoquinoline-1-carboxamide or (S)-2-acetyl-6-(ethylsulfonyl)-N-(4-(perfluoropropan-2-yl)phenyl)-1,2,3,4-tetrahydroisoquinoline-1-carboxamide (15.46 mg, white solid, Ret.time=3.091 min, e.e. 100.00%). LC-MS (ESI) m/z: 555.3 [M+H]⁺. ¹H NMR (400 MHz, DMSO-d₆) δ 10.93 (s, 1H), 7.86-7.74 (m, 5H), 7.61 (d, J=8.5 Hz, 2H), 5.93 (s, 1H), 4.11-4.04 (m, 1H), 3.73-3.65 (m, 1H), 3.30-3.19 (m, 3H), 3.08-3.01 (m, 1H), 2.20-2.12 (m, 3H), 1.09 (t, J=7.3 Hz, 3H).

(S)-2-acetyl-6-(ethylsulfonyl)-N-(4-(perfluoropropan-2-yl)phenyl)-1,2,3,4-tetrahydroisoquinoline-1-carboxamide or (R)-2-acetyl-6-(ethylsulfonyl)-N-(4-(perfluoropropan-2-yl)phenyl)-1,2,3,4-tetrahydroisoquinoline-1-carboxamide (17.39 mg, white solid, Ret.time=3.682 min, e.e. 98.90%). LC-MS (ESI) m/z: 555.3 [M+H]⁺. ¹H NMR (400 MHz, DMSO-d₆) δ 10.93 (s, 1H), 7.87-7.74 (m, 5H), 7.61 (d, J=8.3 Hz, 2H), 5.93 (s, 1H), 4.11-4.03 (m, 1H), 3.73-3.65 (m, 1H), 3.30-3.19 (m, 3H), 3.09-3.00 (m, 1H), 2.20-2.12 (m, 3H), 1.09 (t, J=7.3 Hz, 3H).

Example 10: 2-Acetyl-6-(ethylsulfonyl)-N-(2-fluoro-4-(1,1,1,3,3,3-hexafluoro-2-hydroxypropan-2-yl)phenyl)-1,2,3,4-tetrahydroisoquinoline-1-carboxamide

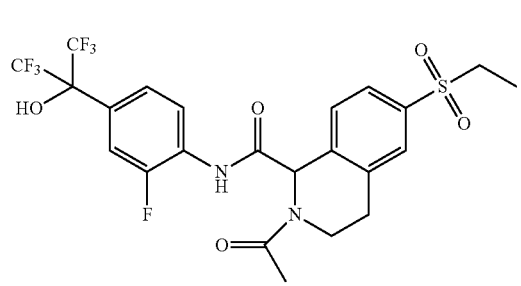

10

Step 1: Synthesis of 2-(4-amino-3-fluorophenyl)-1,1,1,3,3,3-hexafluoropropan-2-ol

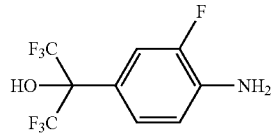

2-Fluoroaniline (3.00 g, 27.0 mmol), hexafluoroacetone trihydrate (6.54 g, 29.7 mmol) and p-toluenesulfonic acid (465 mg, 2.70 mmol) were added to a sealed tube. After the addition was completed, the reaction mixture was stirred at 90° C. for 5 days. After the reaction solution was cooled to room temperature, it was poured into water (50 mL), extracted with EA (30 mL), washed with saturated sodium bicarbonate (30 mL) and saturated brine (30 mL), and dried over anhydrous sodium sulfate and filtered, and the filtrate was concentrated under reduced pressure to obtain the crude product, which was separated and purified by silica gel column (PE:EA=10:1–2:1) to obtain the target compound (2.32 g, 31.0% yield, colorless oil). LC-MS (ESI) m/z: 276.1 [M–H]$^-$.

Step 2: Synthesis of tert-butyl 6-(ethylsulfonyl)-1-((2-fluoro-4-(1,1,1,3,3,3-hexafluoro-2-hydroxypropan-2-yl)phenyl)carbamoyl)-3,4-dihydroisoquinoline-2(1H)-carboxylate

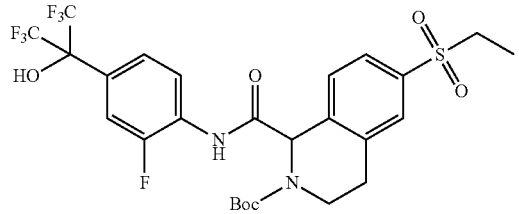 [SMILES: CCS(=O)(=O)c1ccc2c(c1)CCN(C(=O)OC(C)(C)C)C2C(=O)Nc1ccc(C(O)(C(F)(F)F)C(F)(F)F)cc1F]

2-(tert-Butoxycarbonyl)-6-(ethylsulfonyl)-1,2,3,4-tetrahydroisoquinoline-1-carboxylic acid (80.0 mg, 0.217 mmol) and 2-(4-amino-3-fluorophenyl)-1,1,1,3,3,3-hexafluoropropan-2-ol (60.0 mg, 0.217 mmol) were dissolved in dry DCM (3 mL). HATU (123 mg, 0.325 mmol) and DIEA (0.107 mL, 0.650 mmol) were sequentially added to the reaction solution at room temperature. After the addition was completed, the reaction mixture was stirred at room temperature overnight. The reaction solution was poured into water (20 mL), extracted with DCM (15 mL×2), the organic phases were combined, washed with saturated sodium bicarbonate (20 mL) and saturated brine (20 mL), dried over anhydrous sodium sulfate and filtered, and the filtrate was concentrated under reduced pressure to gave the target compound (130 mg, crude, brown oil). LC-MS (ESI) m/z: 627.2 [M–H]$^-$.

Step 3: Synthesis of 6-(ethylsulfonyl)-N-(2-fluoro-4-(1,1,1,3,3,3-hexafluoro-2-hydroxypropan-2-yl)phenyl)-1,2,3,4-tetrahydroisoquinoline-1-carboxamide hydrochloride

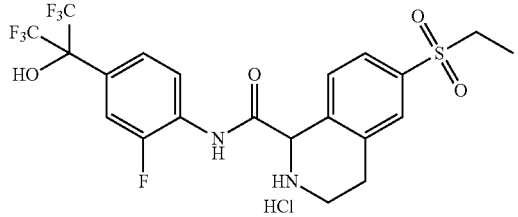 [SMILES: CCS(=O)(=O)c1ccc2c(c1)CCNC2C(=O)Nc1ccc(C(O)(C(F)(F)F)C(F)(F)F)cc1F ; Cl]

tert-Butyl 6-(ethylsulfonyl)-1-((2-fluoro-4-(1,1,1,3,3,3-hexafluoro-2-hydroxypropan-2-yl)phenyl)carbamoyl)-3,4-dihydroisoquinoline-2(1H)-carboxylate (130 mg) was dissolved in DCM (2 mL). Under an ice bath, a solution of hydrochloric acid in dioxane (1 mL, 6 mol/L) was added dropwise to the reaction solution. After the addition was completed, the ice bath was removed, the reaction mixture was further stirred at room temperature for 2 hours, and LC-MS monitored the completion of the reaction. The reaction solution was concentrated under reduced pressure to obtain the target compound (120 mg, crude, brown liquid).

Step 4: Synthesis of 2-acetyl-6-(ethylsulfonyl)-N-(2-fluoro-4-(1,1,1,3,3,3-hexafluoro-2-hydroxypropan-2-yl)phenyl)-1,2,3,4-tetrahydroisoquinoline-1-carboxamide

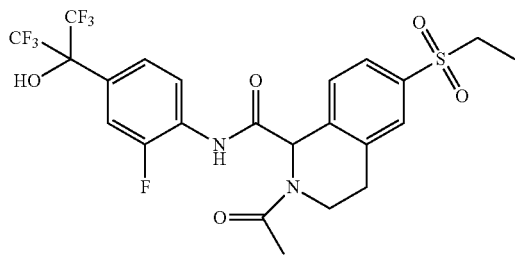

10

6-(Ethylsulfonyl)-N-(2-fluoro-4-(1,1,1,3,3,3-hexafluoro-2-hydroxypropan-2-yl)phenyl)-1,2,3,4-tetrahydroisoquinoline-1-carboxamide hydrochloride (120 mg, 0.227 mmol) was dissolved in dry DCM (5 mL). At room temperature, DIEA (0.113 mL, 0.681 mmol) and acetyl chloride (0.041 mL, 0.568 mmol) were sequentially added dropwise to the reaction solution. After the addition was completed, the reaction solution was further stirred at room temperature for 30 minutes, and LC-MS monitored the completion of the reaction. The reaction solution was directly concentrated and dissolved in methanol (6 mL), and 1 mol/L aqueous sodium hydroxide solution (3 mL) was added dropwise to the reaction solution at room temperature. After the addition was completed, the reaction was further stirred at room temperature for 30 minutes, and LC-MS monitored the completion of the reaction. The reaction solution was poured into water (20 mL), extracted with EA (15 mL×2), the organic phases were combined, washed with saturated ammonium chloride (20 mL), dried over anhydrous sodium sulfate, filtered, and the filtrate was concentrated under reduced pressure to obtain the crude product, which was separated and purified by silica gel column (PE:EA=1:1–0:1) to obtain the target compound (12.6 mg, 10.2% yield in three steps, white solid). LC-MS (ESI) m/z: 571.0 [M+H]⁺.¹H NMR (400 MHz, CDCl₃) δ 9.35 (s, 1H), 8.32 (t, J=8.4 Hz, 1H), 7.85-7.77 (m, 2H), 7.51 (d, J=12.7 Hz, 1H), 7.47-7.39 (m, 2H), 6.24 (s, 1H), 4.08-3.97 (m, 1H), 3.89-3.71 (m, 2H), 3.20-3.01 (m, 4H), 2.29 (s, 3H), 1.32 (t J=7.5 Hz, 3H).

Example 11: 2-Acetyl-N-(2-fluoro-4-(1,1,1,3,3,3-hexafluoro-2-hydroxypropan-2-yl)phenyl)-6-(methylsulfonyl)-1,2,3,4-tetrahydroisoquinoline-1-carboxamide

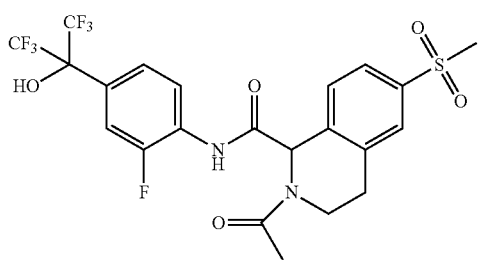

11

Step 1: Synthesis of tert-butyl 1-((2-fluoro-4-(1,1,1,3,3,3-hexafluoro-2-hydroxypropan-2-yl)phenyl)carbamoyl)-6-(methylsulfonyl)-3,4-dihydroisoquinoline-2(1H)-carboxylate

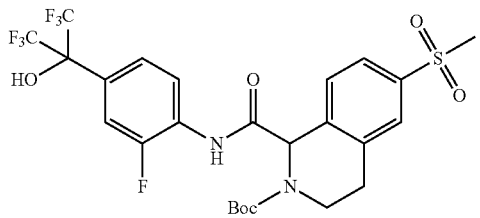 [SMILES: CC(C)(C)OC(=O)N1CCc2cc(S(C)(=O)=O)ccc2C1C(=O)Nc1ccc(C(O)(C(F)(F)F)C(F)(F)F)cc1F]

2-(tert-Butoxycarbonyl)-6-(methylsulfonyl)-1,2,3,4-tetrahydroisoquinoline-1-carboxylic acid (80.0 mg, 0.225 mmol) and 2-(4-amino-3-fluorophenyl)-1,1,1,3,3,3-hexafluoropropan-2-ol (62.4 mg, 0.225 mmol) was dissolved in dry DCM (3 mL). HATU (128 mg, 0.338 mmol) and DIEA (0.112 mL, 0.675 mmol) were sequentially added to the reaction solution at room temperature. After the addition was completed, the reaction mixture was stirred at room temperature overnight. The reaction solution was poured into water (20 mL), extracted with DCM (15 mL×2), the organic phases were combined, washed with saturated sodium bicarbonate (20 mL) and saturated brine (20 mL), dried over anhydrous sodium sulfate and filtered, the filtrate was concentrated under reduced pressure to obtain the target compound (130 mg, crude, brown oil). LC-MS (ESI) m/z: 613.2 [M−H]⁻.

Step 2: Synthesis of N-(2-fluoro-4-(1,1,1,3,3,3-hexafluoro-2-hydroxypropan-2-yl)phenyl)-6-(methylsulfonyl)-1,2,3,4-tetrahydroisoquinoline-1-carboxamide hydrochloride

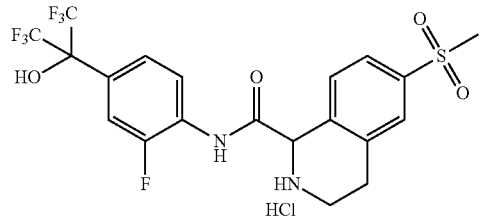 [SMILES: CS(=O)(=O)c1ccc2c(c1)CCNC2C(=O)Nc1ccc(C(O)(C(F)(F)F)C(F)(F)F)cc1F ; Cl]

tert-Butyl 1-((2-fluoro-4-(1,1,1,3,3,3-hexafluoro-2-hydroxypropan-2-yl)phenyl)carbamoyl)-6-(methylsulfonyl)-3,4-dihydroisoquinoline-2 (1H)-carboxylate (130 mg) was dissolved in DCM (2 mL). Under an ice bath, a solution of hydrochloric acid in dioxane (1 mL, 6 mol/L) was added dropwise to the reaction solution. After the addition was completed, the ice bath was removed, the reaction mixture was further stirred at room temperature for 2 hours, and LC-MS monitored the completion of the reaction. The reaction solution was concentrated under reduced pressure to obtain the target compound (120 mg, crude, yellow solid). LC-MS (ESI) m/z: 515.0 [M+H]⁺.

Step 3: Synthesis of 2-acetyl-N-(2-fluoro-4-(1,1,1,3,3,3-hexafluoro-2-hydroxypropan-2-yl)phenyl)-6-(methylsulfonyl)-1,2,3,4-tetrahydroisoquinoline-1-carboxamide

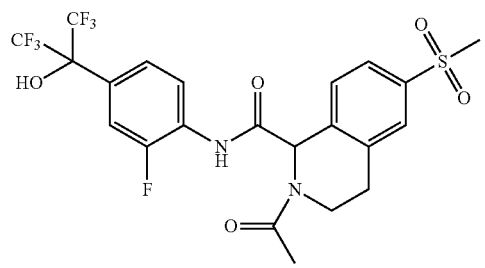

11

N-(2-fluoro-4-(1,1,1,3,3,3-hexafluoro-2-hydroxypropan-2-yl)phenyl)-6-(methylsulfonyl)-1,2,3,4-tetrahydroisoquinoline-1-carboxamide hydrochloride (120 mg, 0.233 mmol) was dissolved in dry DCM (3 mL). At room temperature, DIEA (0.116 mL, 0.670 mmol) and acetyl chloride (0.042 mL, 0.583 mmol) were sequentially added dropwise to the reaction solution. After the addition was completed, the reaction solution was further stirred at room temperature for 30 minutes, and LCMS monitored the completion of the reaction. The reaction solution was directly concentrated and dissolved in methanol (6 mL), and 1 mol/L aqueous sodium hydroxide solution (3 mL) was added dropwise to the reaction solution at room temperature. After the addition was completed, the reaction was further stirred at room temperature for 30 minutes, and LC-MS monitored the completion of the reaction. The reaction solution was poured into water (20 mL), extracted with EA (15 mL×2), the organic phases were combined, washed with saturated ammonium chloride (20 mL), dried over anhydrous sodium sulfate and filtered, and the filtrate was concentrated under reduced pressure to obtain crude product, which was separated and purificated by silica gel column (PE:EA=1:1–0:1) to obtain the target compound (16.1 mg, 12.9% yield in three steps, white solid). LC-MS (ESI) m/z: 557.0 [M+H]⁺. ¹H NMR (400 MHz, CDCl₃) δ 9.38 (s, 1H), 8.33 (t, J=8.4 Hz, 1H), 7.88-7.83 (m, 2H), 7.51 (d, J=11.8 Hz, 1H), 7.46-7.41 (m, 2H), 6.25 (s, 1H), 3.89-3.80 (m, 2H), 3.80-3.71 (m, 1H), 3.20-3.00 (m, 5H), 2.30 (s, 3H).

Example 12: 2-Acetyl-6-(ethylsulfonyl)-N-(4-(trifluoromethoxy)phenyl)-1,2,3,4-tetrahydroisoquinoline-1-carboxamide

12

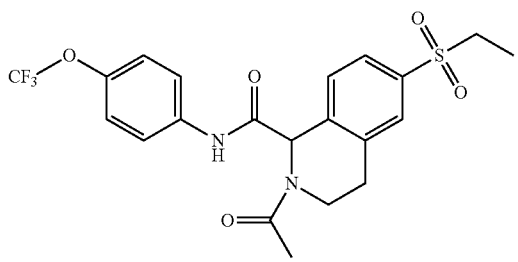

Step 1: Synthesis of tert-butyl 6-(ethylsulfonyl)-1-((4-(trifluoromethoxy)phenyl)carbamoyl)-3,4-dihydroisoquinoline-2(1H)-carboxylate

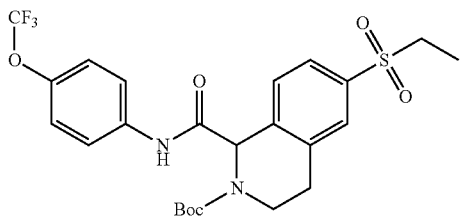 [SMILES: CCS(=O)(=O)c1ccc2c(c1)CCN(C(=O)OC(C)(C)C)C2C(=O)Nc1ccc(OC(F)(F)F)cc1]

2-(tert-Butoxycarbonyl)-6-(ethylsulfonyl)-1,2,3,4-tetrahydroisoquinoline-1-carboxylic acid (70.0 mg, 0.190 mmol) and 4-(trifluoromethoxy)aniline (33.6 mg, 0.190 mmol) were dissolved in dry DCM (3 mL). HATU (108 mg, 0.284 mmol) and DIEA (0.094 mL, 0.569 mmol) were sequentially added to the reaction at room temperature. After the addition was completed, the reaction mixture was stirred at room temperature overnight, and LC-MS monitored the completion of the reaction. The reaction solution was poured into water (20 mL), extracted with DCM (15 mL×2), and the organic phases were combined, washed sequentially with saturated ammonium chloride (20 mL), saturated sodium bicarbonate (20 mL) and saturated brine (20 mL), dried over anhydrous sodium sulfate and filtered, and the filtrate was concentrated under reduced pressure to obtain the target compound (110 mg, crude, brown oil). LC-MS (ESI) m/z: 527.2 [M–H]⁻.

Step 2: Synthesis of 6-(ethylsulfonyl)-N-(4-(trifluoromethoxy)phenyl)-1,2,3,4-tetrahydroisoquinoline-1-carboxamide hydrochloride

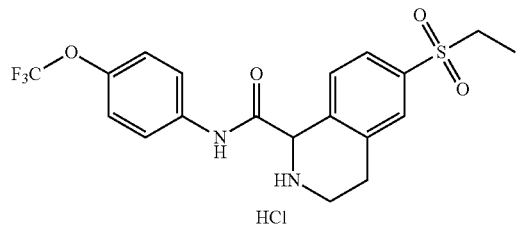 [SMILES: CCS(=O)(=O)c1ccc2c(c1)CCNC2C(=O)Nc1ccc(OC(F)(F)F)cc1 ; Cl]

tert-Butyl 6-(ethylsulfonyl)-1-((4-(trifluoromethoxy)phenyl)carbamoyl)-3,4-dihydroisoquinoline-2(1H)-carboxylate (110 mg) was dissolved in DCM (2 mL). Under an ice bath, a solution of hydrochloric acid in dioxane (1 mL, 6 mol/L) was added dropwise to the reaction solution. After the addition was completed, the ice bath was removed and the reaction mixture was further stirred at room temperature for 2 hours. The reaction solution was concentrated under reduced pressure to obtain the target compound (100 mg, crude, brown oil). LC-MS (ESI) m/z: 429.0 [M+H]⁺.

Step 3: Synthesis of 2-acetyl-6-(ethylsulfonyl)-N-(4-(trifluoromethoxy)phenyl)-1,2,3,4-tetrahydroisoquinoline-1-carboxamide

12

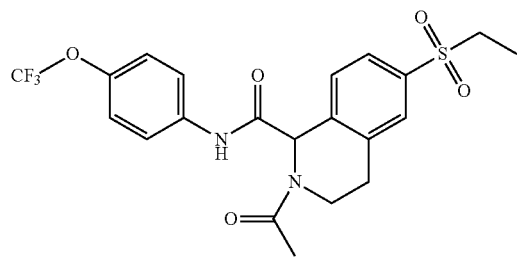

6-(Ethylsulfonyl)-N-(4-(trifluoromethoxy)phenyl)-1,2,3,4-tetrahydroisoquinoline-1-carboxamide hydrochloride (100 lug, 0.233 mmol) was dissolved in dry DCM (3 mL). At room temperature, DMA (0.077 mL, 0.467 mmol) and acetyl chloride (0.025 mL, 0.350 mmol) were sequentially added dropwise to the reaction solution. After the addition was completed, the reaction solution was further stirred at room temperature for 30 minutes. LC-MS monitored the completion of the reaction. The reaction solution was poured into saturated sodium bicarbonate (20 mL), extracted with DCM (10 mL×2), the organic phases were combined, washed with saturated ammonium chloride (20 mL), dried over anhydrous sodium sulfate and filtered, and the filtrate was concentrated under reduce pressure to obtain crude product, which was separated and purified by silica gel column (PE:EA=2:1–0:1) to obtain the target compound (26.0 mg, 29.1% yield in three steps, white solid). LC-MS (ESI) in/l: 471.0 [M+H]⁺. ¹H NMR (400 MHz, CDCl₃) δ 9.42 (s, 1H), 7.82-7.77 (m, 2H), 7.53-7.47 (m, 3H), 7.10 (d, J=8.8 Hz, 2H), 6.18 (s, 1H), 3.87-3.78 (m, 2H), 3.26-3.16 (m, 1H), 3.13 (q, J=7.5 Hz, 2H), 3.08-3.00 (m, 1H), 2.31 (s, 3H), 1.31 (t, J=7.4 Hz, 3H).

Example 13: 6-(Ethylsulfonyl)-N-(4-(1,1,1,3,3,3-hexafluoro-2-hydroxypropan-2-yl)phenyl)-2-propionyl-1,2,3,4-tetrahydroisoquinoline-1-carboxamide

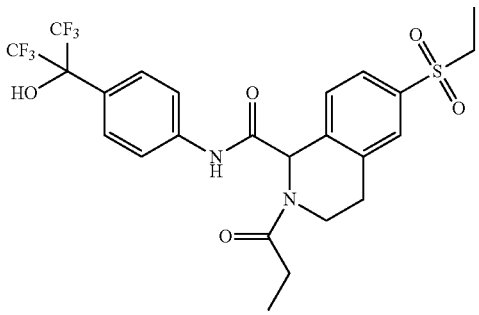

6-(Ethylsulfonyl)-N-(4-(1,1,1,3,3,3-hexafluoro-2-hydroxypropan-2-yl)phenyl)-1,2,3,4-tetrahydroisoquinoline-1-carboxamide hydrochloride (200 mg, 0.392 mmol) was dissolved in dry DCM (3 mL). At room temperature, triethylamine (0.163 mL, 1.18 mmol) and propionyl chloride (0.086 mL, 0.980 mmol) were sequentially added dropwise to the reaction solution. After the addition was completed, the reaction solution was further stirred at room temperature for 30 minutes, and LC-MS monitored the completion of the reaction. The reaction solution was directly concentrated and dissolved in methanol (3 mL), and 1 mol/L aqueous sodium hydroxide solution (2 mL) was added dropwise to the reaction solution at room temperature. After the addition was completed, the reaction was further stirred at room temperature for 30 minutes, and LC-MS monitored the completion of the reaction. The reaction solution was poured into water (20 mL), extracted with EA (15 mL×2), the organic phases were combined, washed with saturated ammonium chloride (20 mL), dried over anhydrous sodium sulfate and filtered, and the filtrate was concentrated under reduced pressure to obtain the crude product, which was separated and purified by silica gel column (PE:EA=1:1–0:1) and then by reversed-phase column (acetonitrile:water=7:3) to obtain the target compound (15.0 mg, 14.7% yield in three steps, white solid). LC-MS (ESI) 567.1 [M+H]$^+$. $^1$H NMR (600 MHz, CDCl$_3$) δ 9.40 (s, 1H), 7.83-7.76 (m, 2H), 7.64-7.57 (m, 4H), 7.48 (d, 1H), 6.21 (s, 1H), 3.87-3.81 (m, 1H), 3.80-3.74 (m, 1H), 3.19-3.10 (m, 3H), 3.07-3.00 (m, 1H), 2.61-2.48 (m, 2H), 1.32 (t, J=7.4 Hz, 3H), 1.26 (t, 3H).

Example 14: 2-(Cyclopropanecarbonyl)-6-(ethylsulfonyl)-N-(4-(1,1,1,3,3,3-hexafluoro-2-hydroxypropan-2-yl)phenyl)-1,2,3,4-tetrahydroisoquinoline-1-carboxamide

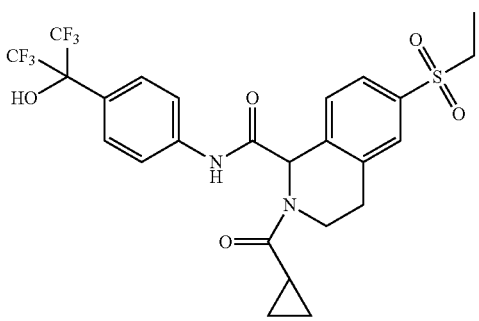

6-(Ethylsulfonyl)-N-(4-(1,1,1,3,3,3-hexafluoro-2-hydroxypropan-2-yl)phenyl)-1,2,3,4-tetrahydroisoquinoline-1-carboxamide hydrochloride (200 mg, 0.392 mmol) was dissolved in dry DCM (3 mL). At room temperature, triethylamine (0.163 mL, 1.18 mmol) and cyclopropylcarbonyl chloride (0.089 mL, 0.980 mmol) were sequentially added dropwise to the reaction solution. After the addition was completed, the reaction solution was further stirred at room temperature for 30 minutes, and LC-MS monitored the completion of the reaction. The reaction solution was directly concentrated and dissolved in methanol (3 mL), and 1 mol/L aqueous sodium hydroxide solution (2 mL) was added dropwise to the reaction solution at room temperature. After the addition was completed, the reaction was further stirred at room temperature for 30 minutes, and LC-MS monitored the completion of the reaction. The reaction solution was poured into water (20 mL), extracted with EA (15 mL×2), the organic phases were combined, washed with saturated ammonium chloride (20 mL), dried over anhydrous sodium sulfate and filtered, and the filtrate was concentrated under reduced pressure to obtain the crude product, which was separated and purified by silica gel column (PE:EA=1:1–0:1) and then by reversed-phase column (acetonitrile:water=7:3) to obtain the target compound (40.0 mg, 38.4% yield in three steps, white solid). LC-MS (ESI) m/z: 579.1 [M+H]$^+$. $^1$H NMR (400 MHz, CDCl$_3$) δ 9.65 (s, 1H), 7.85-7.80 (m, 2H), 7.63-7.57 (m, 2H), 7.56-7.50 (m, 3H), 6.20 (s, 1H), 4.17-3.96 (m, 3H), 3.31-3.22 (m, 1H), 3.20-3.06 (m, 3H), 1.97-1.88 (m, 1H), 1.34 (t, J=7.4 Hz, 3H), 1.12-0.93 (m, 4H).

Example 15: 6-(Ethylsulfonyl)-N$^1$-(4-(1,1,1,3,3,3-hexafluoro-2-hydroxypropan-2-yl)phenyl)-N$^2$-methyl-3,4-dihydroisoquinoline-1,2(1H)-dicarboxamide

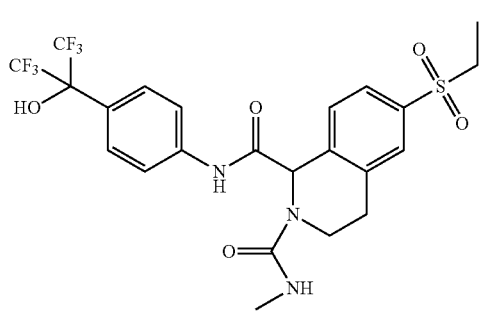

6-(Ethylsulfonyl)-N-(4-(1,1,1,3,3,3-hexafluoro-2-hydroxypropan-2-yl)phenyl)-1,2,3,4-tetrahydroisoquinoline-1-carboxamide hydrochloride (200 mg, 0.392 mmol) was dissolved in dry DCM (3 mL). At room temperature, triethylamine (0.163 mL, 1.18 mmol) and methylcarbamoyl chloride (91.6 mg, 0.980 mmol) were sequentially added dropwise to the reaction solution. After the addition was completed, the reaction solution was further stirred at room temperature for 30 minutes, and LC-MS monitored the completion of the reaction. The reaction solution was poured into water (20 mL), extracted with DCM (15 mL×2), the organic phases were combined, washed successively with saturated sodium bicarbonate (20 mL) and saturated ammonium chloride (20 mL), dried over anhydrous sodium sulfate and filtered, and the filtrate was concentrated under reduced pressure to obtain crude product, which was separated and purified by silica gel column (PE:EA=1:1–0:1) and by reversed-phase column (acetonitrile:water=7:3) to obtain the target compound (30.0 mg, 29.3% yield in three steps, white solid). LC-MS (ESI) m/z: 568.0 [M+H]$^+$. $^1$H NMR (400 MHz, DMSO-d$_6$) δ 10.64 (s, 1H), 8.64 (s, 1H), 7.84-7.65 (m, 5H), 7.58 (d, J=8.5 Hz, 2H), 6.71-6.63 (m, 1H), 5.81 (s, 1H), 3.88-3.78 (m, 1H), 3.57-3.47 (m, 1H), 3.29-3.21 (m, 2H), 3.20-3.11 (m, 1H), 3.03-2.91 (m, 1H), 2.61 (d, J=4.0 Hz, 3H), 1.07 (t, J=7.3 Hz, 3H).

Example 16: 5-(1-((4-(1,1,1,3,3,3-hexafluoro-2-hydroxypropan-2-yl)phenyl)carbamoyl)-6-(methylsulfonyl)-3,4-dihydroisoquinolin-2(1H)-yl)-5-oxopentanoic acid

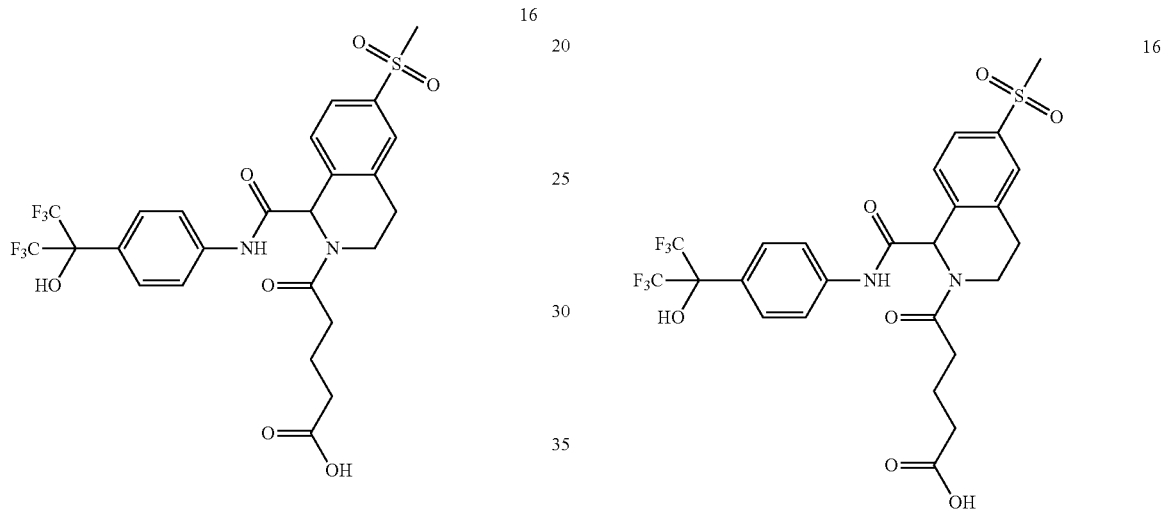

Step 1: Synthesis of methyl 5-(1-((4-(1,1,1,3,3,3-hexafluoro-2-hydroxypropan-2-yl)phenyl)carbamoyl)-6-(methylsulfonyl)-3,4-dihydroisoquinolin-2(1H)-yl)-5-oxopentanoate

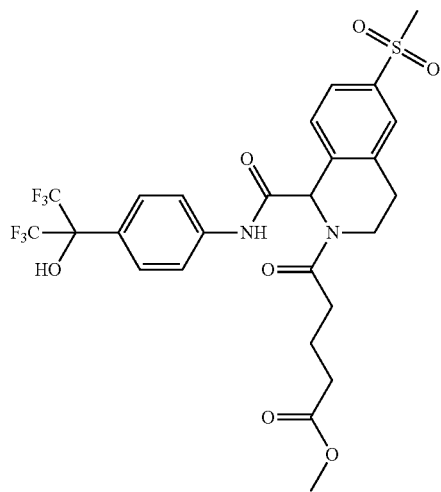 [SMILES: COC(=O)CCCC(=O)N1CCc2cc(S(C)(=O)=O)ccc2C1C(=O)Nc1ccc(C(O)(C(F)(F)F)C(F)(F)F)cc1]

N-(4-(1,1,1,3,3,3-hexafluoro-2-hydroxypropan-2-yl)phenyl)-6-(methylsulfonyl)-1,2,3,4-tetrahydroisoquinoline-1-carboxamide hydrochloride (50.0 mg, 0.101 mmol) was dissolved in dry DCM (3 mL). At room temperature, DIEA (0.050 mL, 0.302 mmol) and methyl 5-chloro-5-oxopentanoate (41.4 mg, 0.252 mmol) were sequentially added dropwise to the reaction solution. After the addition was completed, the reaction solution was further stirred at room temperature for 1 hour, and LC-MS monitored the completion of the reaction. The reaction solution was directly concentrated to obtain the target compound (100 mg, crude, brown oil). LC-MS (ESI) m/z: 625.0 [M+H]$^+$.

Step 2: Synthesis of 5-(1-((4-(1,1,1,3,3,3-hexafluoro-2-hydroxypropan-2-yl)phenyl)carbamoyl)-6-(methylsulfonyl)-3,4-dihydroisoquinolin-2(1H)-yl)-5-oxopentanoic acid Methyl 5-(1-((4-(1,1,1,3,3,3-hexafluoro-2-hydroxypropan-2-yl)phenyl)carbamoyl)-6-(methylsulfonyl)-3,4-dihydroisoquinolin-2(1H)-yl)-5-oxopentanoate (100 mg) was dissolved in methanol (3 mL), and 1 mol/L aqueous sodium hydroxide solution (2 mL) was added dropwise to the reaction solution at room temperature. After the addition was completed, the reaction solution was further stirred at room temperature for 2 hours, and LC-MS monitored the completion of the reaction. The reaction solution was poured into ice water (20 mL), adjusted to around pH 3 with 1 mol/L dilute hydrochloric acid, extracted with EA (15 mL×2), the organic phases were combined, dried over anhydrous sodium sulfate and filtered, and the filtrate was concentrated under reduced pressure to obtain crude product, which was separated and purified by reversed-phase silica gel column (water:acetonitrile=2:3) to obtain the target compound (20.0 mg, 32.5% yield in two steps, white solid). LC-MS (ESI) m/z: 611.0 [M+H]$^+$. $^1$H NMR (400 MHz, DMSO-d$_6$) δ 11.42, 10.79 (s, 1H), 8.38 (s, 1H), 7.86-7.71 (m, 4H), 7.67 (d, J=8.7 Hz, 2H), 7.57 (d, J=8.3 Hz, 2H), 6.08, 5.89 (s, 1H), 4.10-4.01 (m, 1H), 3.69-3.59 (m, 2H), 3.16 (s, 3H), 3.04-2.93 (m, 2H), 2.59-2.50 (m, 2H), 2.25-2.16 (m, 2H), 1.76-1.68 (m, 2H).

Example 17: 2-Acetyl-N-(3,5-dichloro-4-(3,6-dihydro-2H-pyran-4-yl)phenyl)-6-(methylsulfonyl)-1,2,3,4-tetrahydroisoquinoline-1-carboxamide

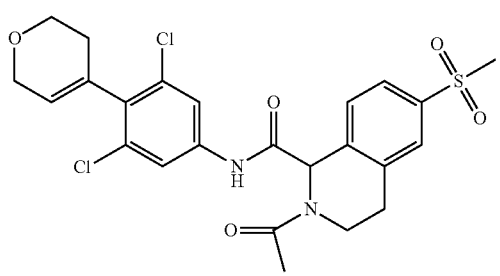

Step 1: Synthesis of 3,5-dichloro-4-(3,6-dihydro-2H-pyran-4-yl)aniline

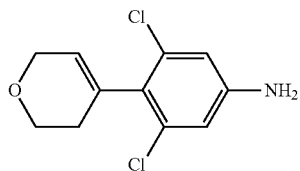 [SMILES: Nc1cc(Cl)c(C2=CCOCC2)c(Cl)c1]

4-Bromo-3,5-dichloroaniline (700 mg, 2.91 mmol), 3,6-dihydro-2H-pyran-4-boronic acid pinacol ester (671 mg, 3.20 mmol), potassium carbonate (803 mg, 5.81 mmol) and dichloro[1,1'-bis(di-tert-butylphosphino)ferrocene palladium(II)] (94.7 mg, 0.145 mmol) were added to a mixed solvent of 1,4-dioxane (10 mL) and water (1 mL). Under nitrogen protection, the reaction mixture was stirred at 110° C. for 1.5 hours, and LC-MS monitored the completion of the reaction. The reaction mixture was cooled to room temperature and filtered, and the filtrate was concentrated under reduced pressure to obtain crude product, which was separated and purified by silica gel column (PE:EA=20:1–5:1) to obtain the target compound (350 mg, 49.3% yield). LC-MS (ESI) m/z: 285.0[M+H+MeCN]$^+$. $^1$H NMR (400 MHz, CDCl$_3$) δ 6.62 (s, 2H), 5.61 (s, 1H), 4.30 (q, J=5.3, 2.6 Hz, 2H), 3.91 (t, J=5.4 Hz, 2H), 3.75 (s, 2H), 2.31-2.24 (m, 2H).

Step 2: Synthesis of tert-butyl 1-((3,5-dichloro-4-(3,6-dihydro-2H-pyran-4-yl)phenyl)carbamoyl)-6-(methylsulfonyl)-3,4-dihydroisoquinoline-2(1H)-carboxylate

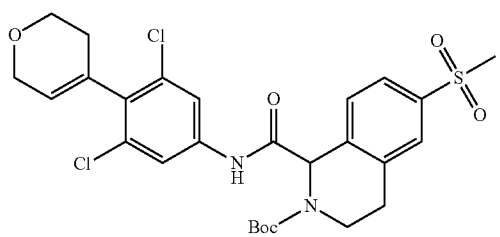 [SMILES: CC(C)(C)OC(=O)N1CCc2cc(S(C)(=O)=O)ccc2C1C(=O)Nc1cc(Cl)c(C2=CCOCC2)c(Cl)c1]

2-(tert-Butoxycarbonyl)-6-(methylsulfonyl)-1,2,3,4-tetrahydroisoquinoline-1-carboxylic acid (50.0 mg, 0.141 mmol) and 3,5-dichloro-4-(3,6-dihydro-2H-pyran-4-yl)aniline (34.3 mg, 0.141 mmol) was dissolved in dry DCM (3 mL). HATU (80.3 mg, 0.211 mmol) and DIEA (0.070 mL, 0.422 mmol) were sequentially added to the reaction at room temperature. After the addition was completed, the reaction mixture was stirred at room temperature overnight. LC-MS monitored the completion of the reaction. The reaction solution was poured into water (20 mL), extracted with DCM (15 mL×2), the organic phases were combined, washed with saturated ammonium chloride (20 mL), saturated sodium bicarbonate (20 mL) and saturated brine (30 mL), dried over anhydrous sodium sulfate and filtered, and the filtrate was concentrated under reduced pressure to obtain the target compound (100 mg, crude, brown oil). LC-MS (ESI) m/z: 579.1 [M−H]$^-$.

Step 3: Synthesis of N-(3,5-dichloro-4-(3,6-dihydro-2H-pyran-4-yl)phenyl)-6-(methylsulfonyl)-1,2,3,4-tetrahydroisoquinoline-1-carboxamide hydrochloride

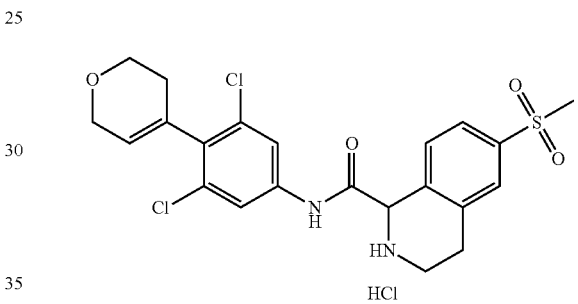

tert-Butyl 1-((3,5-dichloro-4-(3,6-dihydro-2H-pyran-4-yl)phenyl)carbamoyl)-6-(methylsulfonyl)-3,4-dihydroisoquinoline-2(1H)-carboxylate (100 mg) was dissolved in DCM (2 mL). Under an ice bath, a solution of 6 mol/L hydrochloric acid in dioxane (1 mL) was added dropwise to the reaction solution. After the addition was completed, the ice bath was removed and the reaction mixture was further stirred at room temperature for 2 hours. The reaction solution was concentrated under reduced pressure to obtain the target compound (90.0 mg, crude, brown oil). LC-MS (ESI) m/z: 480.9 [M+H]$^+$.

Step 4: Synthesis of 2-acetyl-N-(3,5-dichloro-4-(3,6-dihydro-2H-pyran-4-yl)phenyl)-6-(methylsulfonyl)-1,2,3,4-tetrahydroisoquinoline-1-carboxamide

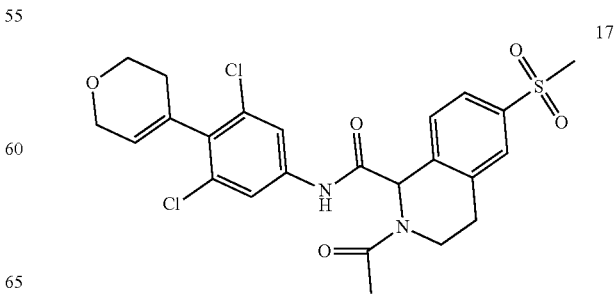

N-(3,5-dichloro-4-(3,6-dihydro-2H-pyran-4-yl)phenyl)-6-(methylsulfonyl)-1,2,3,4-tetrahydroisoquinoline-1-carboxamide hydrochloride (90.0 mg, 0.187 mmol) was dissolved in dry DCM (3 mL). At room temperature, DIEA (0.093 mL, 0.561 mmol) and acetyl chloride (0.027 mL, 0.374 mmol) were sequentially added dropwise to the reaction solution. After the addition was completed, the reaction solution was further stirred at room temperature for 30 minutes, and LC-MS monitored the completion of the reaction. The reaction solution was poured into water (20 mL), extracted with DCM (10 mL×2), the organic phases were combined, and then washed with saturated sodium bicarbonate (20 mL), saturated ammonium chloride (20 mL) and saturated brine (20 mL) successively, dried with anhydrous sodium sulfate and filtered, and the filtrate was concentrated under reduced pressure to obtain crude product, which was separated and purified by silica gel column (PE:EA=2:1–0:1) to obtain the target compound (20.0 mg, 27.2% yield in three steps, white solid). LC-MS (ESI) m/z: 523.0 [M+H]$^+$ $_1$H NMR (400 MHz, CDCl$_3$) δ 9.38 (s, 1H), 7.90-7.79 (m, 2H), 7.53 (s, 2H), 7.45 (d, J=8.4 Hz, 1H), 6.14 (s, 1H), 5.61 (s, 1H), 4.33-4.26 (m, 2H), 3.91 (t, J=5.0 Hz, 2H), 3.80 (t, J=5.6 Hz, 2H), 3.23-3.10 (m, 1H), 3.06 (s, 3H), 3.05-2.99 (m, 1H), 2.30 (s, 3H), 2.28-2.24 (m, 2H).

Example 18: 2-Acetyl-N-(3,5-dichloro-4-(3,6-dihydro-2H-pyran-4-yl)phenyl)-6-(ethylsulfonyl)-1,2,3,4-tetrahydroisoquinoline-1-carboxamide

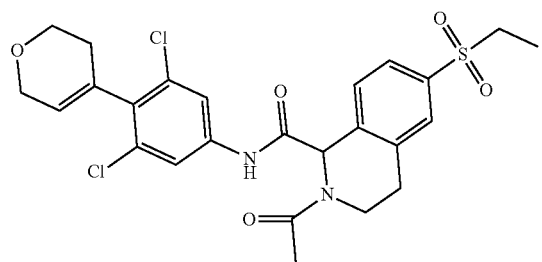

18

Step 1: Synthesis of tert-butyl 1-((3,5-dichloro-4-(3,6-dihydro-2H-pyran-4-yl)phenyl)carbamoyl)-6-(ethylsulfonyl)-3,4-dihydroisoquinoline-2(1H)-carboxylate

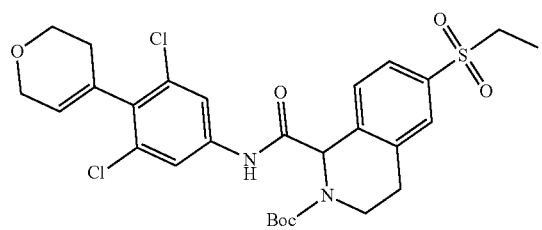 [SMILES: CCS(=O)(=O)c1ccc2c(c1)CCN(C(=O)OC(C)(C)C)C2C(=O)Nc1cc(Cl)c(C2=CCOCC2)c(Cl)c1]

2-(tert-Butoxycarbonyl)-6-(ethylsulfonyl)-1,2,3,4-tetrahydroisoquinoline-1-carboxylic acid (50.0 mg, 0.135 mmol) and 3,5-dichloro-4-(3,6-dihydro-2H-pyran-4-yl)aniline (33.0 mg, 0.135 mmol) were dissolved in dry DCM (3 mL). HATU (77.2 mg, 0.203 mmol) and DIEA (0.067 mL, 0.406 mmol) were sequentially added to the reaction solution at room temperature. After the addition was completed, the reaction mixture was stirred at room temperature overnight. LC-MS monitored the completion of the reaction. The reaction solution was poured into water (20 mL), extracted with DCM (15 mL×2), and the organic phases were combined, washed sequentially with saturated ammonium chloride (20 mL), saturated sodium bicarbonate (20 mL) and saturated brine (30 mL), dried over anhydrous sodium sulfate and filtered, and the filtrate was concentrated under reduced pressure to obtain the target compound (100 mg, crude, brown oil). LC-MS (ESI) m/z: 593.1 [M−H]$^-$.

Step 2: Synthesis of N-(3,5-dichloro-4-(3,6-dihydro-2H-pyran-4-yl)phenyl)-6-(ethylsulfonyl)-1,2,3,4-tetrahydroisoquinoline-1-carboxamide hydrochloride

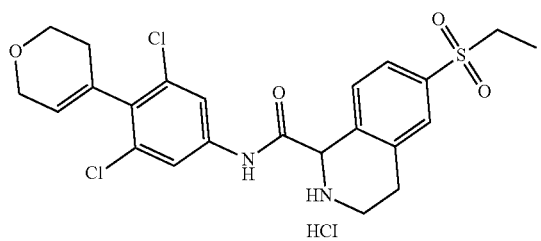

tert-Butyl 1-((3,5-dichloro-4-(3,6-dihydro-2H-pyran-4-yl)phenyl)carbamoyl)-6-(ethylsulfonyl)-3,4-dihydroisoquinoline-2(1H)-carboxylate (100 mg, 0.168 mmol) was dissolved in DCM (2 mL). Under an ice bath, a solution of 6 mol/L hydrochloric acid in dioxane (1 mL) was added dropwise to the reaction solution. After the addition was completed, the ice bath was removed and the reaction mixture was further stirred at room temperature for 2 hours. The reaction solution was concentrated under reduced pressure to obtain the target compound (100 mg, crude, brown oil). LC-MS (ESI) m/z: 493.1 [M−H]$^-$.

Step 3: Synthesis of 2-acetyl-N-(3,5-dichloro-4-(3,6-dihydro-2H-pyran-4-yl)phenyl)-6-(ethylsulfonyl)-1,2,3,4-tetrahydroisoquinoline-1-carboxamide

18

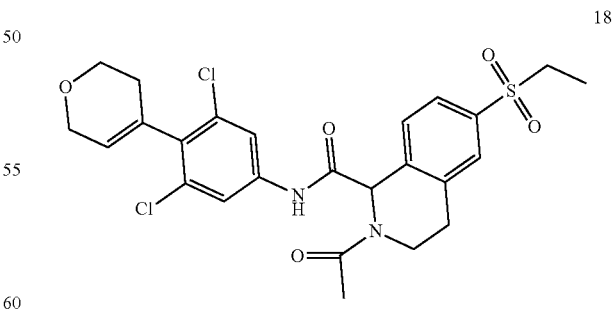

N-(3,5-dichloro-4-(3,6-dihydro-2H-pyran-4-yl)phenyl)-6-(ethylsulfonyl)-1,2,3,4-tetrahydroisoquinoline-1-carboxamide hydrochloride (100 mg, 0.202 mmol) was dissolved in dry DCM (3 mL). At room temperature, DMA (0.100 mL, 0.605 mmol) and acetyl chloride (0.029 mL, 0.404 mmol) were sequentially added dropwise to the reaction solution.

After the addition was completed, the reaction solution was further stirred at room temperature for 30 minutes, and LC-MS monitored the completion of the reaction. The reaction solution was poured into water (20 mL), extracted with DCM (10 mL×2), the organic phases were combined, and then washed with saturated sodium bicarbonate (20 mL), saturated ammonium chloride (20 mL) and saturated brine (20 mL) sequentially, dried over anhydrous sodium sulfate and filtered, and the filtrate was concentrated under reduced pressure to obtain crude product, which was separated and purified by silica gel column (PE:EA=2:1–0:1) to obtain the target compound (30.0 mg, 41.5% yield in three-steps, white solid). LC-MS (ESI) m/z: 537.0 [M+H]$^+$. $^1$H NMR (400 MHz, CDCl$_3$) δ 9.51 (s, 1H), 7.84-7.74 (m, 2H), 7.54-7.43 (m, 3H), 6.14 (s, 1H), 5.60 (s, 1H), 4.36-4.22 (m, 2H), 3.90 (t, J=5.0 Hz, 2H), 3.87-3.73 (m, 2H), 3.29-3.18 (m, 1H), 3.12 (q, J=7.3 Hz, 2H), 3.07-2.97 (m, 1H), 2.32 (s, 3H), 2.27-2.21 (m, 2H), 1.30 (t, J=7.4 Hz, 3H).

Example 19: 6-(Ethylsulfonyl)-2-formyl-N-(4-(1,1,1,3,3,3-hexafluoro-2-hydroxypropan-2-yl)phenyl)-1,2,3,4-tetrahydroisoquinoline-1-carboxamide

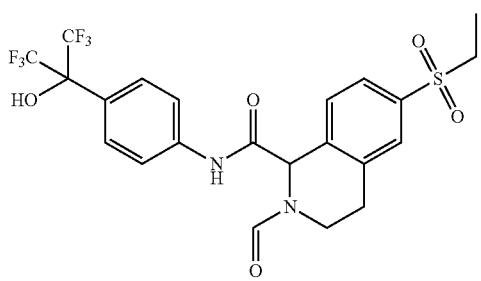

6-(Ethylsulfonyl)-N-(4-(1,1,1,3,3,3-hexafluoro-2-hydroxypropan-2-yl)phenyl)-1,2,3,4-tetrahydroisoquinoline-1-carboxamide (100 mg, 0.196 mmol) and formic acid (37.7 mg, 0.196 mmol) were dissolved in dry DCM (2 mL). At room temperature, 1-propylphosphonic anhydride (50% in EA) (93.5 mg, 0.294 mmol) and DIEA (50.6 mg, 0.392 mmol) were sequentially added dropwise to the reaction solution. After the addition was completed, the reaction mixture was stirred at room temperature overnight. The reaction solution was poured into saturated sodium bicarbonate (3 mL), extracted with DCM (4 mL×2), the organic phases were combined, washed with saturated brine, dried over anhydrous sodium sulfate and filtered, and the filtrate was concentrated under reduced pressure to obtain crude product, which was separated and purified by silica gel column (PE:EA=3:1–0:1) to obtain the target compound (21 mg, 19.9% yield, pale yellow solid). LC-MS(ESI)m/z: 537.1 [M–H]$^-$. $^1$H NMR (400 MHz, DMSO-d$_6$) δ 10.95, 10.75 (s, 1H), 8.64 (s, 1H), 8.35, 8.30 (s, 1H), 7.82-7.68 (m, 5H), 7.62 (d, J=8.2 Hz, 2H), 5.87, 5.74 (s, 1H), 4.07-3.96 (m, 1H), 3.87-3.77 (m, 1H), 3.28-3.22 (m, 2H), 3.19-3.08 (m, 1H), 3.06-2.95 (m, 1H), 1.08 (t, J=7.0 Hz, 3H).

Example 20: 2-Acetyl-N-(4-(1,1,1,3,3,3-hexafluoro-2-hydroxypropan-2-yl)phenyl)-6-sulfamoyl-1,2,3,4-tetrahydroisoquinoline-1-carboxamide

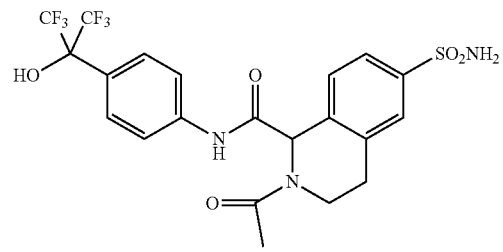

Step 1: Synthesis of 2-(tert-butyl) 1-ethyl 6-(benzylthio)-3,4-dihydroisoquinoline-1,2(1H)-dicarboxylate

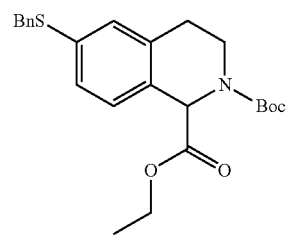

2-(tert-Butyl) 1-ethyl 6-(((trifluoromethyl)sulfonyl)oxy)-3,4-dihydroisoquinoline-1,2(1H)-dicarboxylate (5.00 g, 11.0 mmol), pd$_2$(dba)$_3$ (995 mg, 1.09 mmol), 4,5-Bis(diphenylphosphino)-9,9-dimethylxanthene (1.26 g, 2.17 mmol), DIEA (3.60 mL, 21.7 mmol) and benzylthiol (1.26 g, 2.17 mmol) were added to 1,4-dioxane (50 mL). Under nitrogen protection, the reaction mixture was stirred at 100° C. overnight, the LC-MS monitored the completion of the reaction. The reaction solution was cooled to room temperature, filtered, and the filtrate was concentrated under reduced pressure to obtain crude product, which was separated and purified by TLC (PE:EA=20:1–15:1) to obtain the target compound (3.50 g, 74.2% yield, yellow oil).

Step 2: Synthesis of 6-(benzylthio)-2-(tert-butoxycarbonyl)-1,2,3,4-tetrahydroisoquinoline-1-carboxylic acid

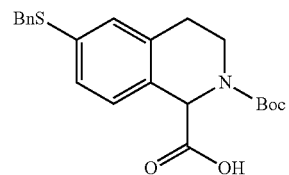

2-(tert-Butyl) 1-ethyl 6-(benzylthio)-3,4-dihydroisoquinoline-1,2 (1H)-dicarboxylate (1.20 g, 2.81 mmol) was dissolved in methanol (12 mL), 2 mol/L aqueous sodium hydroxide solution (4.21 mL, 8.42 mmol) was added dropwise to the reaction solution at room temperature. After the addition was completed, the reaction solution was further stirred at room temperature for 30 minutes, and TLC monitored the completion of the reaction. The reaction solution was poured into water (20 mL), adjusted to around pH=3 with 1M dilute hydrochloric acid, extracted with EA (10 mL×2), the organic phases were combined, dried over anhydrous sodium sulfate and filtered, and the filtrate was concentrated under reduced pressure to obtain the target compound (1.20 g, crude, yellow solid).

Step 3: Synthesis of tert-butyl 6-(benzylthio)-1-((4-(1,1,1,3,3,3-hexafluoro-2-hydroxypropan-2-yl)phenyl)carbamoyl)-3,4-dihydroisoquinoline-2(1H)-carboxylate

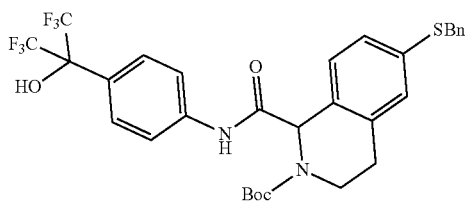

6-(Benzylthio)-2-(tert-butoxycarbonyl)-1,2,3,4-tetrahydroisoquinoline-1-carboxylic acid (1.20 g, 3.00 mmol) and 2-(4-aminophenyl)-1,1,1,3,3,3-hexafluoropropan-2-ol (778 mg, 3.00 mmol) were dissolved in dry DCM (12 mL). HATU (1.37 g, 3.60 mmol) and DIEA (1.48 mL, 9.01 mmol) were sequentially added to the reaction solution at room temperature. After the addition was completed, the reaction mixture was stirred at room temperature overnight, and LC-MS monitored the completion of the reaction. The reaction solution was poured into saturated sodium bicarbonate solution (20 mL), extracted with DCM (15 mL×2), the organic phases were combined, washed with saturated brine (10 mL), dried over anhydrous sodium sulfate and filtered, and the filtrate was concentrated under reduced pressure to obtain the target compound (2.00 g, crude, yellow oil). LC-MS (ESI) m/z: 641.0 [M+H]$^+$.

Step 4: Synthesis of 6-(benzylthio)-N-(4-(1,1,1,3,3,3-hexafluoro-2-hydroxypropan-2-yl)phenyl)-1,2,3,4-tetrahydroisoquinoline-1-carboxamide

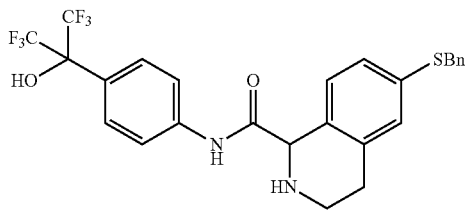

tert-Butyl 6-(benzylthio)-1-((4-(1,1,1,3,3,3-hexafluoro-2-hydroxypropan-2-yl)phenyl)carbamoyl)-3,4-dihydroisoquinoline-2(1H)-carboxylate (2.00 g, 3.12 mmol) was dissolved in DCM (20 mL). Under an ice bath, a 6 M solution of hydrochloric acid in dioxane (10 mL) was added dropwise to the reaction solution. After the addition was completed, the ice bath was removed, and the reaction solution was further stirred for 2 hours at room temperature, and TLC monitored the completion of the reaction. The reaction solution was concentrated under reduced pressure to obtain the target compound (1.60 g, crude, yellow solid).

Step 5: Synthesis of 2-(4-(2-acetyl-6-(benzylthio)-1,2,3,4-tetrahydroisoquinoline-1-carboxamido)phenyl)-1,1,1,3,3,3-hexafluoropropan-2-yl acetate

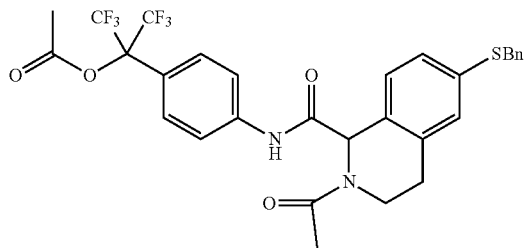

6-(Benzylthio)-N-(4-(1,1,1,3,3,3-hexafluoro-2-hydroxypropan-2-yl)phenyl)-1,2,3,4-tetrahydroisoquinoline-1-carboxamide (1.60 g, 2.96 mmol) was dissolved in dry DCM (20 mL). Under an ice bath, DIEA (1.96 mL, 11.8 mmol) and acetyl chloride (0.634 mL, 8.88 mmol) were sequentially added dropwise to the reaction solution. After the addition was completed, the reaction solution was further stirred at room temperature for 30 minutes, and TLC monitored the completion of the reaction (PE:EA=1:1). The reaction solution was directly concentrated to obtain crude product, which was separated and purified by column chromatography (PE:EA=1:1–0:1) to obtain the target compound (230 mg, 5.88% yield in four steps, white solid).

Step 6: Synthesis of 2-acetyl-1-(((4-(1,1,1,3,3,3-hexafluoro-2-hydroxypropan-2-yl)phenyl)carbamoyl)-1,2,3,4-tetrahydroisoquinoline-6-sulfonyl chloride

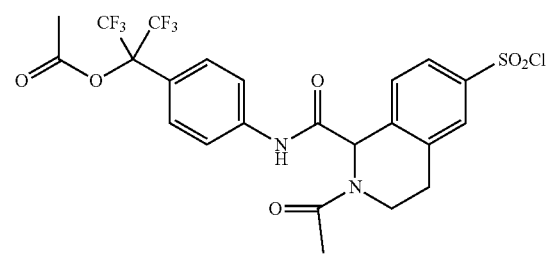 [SMILES: CC(=O)OC(c1ccc(NC(=O)C2c3ccc(S(=O)(=O)Cl)cc3CCN2C(C)=O)cc1)(C(F)(F)F)C(F)(F)F]

2-(4-(2-Acetyl-6-(benzylthio)-1,2,3,4-tetrahydroisoquinoline-1-carboxamido)phenyl)-1,1,1,3,3,3-hexafluoropropan-2-yl acetate (230 mg, 0.368 mmol) was dissolved in a mixed solution of acetic acid (2 mL) and water (0.5 mL). Under an ice bath, N-chlorosuccinimide (101 mg, 0.756 mmol) was slowly added to the reaction solution. After the addition was completed, the ice bath was removed, and the reaction mixture was further stirred at room temperature for 1 hour, and TLC monitored the completion of the reaction. The reaction solution was poured into ice water (20 mL), extracted with EA (10 mL×2), the organic phases were combined, washed with saturated brine (10 mL), dried over anhydrous sodium sulfate and filtered, and the filtrate was concentrated under reduced pressure to obtain the target product (230 mg, crude, white solid).

Step 7: Synthesis of 2-acetyl-N-(4-(1,1,1,3,3,3-hexafluoro-2-hydroxypropan-2-yl)phenyl)-6-sulfamoyl-1,2,3,4-tetrahydroisoquinoline-1-carboxamide

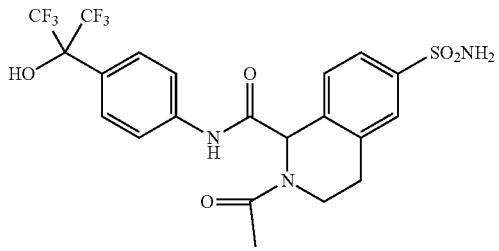 [SMILES: CC(=O)N1CCc2cc(S(N)(=O)=O)ccc2C1C(=O)Nc1ccc(C(O)(C(F)(F)F)C(F)(F)F)cc1]

2-Acetyl-1-(((4-(1,1,1,3,3,3-hexafluoro-2-hydroxypropan-2-yl)phenyl)carbamoyl)-1,2,3,4-tetrahydroisoquinoline-6-sulfonyl chloride (118 mg, 0.211 mmol) was dissolved in tetrahydrofuran (2 mL). Under an ice bath, ammonia in water (2 mL) was slowly added dropwise to the reaction solution. After the addition was completed, the ice bath was removed, and the reaction solution was further stirred for 1 hour at room temperature, and the LC-MS monitored the completion of the reaction. The reaction solution was concentrated under reduced pressure to obtain a crude product, which was separated and purified by column chromatography (EA:PE=1:10–1:2) to obtain the target product (6.00 mg, 3.02% yield in two steps, white solid). LC-MS(ESI)m/z: 540.1 [M+H]$^+$. $^1$H NMR (400 MHz, DMSO-d$_6$) δ 10.70 (s, 1H), 10.15 (s, 1H), 8.79-8.64 (m, 2H), 7.73-7.62 (m, 4H), 7.59-7.54 (m, 2H), 7.31 (s, 1H), 5.84 (s, 1H), 4.07-4.02 (m, 1H), 3.67-3.61 (m, 1H), 3.20-3.14 (m, 1H), 3.00-2.94 (m, 1H), 2.12, 2.10 (s, 3H).

Example 21: 2-Acetyl-6-((cyclopropylmethyl)sulfonyl)-N-(4-(1,1,1,3,3,3-hexafluoro-2-hydroxypropan-2-yl)phenyl)-1,2,3,4-tetrahydroisoquinoline-1-carboxamide

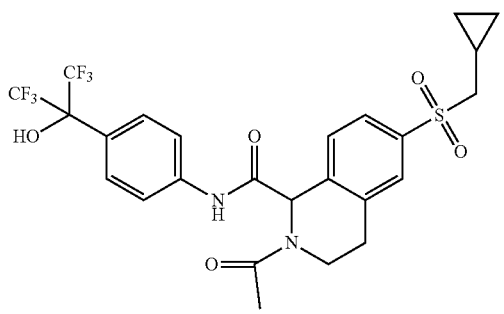 [SMILES: CC(=O)N1CCc2cc(S(=O)(=O)CC3CC3)ccc2C1C(=O)Nc1ccc(C(O)(C(F)(F)F)C(F)(F)F)cc1]

Step 1: Synthesis of 2-(tert-butyl) 1-ethyl 6-(chlorosulfonyl)-3,4-dihydroisoquinoline-1,2(1H)-dicarboxylate

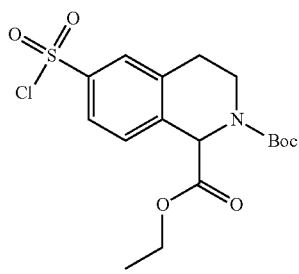 [SMILES: CCOC(=O)C1c2ccc(S(=O)(=O)Cl)cc2CCN1C(=O)OC(C)(C)C]

2-(tert-Butyl)1-ethyl 6-(benzylthio)-3,4-dihydroisoquinoline-1,2(1H)-dicarboxylate (3.50 g, 8.19 mmol) was dissolved in a mixed solution of acetic acid (28 mL) and water (7 mL). Under an ice bath, N-chlorosuccinimide (2.19 g, 16.4 mmol) was slowly added to the reaction solution. After the addition was completed, the ice bath was removed, and the reaction mixture was further stirred at room temperature for 1 hour, and TLC monitored the completion of the reaction. The reaction solution was poured into ice water (20 mL), extracted with EA (10 mL×2), the organic phases were combined, washed with saturated brine (10 mL), dried over anhydrous sodium sulfate and filtered, and the filtrate was concentrated under reduced pressure to obtain the target product (1.10 g, crude, white solid).

Step 2: Synthesis of sodium 2-(tert-butoxycarbonyl)-1-(ethoxycarbonyl)-1,2,3,4-tetrahydroisoquinoline-6-sulfinate

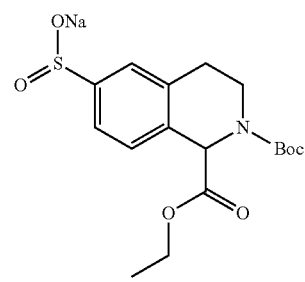

2-(tert-Butyl) 1-ethyl 6-(chlorosulfonyl)-3,4-dihydroisoquinoline-1,2(1H)-dicarboxylate (1.10 g, 2.72 mmol) was dissolved in a mixed solution of tetrahydrofuran (16.5 mL) and water (11 mL). Sodium bicarbonate (457 mg, 5.45 mmol) and sodium sulfite (412 mg, 3.27 mmol) were added to the reaction solution. After the addition was completed, the reaction mixture was further stirred at 70° C. for 3 hours, and LC-MS monitored the completion of the reaction. The reaction solution was concentrated under reduced pressure to obtain the target product (1.01 g, crude, white solid). LC-MS(ESI) m/z: 368.1 [M−Na]$^−$.

Step 3: Synthesis of ethyl 2-(tert-butoxycarbonyl)-6-((cyclopropylmethyl)sulfonyl)-1,2,3,4-tetrahydroisoquinoline-1-carboxylate

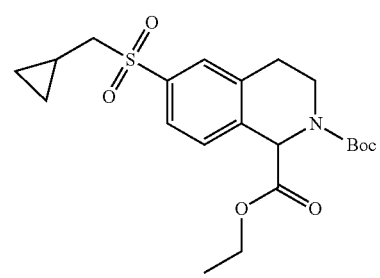 [SMILES: CCOC(=O)C1c2ccc(S(=O)(=O)CC3CC3)cc2CCN1C(=O)OC(C)(C)C]

Sodium 2-(tert-butoxycarbonyl)-1-(ethoxycarbonyl)-1,2,3,4-tetrahydroisoquinoline-6-sulfinate (1.01 g, 2.58 mmol) was dissolved in dimethyl sulfoxide (10 mL), and the (bromomethyl)cyclopropane (1.04 g, 7.74 mmol) was added. The reaction solution was heated to 100° C. and stirred for 3 hours. After TLC monitored the completion of the reaction, the reaction solution was added to water (20 mL), extracted with EA (30 tuL×3), and the organic phases were combined, dried over sodium sulfate, rotary evaporated to dry, and purified by column chromatography (EA:PE=1: 9–1:4) to obtain the target product (200 mg, 5.77% yield in three steps, yellow solid).

Step 4: Synthesis of 2-(tert-butoxycarbonyl)-6-((cyclopropylmethyl)sulfonyl)-1,2,3,4-tetrahydroisoquinoline-1-carboxylic acid

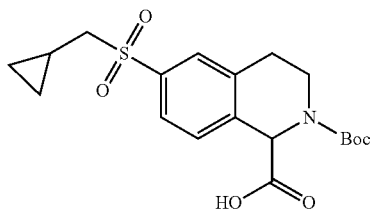 [SMILES: CC(C)(C)OC(=O)N1CCc2cc(S(=O)(=O)CC3CC3)ccc2C1C(=O)O]

Ethyl 2-(tert-butoxycarbonyl)-6-((cyclopropylmethyl)sulfonyl)-1,2,3,4-tetrahydroisoquinoline-1-carboxylate (200 mg, 0.472 mmol) was dissolved in methanol (3 mL), and a solution of 2 M aqueous sodium hydroxide solution (2 mL) was added dropwise to the reaction solution at room temperature. After the addition was completed, the reaction solution was further stirred at room temperature for 2 hours, and LC-MS monitored the completion of the reaction. The reaction solution was poured into water (20 mL), adjusted to around pH=3 with 1M aqueous hydrochloric acid solution, extracted with EA (10 mL×2), the organic phases were combined, dried over anhydrous sodium sulfate, filtered, and the filtrate was concentrated under reduced pressure to obtain the target compound (160 mg, crude, white solid). LC-MS(ESI)m/z: 337.1 [M−Boc+ACN+H]$^+$.

Step 5: Synthesis of tert-butyl 6-((cyclopropylmethyl)sulfonyl)-1-((4-(1,1,1,3,3,3-hexafluoro-2-hydroxypropan-2-yl)phenyl)carbamoyl)-3,4-dihydroisoquinoline-2(1H)-carboxylate

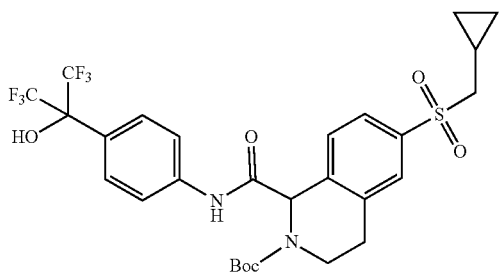 [SMILES: CC(C)(C)OC(=O)N1CCc2cc(S(=O)(=O)CC3CC3)ccc2C1C(=O)Nc1ccc(C(O)(C(F)(F)F)C(F)(F)F)cc1]

2-(tert-Butoxycarbonyl)-6-((cyclopropylmethyl)sulfonyl)-1,2,3,4-tetrahydroisoquinoline-1-carboxylic acid (160 mg, 0.405 mmol) and 2-(4-aminophenyl)-1,1,1,3,3,3-hexafluoropropan-2-ol (105 mg, 0.405 mmol) were dissolved in dry DCM (3 mL). At room temperature, HATU (231 mg, 0.607 mmol) and DIEA (105 mg, 0.809 mmol) were sequentially added to the reaction solution. After the addition was completed, the reaction mixture was stirred at room temperature overnight, and LC-MS monitored the completion of the reaction. The reaction solution was washed with saturated brine (10 mL), the organic phase was dried over anhydrous sodium sulfate, filtered, and the filtrate was concentrated under reduced pressure to obtain the target compound (271 mg, 90.1% yield in two steps, yellow oil). LC-MS(ESI)m/z: 537.1 [M−Boc+H]$^+$. $^1$H NMR (400 MHz, CDCl$_3$) δ 9.33 (s, 1H), 7.87-7.75 (m, 2H), 7.60 (q, J=8.7 Hz, 4H), 7.44 (d, J=8.2 Hz, 1H), 6.19 (s, 1H), 3.91 (s, 1H), 3.81 (t, J=6.2 Hz, 2H), 3.22-3.10 (m, 1H), 3.09-2.97 (m, 3H), 2.30 (s, 3H), 1.02 (s, 1H), 0.61 (d, J=7.8 Hz, 2H), 0.22 (d, J=5.1 Hz, 2H).

Step 6: Synthesis of 6-((cyclopropylmethyl)sulfonyl)-N-(4-(1,1,1,3,3,3-hexafluoro-2-hydroxypropan-2-yl)phenyl)-1,2,3,4-tetrahydrosoquinoline-1-carboxamide

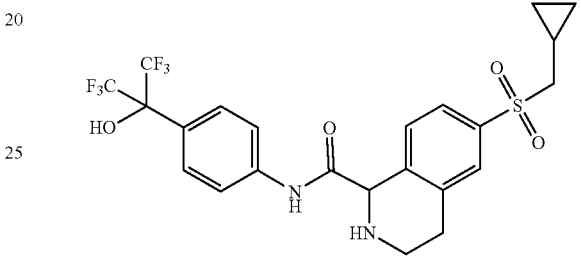

tert-Butyl 6-((cyclopropylmethyl)sulfonyl)-1-((4-(1,1,1,3,3,3-hexafluoro-2-hydroxypropan-2-yl)phenyl)carbamoyl)-3,4-dihydroisoquinoline-2(1H)-carboxylate (271 mg, 0.426 mmol) was dissolved in DCM (5 mL). Under an ice bath, a 6 M solution of hydrochloric acid in dioxane (5 mL) was added dropwise to the reaction solution. After the addition was completed, the ice bath was removed, and the reaction solution was further stirred at room temperature for 2 hours, and LC-MS monitored the completion of the reaction. The reaction solution was concentrated in reduced pressure to obtain the target compound (160 mg, crude, yellow solid). LC-MS(ESI)m/z: 537.1 [M+H]$^+$.

Step 7: Synthesis of 2-(4-(2-acetyl-6-((cyclopropylmethyl)sulfonyl)-1,2,3,4-tetrahydroisoquinoline-1-carboxamido)phenyl)-1,1,1,3,3,3-hexafluoropropan-2-yl acetate

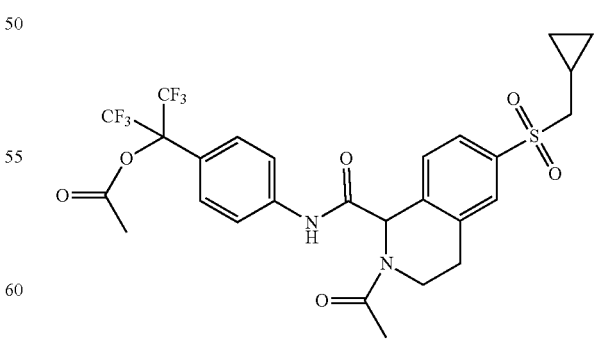

6-((Cyclopropylmethyl)sulfonyl)-N-(4-(1,1,1,3,3,3-hexafluoro-2-hydroxypropan-2-yl)phenyl)-1,2,3,4-tetrahydroisoquinoline-1-carboxamide (160 mg, 0.298 mmol) was dissolved in dry DCM (3 mL). Under an ice bath, DIEA (116 mg, 0.895 mmol) and acetyl chloride (58.5 mg, 0.746 mmol) were sequentially added dropwise to the reaction solution. After the addition was completed, the reaction solution was further stirred at room temperature for 30 minutes, and LC-MS monitored the completion of the reaction. The reaction solution was directly concentrated to obtain a crude product, which was separated and purified by column chromatography (PE: EA=4:1) to obtain the target compound (180 mg, 68.1% yield in two steps, yellow oil).

Step 8: Synthesis of 2-acetyl-6-((cyclopropylmethyl)sulfonyl)-N-(4-(1,1,1,3,3,3-hexafluoro-2-hydroxypropan-2-yl)phenyl)-1,2,3,4-tetrahydroisoquinoline-1-carboxamide

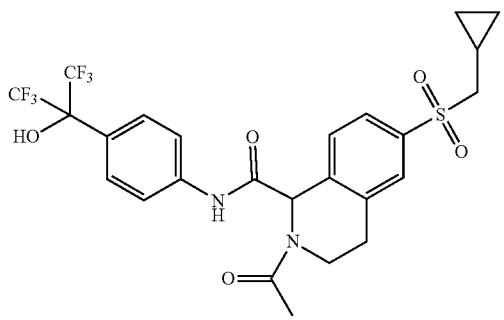 [SMILES: CC(=O)N1CCc2cc(S(=O)(=O)CC3CC3)ccc2C1C(=O)Nc1ccc(C(O)(C(F)(F)F)C(F)(F)F)cc1]

2-(4-(2-Acetyl-6-((cyclopropylmethyl)sulfonyl)-1,2,3,4-tetrahydroisoquinoline-1-carboxamido)phenyl)-1,1,1,3,3,3-hexafluoropropan-2-yl acetate (180 mg, 0.29 mmol) was dissolved in methanol (2 mL), 2 mol/L aqueous sodium hydroxide solution (2 mL, 0.87 mmol) was added dropwise to the reaction solution at room temperature. After the addition was completed, the reaction solution was further stirred for 30 minutes at room temperature, and TLC monitored the completion of the reaction. The reaction solution was poured into water (20 mL), adjusted to around pH=3 with 1 mol/L dilute hydrochloric acid, extracted with EA (10 mL×2), the organic phases were combined, dried over anhydrous sodium sulfate, filtered, and the filtrate was concentrated under reduced pressure to obtain the target compound (20 mg, yellow oil). LC-MS(ESI)m/z:579.1 [M+H]$^+$. $^1$H NMR (400 MHz, CDCl$_3$) δ 9.33 (s, 1H), 7.87-7.80 (m, 2H), 7.66-7.54 (m, 4H), 7.48-7.41 (d, J=8 Hz, 1H), 6.19 (s, 1H), 3.91 (s, 1H), 3.85-3.76(m, 2H), 3.24-3.11 (m, 1H), 3.10-2.99 (m, 3H), 2.30 (s, 3H), 1.08-0.97 (m, 1H), 0.67-0.56 (m, 2H), 0.26-0.18 (m, 2H).

Example 22: 2-Acetyl-N-(4-(1,1,1,3,3,3-hexafluoro-2-hydroxypropan-2-yl)phenyl)-6-(N-methylsulfamoyl)-1,2,3,4-tetrahydroisoquinoline-1-carboxamide

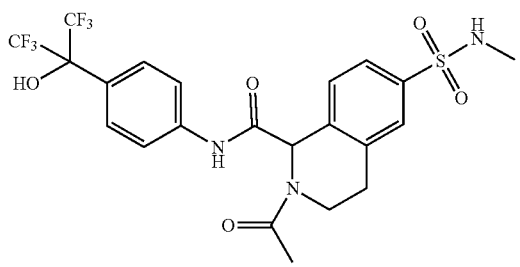

2-Acetyl-1-(((4-(1,1,1,3,3,3-hexafluoro-2-hydroxypropan-2-yl)phenyl)carbamoyl)-1,2,3,4-tetrahydroisoquinoline-6-sulfonyl chloride (112 mg, 0.200 mmol) was dissolved in tetrahydrofuran (2 mL). Under an ice bath, an aqueous methyl ammonia solution (2 mL) was slowly added dropwise to the reaction solution. After the addition was completed, the ice bath was removed, the reaction solution was further stirred for 1 hour at room temperature, and the LC-MS monitored the completion of the reaction. The reaction solution was concentrated under reduced pressure to obtain a crude product, which was separated and purified by column chromatography (PE:EA-10:1–2:1) to obtain the target product (14.0 mg, 14.1% yield in two steps, white solid). LC-MS(ESI)m/z: 554.0[M+H]$^+$. $^1$H NMR (400 MHz, DMSO-d$_6$) δ 10.80, 10.74(s, 1H), 8.66, 8.62 (s, 1H), 7.76 (d, J=8.2 Hz, 1H), 7.71-7.57 (m, 6H), 7.45-7.37 (m, 1H), 5.90, 5.79 (s, 1H), 4.11-4.01 (m, 1H), 3.72-3.64 (m, 1H), 3.27-3.14 (m, 1H), 3.05-2.94 (m, 1H), 2.40 (d, J=4.9 Hz, 3H), 2.15, 2.12 (s, 3H).

Activity Examples

Activity Example 1: In Vitro Luciferase Reporter Assay of Inhibition Activity of the Present Compounds on RORγt This assay was basically carried out according to the method described in the literature (Current Chemical Genomics, 2010, 4, 43-49).

The RORγ-LBD coding sequence was inserted into pBIND plasmid (Promega, E1581). The expression vector and a reporter vector (pGL4.35 carrying a stably integrated luciferase reporter gene driven by GAL4 promoter) were co-expressed in HEK293T host cells. When the inhibitor binds to the corresponding chimeric receptor, the chimeric receptor binds to the GAL4 binding site on the reporter gene carrier and inhibits reporter gene expression. The inhibition activity of the compounds on RORγ was determined according to the intensity of the chemiluminescence signal.

Reagents and Materials

| Materials and Reagents | Supplier | Batch number# |
|---|---|---|
| HEK293T | ATCC | CRL-3216 |
| pGL4.35 | Promega | E1370 |
| pBIND-RORγ Vector | Pharmaron | |
| PBS (pH 7.4, 1×, sterile) | Gibico | 10010 |
| Opti-MEM ® I Reduced Serum Medium | Gibico | 11058-021 |
| Steady-Gio ™ | Promega | E2520 |
| AZD-0284 | MCE | HY-120384 |

Experimental Procedure
1. Preparation of Test Compounds
   1.1 All test compounds were serially diluted at 3-fold with DMSO, with 10 serial dilutions starting from 10 mM.
   1.2 The positive control AZD-0284 was serially diluted at 3-fold with DMSO, with 10 serial dilutions starting from 10 mM.
   1.3 1000× positive control (10 mM AZD-0284) and 1000× negative control (100% DMSO) were prepared.
   1.4 The compound plate was sealed and shaken for 5 minutes.
2. Test Procedure
   2.1 Cell Suspension Preparation and Plate Seeding
     a) All cells were cultured according to the ATCC standard operation, and HEK293T was tested in the exponential growth phase;

b) Discarding the medium:
c) Washing the cells twice with PBS;
d) Adding a trypsinization solution to digest the cells and terminating the digestion with a complete medium;
e) Collecting and counting the cells, and only when the cell viability was greater than 90% could the experiment be carried out;
f) Seeding 6*10⁶HEK293T cells into a 100 mm cell culture dish;
g) Placing the cultured dishes with seeded cells into an incubator at 37° C. and 5% $CO_2$ overnight.

2.2 Cell Transfection
a) Balancing the Trans-IT transfection reagent at room temperature;
b) Adding 20 μl of the transfection reagent and 600 μl of Opti-MEM™ medium without contacting the tube wall, mixing uniformly through blowing and pipetting by a pipette gun, and allowing to stand at room temperature for 5 minutes;
c) Adding 10 μg of the plasmid to the transfection reagent (see Step 2.2.b), and allowing to stand at room temperature for 20 minutes;
Plasmids: 5 μg of pBIND-RORγ and 5 μg of pGL4.35 plasmids were respectively added therein;
d) Adding the mixed DNA transfection reagent to a 100 mm cell culture dish (see Step 2.1);
e) Placing the dish in an incubator at 37° C. and 5% $CO_2$ for 5 h.

2.3 Compound Treatment
a) Transferring 25 μl of the diluted compound to a cell culture plate (6007680-50, PE) with Echo550;
b) Inoculating the cells (see Step 2.2) into a 384-cell culture plate (6007680-50, PE), with 15,000 cells and 25 μl of the medium 5% charcoal-adsorbed FBS per well;
c) Culturing the cells overnight in an incubator at 37° C. and 5% $CO_2$.

2.4 Compound Detection:
a) Placing the Steady-Glo™ Detection Reagent at room temperature;
b) Placing the 384-cell plate (see Step 2.3) at room temperature;
c) Adding 25 μL of the Steady-Glo™ Detection Reagent per well into the cell culture plate (see Step 2.4b);
d) Placing the plate on a shaker and shaking for 5 minutes in dark;
e) Detecting the chemiluminescence values with the Envision 2104.

Calculation of % Inhibition $$\% \text{ Inhibition} = \left[1 - \frac{RLU_{cmpd} - \overline{RLU}_{positive}}{\overline{RLU}_{vehicle} - \overline{RLU}_{positive}}\right] * 100$$

$RLU_{cmpd}$: fluorescence value of test compounds
RLUpositive: average value of positive control
RLUvehicle: average value of negative control
IC50s of the compounds were calculated by fitting the % Inhibition and the logarithm values of the compound concentration using Graphad 8.0. The assay results show that the compounds of the present disclosure have good inhibitory activity on the RORγt luciferase reporter gene (as shown in Table 1).

TABLE 1

Luciferase reporter gene assay of RORγt inhibition activity of Example compounds

| Example | IC$_{50}$(nM) | Emax % |
|---|---|---|
| 1 | 19.14 | 101.6 |
| 2 | 8.001 | 100.1 |
| 3 | 681.3 | 111.3 |
| 4 | 3050 | 73.85 |
| 5 | 128.5 | 102.3 |
| 6 | 113.1 | 99.94 |
| 7 | 12.43 | 99.59 |
| 8 | 3.783 | 99.25 |
| 9 | 616 | 107.1 |
| 10 | 40.49 | 102 |
| 11 | 91.31 | 104.4 |
| 12 | 289.8 | 95.71 |
| 13 | 154.2 | 101.2 |
| 14 | 83.42 | 98.81 |
| 17 | 67.08 | 95.92 |
| 18 | 106.9 | 95.75 |
| 19 | 14.67 | 100.7 |
| 21 | 12.52 | 101.5 |
| 22 | 17.81 | 101.7 |
| AZD-0284 | 34.81 | 99.79 |

Note:
Emax % is the relative maximum inhibition rate relative to AZD-0284 at 10 μM.

The results in the above table show that the compounds of the present disclosure have good inhibitory activity on the RORγt inhibitor luciferase reporter gene.

Activity Example 2: Assay of Inhibition of the Present Compounds for Th17 Differentiation in Human PBMC Experiment Materials:

| Materials and Reagents | supplier | Item# | batch number# |
|---|---|---|---|
| hPBMC_ | TPCS | PB100C | A19Z018001 |
| RPMI1640 | Gibco | A10491-01 | 2037571 |
| Penicillin-Streptomycin | Gibco | 15140-122 | 1953104 |
| Fetal Bovine Serum | Gibco | 10099-141C | 2045686CP |
| Phosphate Buffered Saline (PBS) | Gibco | 10010-031 | 2003918 |
| DMSO | Sigma | D8418-1L | SHBG3288V |
| Purified NA/LE mouse anti-human CD3 | BD | 555336 | 8152611 |
| Purified NA/LE mouse anti-human CD28 | BD | 555725 | 8152601 |
| Recombinant human TGF-beta 1 | R&D | 240-B | AV7117011 |
| Recombinant human IL-6 | R&D | 7270-IL-025/CF | DAOM0318061 |
| Recombinant human IL-23 | R&D | 1290-IL-010/CF | GBI6218031 |
| Ursolic acid (UA) | Sigma | U6753 | BCBQ8542V |
| Quantikine ® ELISA Human IL-17 Immunoassay | R&D | S1700 | P192117 |

Test procedure: the PBMC cells were first thawed and plated, and then stimulated with the stimulating factors (anti-hCD28: 5 μg/mL; rhTGF-β1: 5 ng/mL; rhIL-6: 20 ng/mL; rhIL-23: 10 ng/mL) to differentiate to Th17, while different concentrations of compounds were added, with the maximum concentration starting from 3 μM. After 48 hours, the supernatant was collected for IL-17 ELISA detection. The inhibition rates of the compounds to inhibit the secretion of IL-17 by Th17 cells were determined, as compared with the vehicle group, and the IC50 values were fitted with Graphad8.0.

The test results show that the compounds of the present disclosure have good ability to inhibit the differentiation of Th17 cells to secrete IL-17 in human PBMC (as shown in Table 2).

TABLE 2

The results of inhibition of the compounds for Th17 cells differentiation and secretion of IL-17

| Example | $IC_{50}$(nM) | Emax % |
|---|---|---|
| 1 | 51.36 | 79.01 |
| 2 | 22.66 | 78.28 |
| 7 | 21.14 | 72.02 |
| AZD-0284 | 28.41 | 78.54 |

Note:
Emax % is the maximum inhibition rate.

Activity Example 3: Pharmacokinetic (PK) Assay of the Present Compounds in Mice The PK of each compound was determined as follows: 6 C57BL/6 mice (obtained from Shanghai Lingchang Biotechnology Co., Ltd.) were divided into two groups with 3 in each group. One group was administered intravenously at a dose of 1 mg/kg in the vehicle of 5% DMSO/95% (20% Captisol); the other group was administered by oral gavage at a dose of 5 mg/kg in the vehicle of 0.5% CMC-Na/0.5% Tween 80. Blood samples were collected from saphenous vein of lower leg in each group at 0, 0.083, 0.25, 0.5, 1, 2, 4, 6, 8 and 24 h after administration. Approximately 40 μL of the blood samples were collected into anticoagulant tubes containing EDTA-K2 Immediately after collection, the tubes were inverted at least 5 times to ensure uniform mixing, and then placed on ice. The blood samples collected at each time point were centrifuged at 4° C., 8000 rpm for 5 minutes to obtain plasma. Another 1.5 mL centrifuge tube was marked with the compound name, animal number, and time point, and the plasma was transferred to this tube. The plasma was stored at −80° C. until analysis.

Compound concentrations in the plasma were determined by UPLC-MS/MS method, and the pharmacokinetic parameters were calculated from the obtained data by Phoenix WinNolin 6.4 pharmacokinetic software.

The specific test results are as follows, showing that the compounds have good pharmacokinetic absorption and have the PK advantages, especially for oral administration. Both AUC0-last (ng/mL*hr) and bioavailability of the compounds of the present disclosure were significantly improved, indicating a better druggability.

The specific test results are as follows, showing that the compounds have good pharmacokinetic absorption and have the PK advantages.

TABLE 3

In vivo PK of Example compounds

| Example | | 1 | 2 | 5 | 7 | AZD-0284 |
|---|---|---|---|---|---|---|
| IV | $AUC_{0-last}$ (ng/mL*hr) | 1854 | 1297 | 1190 | 4873 | 1176 |
| Dose | Cmax (ng/mL) | 1390 | 2313 | 1888 | 703 | 2484 |
| 1 mg/kg | $T_{1/2}$ (hr) | 5.09 | 1.78 | 4.89 | 39.9 | 7.75 |
| | Vss (L/kg) | 2.71 | 1.06 | 3.34 | 4.02 | 6.29 |
| | CL_obs (mL/min/kg) | 7.12 | 12.8 | 13.8 | 1.23 | 12.6 |

TABLE 3-continued

In vivo PK of Example compounds

| Example | | 1 | 2 | 5 | 7 | AZD-0284 |
|---|---|---|---|---|---|---|
| Po | $AUC_{0-last}$ (ng/mL*hr) | 9640 | 5328 | 12629 | 20341 | 2781 |
| Dose | Cmax (ng/mL) | 816 | 553 | 1367 | 1075 | 264 |
| 5 mg/kg | $T_{1/2}$ (hr) | 3.91 | 3.31 | 4.33 | 37.57 | 3.35 |
| | F % | 84 | 82.1 | 213 | 83.5 | 38 |

Activity Example 4: Metabolic Stability of Human and Mouse Liver Microsomes

According to standard methods for investigating in vitro metabolic stability in the art, e.g., the methods described in Kerns, Edward H. and Di Li (2008). *Drug-like Properties: Concepts, Structure Design and Methods: from ADME to Toxicity Optimisation*. San Diego: Academic Press; Di, Li et al., *Optimisation of a Higher Throughput Microsomal Stability Screening Assay for Profiling Drug Discovery Candidates*, J. Biomol. Screen. 2003, 8(4), 453, the liver microsomal metabolic stability test of the compounds of the present disclosure was carried out analogously as follows.

The incubation system comprising 0.5 mg protein/mL microsomes, cofactors, and PBS, was pre-incubated at 37° C. for 3 min, and then added the substrate (i.e., the test compounds) to initiate the reaction. Samples were taken at 0, 1, 5, 10, 15, 20, 30 and 60 min from the start of the reaction, and an appropriate terminator was added to terminate the reaction.

| Species | Product information | Supplier | Abbreviation |
|---|---|---|---|
| Human | Cat No. 452117 Lot No. 38292 | Corning | HLM |
| CD-1 mice | Cat No. BQM1000 Lot No. MIC255036 | Biopredic | MLM |

Sample treatment (n=3): appropriate samples were added respectively, vortexed and centrifuged at high speed. The supernatants were collected and detected for the substrate by HPLC-MS/MS. The peak area at the 0 mm was taken as 100%. The peak areas at other time points were converted to percentages of remaining. The natural logarithms of the percentages of remaining at each time point was plotted against the incubation time, and the slope (−k) was calculated by linear regression. Then, Clint (μL/min/mg) and half-life (T½, min.) of the compounds were calculated following the equation:

Inherent clearance rate (Clint)=($k$*Volume of incubation solution)/Mass of liver microsomes.

The results are shown in Table 4.

TABLE 4

Test results of metabolic stability of human and mouse liver microsomes

| Example | cLogP | Human liver microsomes | | | Mouse liver microsomes | | |
|---|---|---|---|---|---|---|---|
| | | $T_{1/2}$ (min) | Remaining % (T = 60 min) | CLint(mic) (μL/min/mg) | $T_{1/2}$ (min) | Remaining % (T = 60 min) | CLint(mic) (μL/min/mg) |
| 1 | 1.6 | >145 | 94.2% | <9.6 | >145 | 94.5% | <9.6 |
| 2 | 1.6 | >145 | 82.2% | <9.6 | >145 | 102.3% | <9.6 |
| 5 | 1.06 | >145 | 85.0% | <9.6 | >145 | 86.6% | <9.6 |
| 6 | 1.43 | >145 | 70.2% | <9.6 | 92.7 | 59.4% | 14.9 |
| 7 | 2.66 | 75.5 | 61.0% | 18.4 | >145 | 79.7% | <9.6 |

The above experimental results show that the compounds of the present disclosure have good metabolic stability.

The structure of the control compound used in the above experiments is as follows:

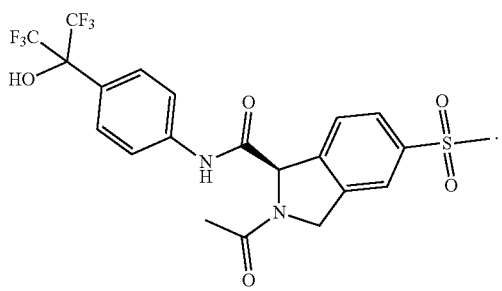

AZD-0284

It will be appreciated by those skilled in the art that the foregoing descriptions are exemplary and explanatory in nature, and intended to illustrate the invention and its preferred embodiments. Through routine experimentation, an artisan will recognize apparent modifications and variations that may be made without departing from the spirit of the invention. All such modifications coming within the scope of the appended claims are intended to be included therein. Thus, the invention is intended to be defined not by the above description, but by the following claims and their equivalents.

All publications cited in this specification are herein incorporated by reference.

The invention claimed is:

1. A compound of formula (I), or a pharmaceutically acceptable salt thereof,

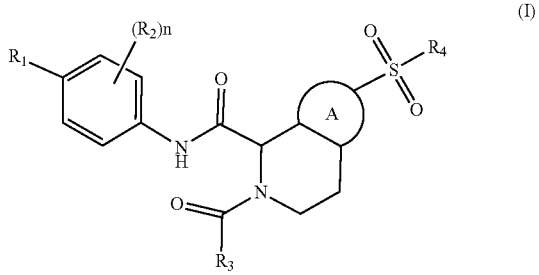

(I)

wherein,

A is aryl, or cycloalkenyl;

$R_1$ is selected from $C_1$-$C_6$ alkyl, $C_1$-$C_6$ alkoxy, $C_1$-$C_6$ alkylthio, —$NR_aR_a$, $C_3$-$C_7$ cycloalkyl, 4-7 membered heterocycloalkyl, $C_5$-$C_7$ cycloalkenyl or 5-7 membered heterocycloalkenyl, wherein each of which is optionally substituted with one or more groups independently selected from: halogen, cyano, nitro, $R_a$, —C(O) $R_a$, —C(O)$OR_a$, —C(O)$NR_aR_a$, —S(O) $R_a$, —S(O)$_2R_a$, —S(O)$_2NR_aR_b$, —$OR_a$, —$SR_a$ or —$NR_aR_b$;

$R_a$ at each occurrence is independently selected from hydrogen, halogen, cyano, nitro, $C_1$-$C_6$ alkyl optionally substituted with halogen, $C_1$-$C_6$ alkoxy optionally substituted with halogen, or $C_1$-$C_6$ alkylthio optionally substituted with halogen;

$R_3$ is selected from hydrogen, $C_1$-$C_6$ alkyl, $C_3$-$C_7$ cycloalkyl, 4-7 membered heterocycloalkyl, —$OR_a$ or —$NR_aR_b$ wherein the $C_1$-$C_6$ alkyl, the $C_3$-$C_7$ cycloalkyl or the 4-7 membered heterocycloalkyl is optionally substituted with a group independently selected from: halogen, cyano, nitro, $R_a$, —C(O) $R_a$, —C(O) $OR_a$, —C(O) $NR_aR_b$, —S(O) $R_a$, —S(O)$_2R_a$, —S(O)$_2NR_aR_b$, —$OR_a$, —$SR_a$ or —$NR_aR_b$;

$R_a$ is selected from $C_1$-$C_6$ alkyl, $C_3$-$C_7$ cycloalkyl, 4-7 membered heterocycloalkyl or —$NR_aR_b$, wherein the $C_1$-$C_6$ alkyl, the $C_3$-$C_7$ cycloalkyl or the 4-7 membered heterocycloalkyl is optionally substituted with a group independently selected from: halogen, cyano, nitro, $R_a$, —C(O)$R_a$, —C(O)$OR_a$, —C(O)$NR_aR_b$, —S(O)$R_a$, —S(O)$_2R_a$, —S(O)$_2NR_aR_b$, —$OR_a$, —$SR_a$ or —$NR_aR_b$;

$R_a$ and $R_b$ are each independently selected from hydrogen, $C_1$-$C_6$ alkyl, $C_5$-$C_7$ cycloalkyl or 4-7 membered heterocycloalkyl, each optionally substituted with one or more halogen, cyano or nitro; and n is 0, 1, 2 or 3.

2. The compound according to claim 1 or a pharmaceutically acceptable salt thereof, wherein $R_1$ is $C_1$-$C_3$ alkyl, which is substituted with one or more groups independently selected from: F, Cl, Br, I, $R_a$ or —$OR_a$, wherein $R_a$ is H or $C_1$-$C_3$ alkyl substituted with one or more halogens.

3. The compound according to claim 2 or a pharmaceutically acceptable salt thereof, wherein

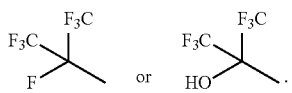

4. The compound according to claim 1 or a pharmaceutically acceptable salt thereof, wherein $R_1$ is $C_1$-$C_3$ alkoxy, which is optionally substituted with one or more groups independently selected from halogens; or $R_1$ is 5-7 membered heterocycloalkenyl.

5. The compound according to claim 1 or a pharmaceutically acceptable salt thereof, wherein $R_2$ is hydrogen or halogen.

6. The compound according to claim 1 or a pharmaceutically acceptable salt thereof, wherein $R_3$ is selected from hydrogen, $C_1$-$C_3$ alkyl or $C_3$-$C_7$ cycloalkyl, which is optionally substituted with one or more groups independently selected from: —$NR_aR_b$ or —$C(O)OR_a$, wherein $R_a$ and $R_b$ are each independently selected from H or $C_1$-$C_3$ alkyl optionally substituted with one or more halogens or $C_3$-$C_7$ cycloalkyl optionally substituted with one or more halogens.

7. The compound according to claim 1 or a pharmaceutically acceptable salt thereof, wherein $R_3$ is —$NR_aR_a$, wherein $R_a$ and $R_b$ are each independently selected from H or $C_1$-$C_3$ alkyl optionally substituted with one or more halogens.

8. The compound according to claim 1 or a pharmaceutically acceptable salt thereof, wherein $R_4$ is $C_1$-$C_6$alkyl, optionally substituted with $R_a$, wherein $R_a$ is selected from H, $C_1$-$C_3$ alkyl optionally substituted with one or more halogens or $C_3$-$C_7$ cycloalkyl optionally substituted with one or more halogens.

9. The compound according to claim 1 or a solvate thereof, wherein $R_4$ is —$NR_aR_b$, wherein $R_a$ and $R_a$ are each independently selected from H or $C_1$-$C_6$ alkyl optionally substituted with one or more halogens.

10. The compound according to claim 1, which is of formula (Ia') or a pharmaceutically acceptable salt thereof,

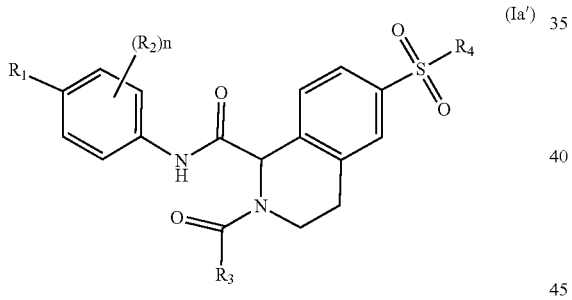

(Ia')

wherein,
$R_1$ is selected from $C_1$-$C_6$ alkyl, $C_1$-$C_6$ alkoxy or 5-7 membered heterocycloalkenyl, wherein each of which is optionally substituted with one or more groups independently selected from: halogen, $R_a$ or —$OR_a$;

$R_2$ at each occurrence is independently selected from hydrogen, halogen or $C_1$-$C_6$ alkyl optionally substituted with halogen;

$R_3$ is selected from hydrogen, $C_1$-$C_6$ alkyl, $C_3$-$C_7$ cycloalkyl or —$NR_aR_a$, wherein the $C_1$-$C_6$ alkyl or the $C_3$-$C_7$ cycloalkyl is optionally substituted with a group independently selected from: halogen, $R_a$, —$C(O)OR_a$, —$C(O)NR_aR_b$, —$S(O)_2NR_aR_b$, —$OR_a$ or —$NR_aR_b$;

$R_4$ is selected from $C_1$-$C_6$alkyl or —$NR_aR_b$, the $C_1$-$C_6$ alkyl is optionally substituted with a group independently selected from: $R_a$, halogen, —$OR_a$ or —$NR_aR_b$;

$R_a$ and $R_b$ are each independently selected from H, or $C_1$-$C_6$ alkyl optionally substituted with one or more halogens, or $C_3$-$C_7$ cycloalkyl optionally substituted with one or more halogens; and n is 0, 1 or 2.

11. The compound according to claim 10 or a pharmaceutically acceptable salt thereof, wherein $R_1$ is $C_1$-$C_3$ alkyl, which is substituted with two $C_1$-$C_3$ alkyl substituted with at least 3 halogens, and one group independently selected from halogen or —OH.

12. The compound according to claim 10 or a pharmaceutically acceptable salt thereof, wherein $R_3$ is hydrogen, $C_1$-$C_3$ alkyl, $C_3$-$C_7$ cycloalkyl or —$NR_aR_b$, wherein the $C_1$-$C_3$ alkyl or the $C_3$-$C_7$ cycloalkyl is optionally substituted with —$C(O)OR_a$, wherein $R_a$ and $R_b$ are each independently selected from H or $C_1$-$C_3$ alkyl optionally substituted with one or more halogens.

13. The compound according to claim 10 or a pharmaceutically acceptable salt thereof, wherein $R_4$ is $C_1$-$C_3$ alkyl.

14. The compound according to claim 1, which is of formula (Ia") or a pharmaceutically acceptable salt thereof,

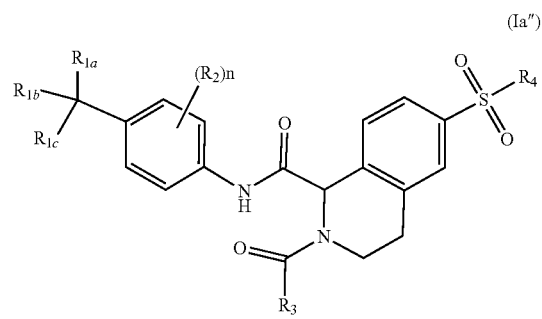

(Ia")

wherein,
any two of $R_{1a}$, $R_{1b}$, $R_{1c}$ are selected from $C_1$-$C_6$ alkyl substituted with one or more halogens, and the remaining of $R_{1a}$, $R_{1b}$, $R_{1c}$ is independently selected from halogen or —$OR_a$;

$R_2$ at each occurrence is independently selected from hydrogen, halogen or $C_1$-$C_6$ alkyl optionally substituted by halogen;

$R_3$ is selected from $C_1$-$C_6$alkyl, $C_3$-$C_7$ cycloalkyl or —$NR_aR_b$, wherein the $C_1$-$C_6$ alkyl or the $C_3$-$C_7$ cycloalkyl is optionally substituted with a group independently selected from: —$C(O)OR_a$, —$C(O)NR_aR_b$, —$S(O)_2NR_aR_b$, —$OR_a$ or —$NR_aR_b$;

$R_4$ is selected from $C_1$-$C_6$ alkyl;

$R_a$ and Re are each independently selected from H or $C_1$-$C_6$ alkyl optionally substituted with one or more halogens; and n is 0, 1 or 2.

15. The compound according to claim 1, selected from

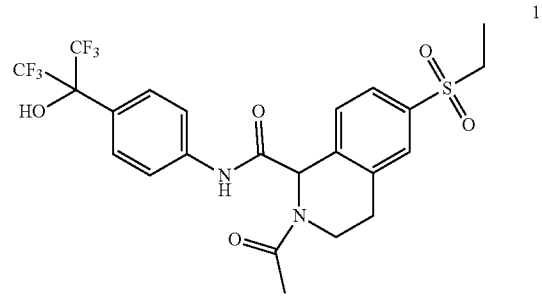

1

-continued
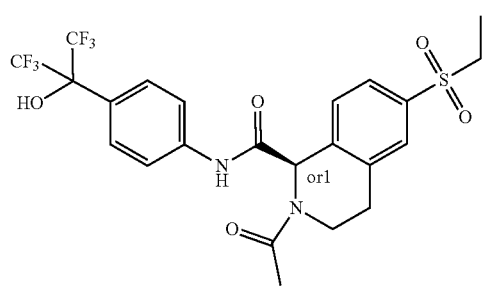
2
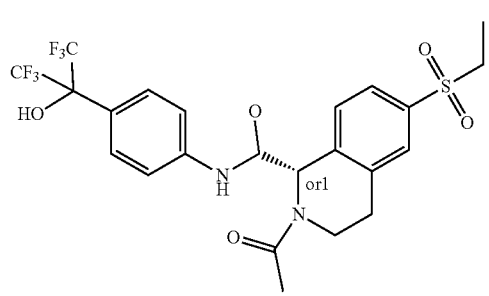
3
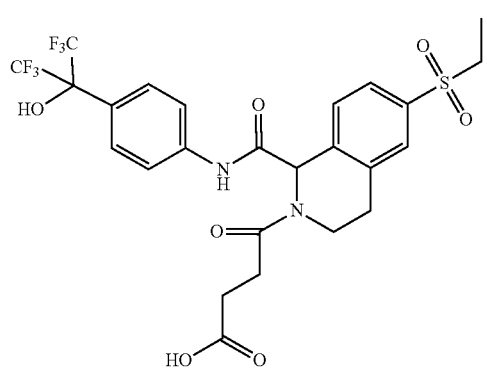
4
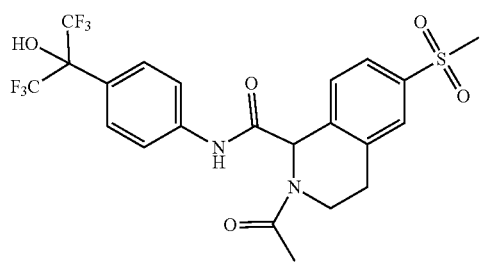
5
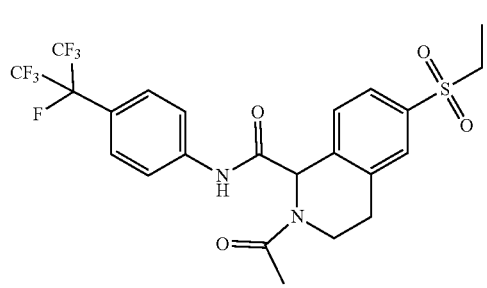
7
-continued
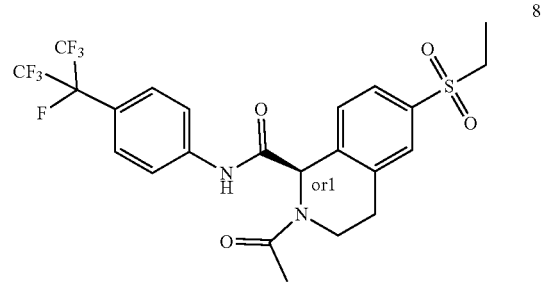
8
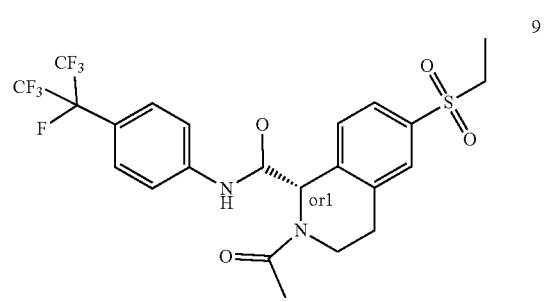
9
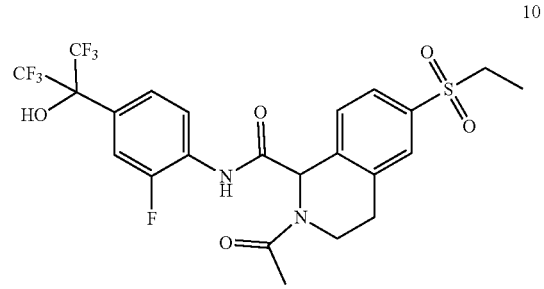
10
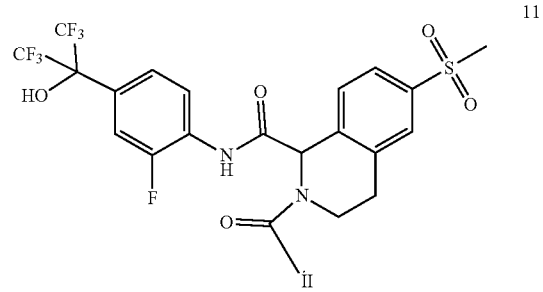
11
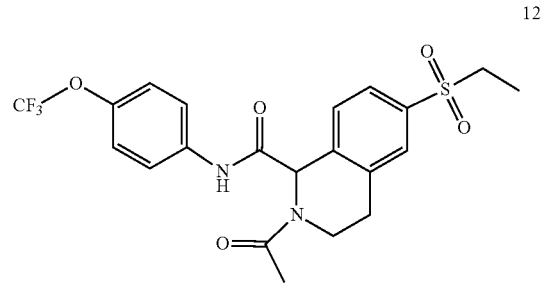
12

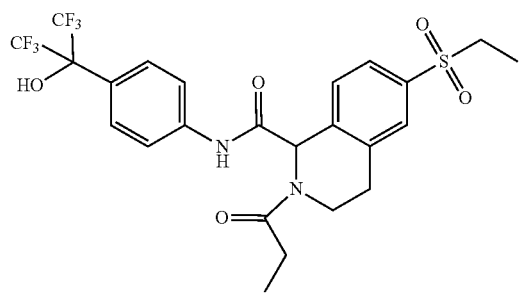
13
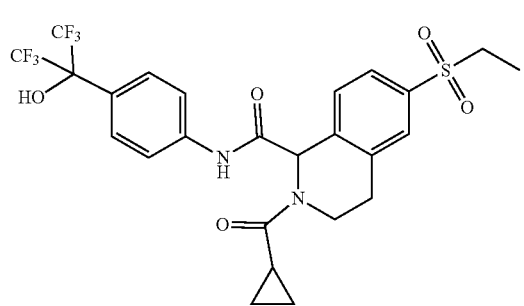
14
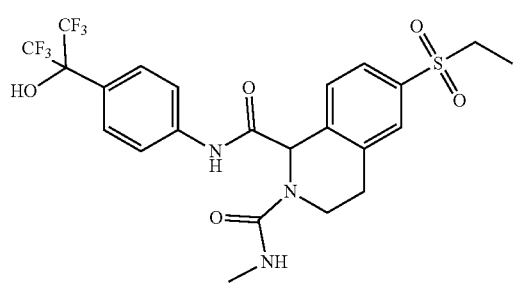
15
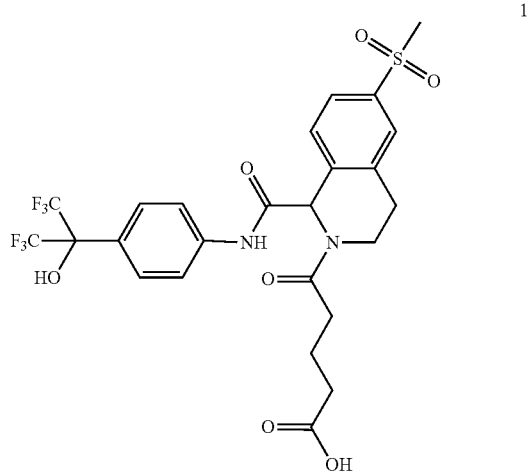
16
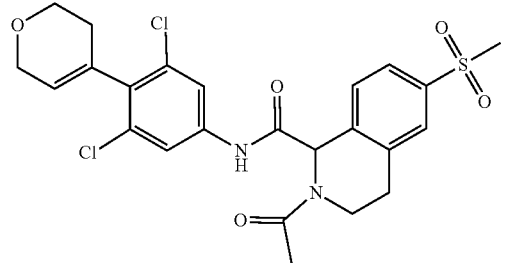
17
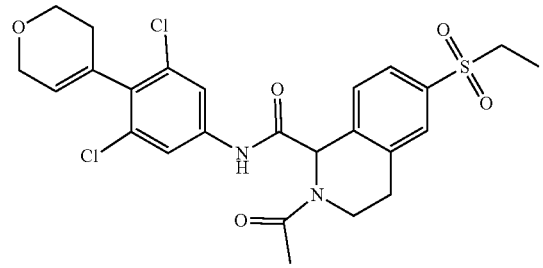
18
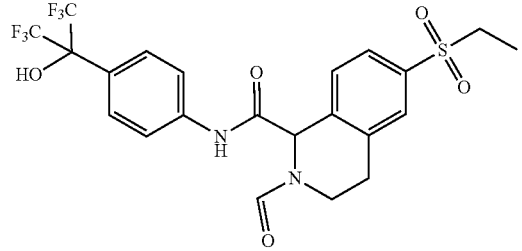
19
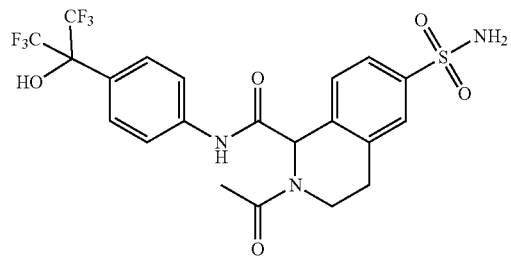
20
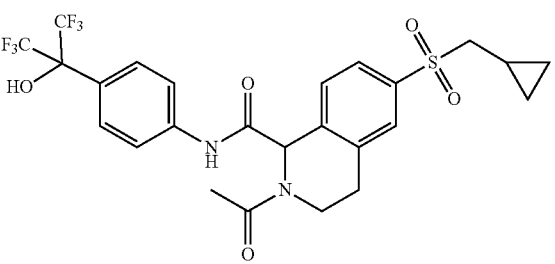
21

-continued

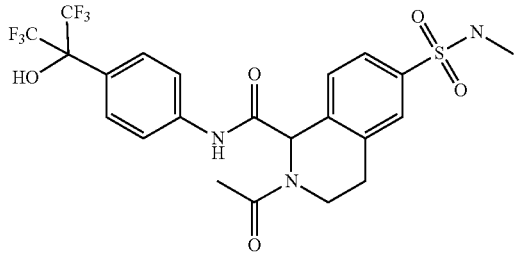

or a pharmaceutically acceptable salt thereof.

16. A pharmaceutical composition comprising a compound according to claim 1, or a pharmaceutically acceptable salt thereof and a pharmaceutically acceptable excipient.

17. The compound according to claim 1 or a pharmaceutically acceptable salt thereof, wherein, $R_1$ is trifluoromethoxy, trifluoroethoxy, pentafluoroethoxy, trifluoropropoxy or pentafluoropropoxy; or $R_1$ is 5-7 membered heterocycloalkenyl comprising 1 heteroatom selected from N, O or S.

18. The compound according to claim 1 or a pharmaceutically acceptable salt thereof, wherein $R_4$ is selected from methyl, ethyl, propyl, isopropyl, —CH$_2$—CF$_3$, —CH$_2$-cyclopropyl, —CH$_2$-cyclobutyl, —CH$_2$-cyclopentyl, —CH$_2$—CH$_2$-cyclopropyl, —CH$_2$—CH$_2$-cyclobutyl or —CH$_2$—CH$_2$-cyclopentyl.

19. The compound according to claim 1 or a pharmaceutically acceptable salt, wherein $R_4$ is selected from —NH$_2$, —NHCH$_3$, —NCH$_3$CH$_3$, —N(CH—CH$_3$)CH$_3$, —N(CH—CH$_3$)(CH$_2$CH$_3$), —NHCF$_3$, —N(CH$_3$)CF$_3$, —N(CF$_3$)CF$_3$, —N(CH)CF$_3$)CF$_3$ or —N(CH$_2$CF$_3$)(CH$_2$CF$_3$).

20. The compound according to claim 12 or a pharmaceutically acceptable salt thereof, wherein $R_3$ is methyl, ethyl, propyl, isopropyl, —CH$_2$CH$_2$COOH, —CH$_2$CH$_2$CH$_2$COOH, cyclopropyl, cyclopropyl, cyclopentyl, —NH$_2$, —NHCH$_3$, —NCH$_3$CH$_3$, —N(CH$_2$CH$_3$)CH$_3$ or —N(CH$_2$CH$_3$)(CH$_2$CH$_3$).

* * * * *